United States Patent
Utsumi et al.

(10) Patent No.: US 7,460,829 B2
(45) Date of Patent: Dec. 2, 2008

(54) WIRELESS COMMUNICATION SYSTEM

(75) Inventors: Kuniaki Utsumi, Sanda (JP); Hiroaki Yamamoto, Osaka (JP); Kouichi Masuda, Hirakata (JP); Tsutomu Niiho, Katano (JP); Mariko Nakaso, Suita (JP); Kazuo Tanaka, Neyagawa (JP); Hiroyuki Sasai, Katano (JP)

(73) Assignee: Panasonic Corporation, Osaka (JP)

( * ) Notice: Subject to any disclaimer, the term of this patent is extended or adjusted under 35 U.S.C. 154(b) by 658 days.

(21) Appl. No.: 10/530,976

(22) PCT Filed: Jul. 22, 2004

(86) PCT No.: PCT/JP2004/010779

§ 371 (c)(1),
(2), (4) Date: Apr. 12, 2005

(87) PCT Pub. No.: WO2005/011316

PCT Pub. Date: Feb. 3, 2005

(65) Prior Publication Data

US 2005/0266797 A1 Dec. 1, 2005

(30) Foreign Application Priority Data

| Jul. 25, 2003 | (JP) | ............................... 2003-279806 |
| Mar. 2, 2004 | (JP) | ............................... 2004-057199 |
| May 31, 2004 | (JP) | ............................... 2004-161732 |

(51) Int. Cl.
H04B 7/185 (2006.01)

(52) U.S. Cl. ...................................... 455/13.1; 455/501

(58) Field of Classification Search ............... 455/422.1, 455/33.1, 443, 206, 18, 242.1, 242.2, 41.2, 455/500, 506, 507, 501, 13.1, 11.1
See application file for complete search history.

(56) References Cited

U.S. PATENT DOCUMENTS

| 5,771,462 A | 6/1998 | Olsen |
| 6,631,268 B1 | 10/2003 | Lilja |

FOREIGN PATENT DOCUMENTS

JP   6-21870   1/1994

(Continued)

OTHER PUBLICATIONS

Chinese Office Action w/English translation issued Oct. 26, 2007 in Chinese Application No. 200480001601.9, filed Jul. 22, 2004.

*Primary Examiner*—Tu X Nguyen
(74) *Attorney, Agent, or Firm*—Wenderoth, Lind & Ponack, L.L.P.

(57) ABSTRACT

A wireless communication system capable of keeping a level of a wireless signal received by a relay apparatus within a predetermined dynamic range. In a control apparatus, a transmitting section converts a downstream electric signal into a downstream optical signal and transmits the downstream optical signal to the relay apparatus via an optical transmission path. The relay apparatus converts the received downstream optical signal into a downstream electric signal and transmits the downstream electric signal as a wireless signal to a wireless communication terminal from a transmitting/receiving antenna section. In the relay apparatus, a level adjustment section adjusts the level of the wireless signal transmitted by the relay apparatus such that the receiving level of the wireless signal received by the relay apparatus is kept within a predetermined range.

28 Claims, 42 Drawing Sheets

FOREIGN PATENT DOCUMENTS

| | | |
|---|---|---|
| JP | 8-18616 | 1/1996 |
| JP | 9-36891 | 2/1997 |
| JP | 9-64815 | 3/1997 |
| JP | 9-233050 | 9/1997 |
| JP | 2885143 | 2/1999 |
| JP | 2000-59849 | 2/2000 |
| JP | 2001-45042 | 2/2001 |

WIRELESS COMMUNICATION SYSTEM

BACKGROUND OF THE INVENTION

The present invention relates to a system in which a control apparatus communicates with a wireless communication terminal via a relay apparatus, and more particularly to a system in which the control apparatus and the relay apparatus are connected to each other via an optical transmission path.

Recently, wireless communication systems in which a relay station for communicating with a wireless communication terminal wirelessly is connected to a control apparatus via an optical transmission path have been used (for example, Japanese Laid-Open Patent Publication No. 9-233050).

FIG. 43 is a diagram showing a structure of a conventional wireless communication system described in Japanese Laid-Open Publication No. 9-233050. In the wireless communication system shown in FIG. 43, a control apparatus 19 converts a modulated signal into an optical signal and transmits the optical signal to the relay apparatus 29 via an optical transmission path 59. The relay apparatus 29 converts the optical signal transmitted from the control apparatus 19 into an electric signal by an optical-to-electric conversion section 95, and transmits the electric signal as a wireless signal to a wireless communication terminal 39 in the same area via a transmitting/receiving section 93 and an antenna section 92. The relay apparatus 29 receives the wireless signal transmitted from the wireless communication terminal 39 by the antenna section 92, converts the wireless signal into an optical signal by an electric-to-optical conversion section 94 via the transmitting/receiving section 93, and transmits the optical signal to the optical transmission path 59. In the conventional wireless communication system, communication between the relay apparatus and the wireless communication terminal is realized in this manner.

The conventional wireless communication system needs to fulfill the first through third requirements described below in order to realize a high communication quality.

The first requirement is that the levels of wireless signals received by the relay apparatus need to be kept within a predetermined range. The difference between the maximum level and the minimum level of a received wireless signal at which the received wireless signal can be effectively reproduced is referred to as a dynamic range. In the case where the level of a wireless signal received by the relay apparatus is too high, when the wireless signal is converted into an optical signal, the optical signal is distorted. By contrast, in the case where the level of a wireless signal received by the relay apparatus is too low, the wireless signal to be received and noise cannot be separated from each other. In order to realize high quality optical transmission of a wireless signal, the levels of the wireless signals received by the relay apparatus need to be kept within a predetermined range.

Next, when the relay apparatus amplifies a signal component to be transmitted to the wireless communication terminal, out-band frequency components with respect to the signal component to be transmitted are output due to the nonlinearity of the amplifier, together with the signal component to be transmitted. Out-band frequency components have adverse effects on other communication devices which communicate using the same frequency band as that of the out-band frequency components, electric devices existing in the vicinity of the wireless communication terminal, and the like. Therefore, the levels of the out-band frequency components with respect to the level of the wireless signal component to be transmitted by the relay apparatus need to be kept to a certain level or lower. Herein, the ratio between the level of the out-band frequency component and the level of the wireless signal component to be transmitted to the wireless communication terminal by the relay apparatus is referred to as a "leakage ratio". Thus, the second requirement is that the leakage ratio of wireless signals needs to be kept to a certain level or lower.

Further, in order to allow the relay apparatus to normally communicate with the wireless communication terminal, the signal-to-jam ratio in the frequency band of a wireless signal transmitted or received (hereinafter, referred to as a "D/U (Desired/Undesired) ratio") needs to be kept to a certain level or higher. The reason is that when the D/U ratio is too low, the relay apparatus cannot separate the signal to be received and noise from each other. Thus, the third requirement is that the D/U ratio of a wireless signal received by the relay apparatus needs to be kept to a certain level or higher.

Now, in order to solve the first problem, a wireless communication system shown in FIG. 44 is proposed (see the specification of Japanese Patent No. 2885143). FIG. 44 is a diagram showing a structure of a conventional wireless communication system described in the specification of Japanese Patent No. 2885143. In the wireless communication system shown in FIG. 44, a relay apparatus 28 and a control apparatus 18 are connected to each other via an optical fiber 58. The relay apparatus 28 receives a wireless signal transmitted from a wireless communication terminal (not shown) via antenna section 91. An amplifier 1 amplifies the signal received by the antenna section 91. The signal amplified by the amplifier 1 is divided by an optical divider 2 and frequency-converted by mixers 3a through 3d and synthesizers 4a through 4d. The frequency-converted signals pass through band-pass filters 5a through 5d having a one-wave passband, and then are amplified to a predetermined signal level by nonlinear amplifiers 6a through 6d. The amplified signals are combined by a combiner 7 and then converted into an optical signal by an electric-to-optical converter 8. The optical signal is transmitted to the control apparatus 18 via the optical fiber 58. In the control apparatus 18, an optical-to-electric converter 21 converts the optical signal transmitted from the optical fiber 58 into an electric signal. The electric signal is divided by a divider 11 and then frequency-converted by mixers 12a through 12d and oscillators 13a through 13d in order to be returned to have the original frequency band. Then, the frequency-converted signals are separated from one another by band-pass filters 14a through 14d having a one-wave passband. The separated signals are demodulated by demodulators 15a through 15d and output to the outside, or are detected by detectors 16a through 16d. The signals which are detected and output by the detectors 16a through 16d are converted into digital signals by A/D converters 17a through 17d and then stored in ROMs 18a through 18d.

As described above, the conventional wireless communication system described in the specification of Japanese Patent No. 2885143 separates a received signal one wave by one wave using the relay apparatus 28 and adjusts the level of each separated signal by each of the nonlinear amplifiers 6a through 6d. Thus, by providing the nonlinear amplifiers 6a through 6d in the relay apparatus 28, the level of a wireless signal received by the relay apparatus can be kept within a predetermined dynamic range. In this manner, the first requirement can be fulfilled.

Next, in order to fulfill the second and third requirements, the IEEE802.11a Standard, for example, regulates the quality of a wireless signal transmitted and received by a relay apparatus and a wireless communication terminal. The IEEE802.11a Standard regulates that when the modulation system of the wireless signal is 64 QAM (Quadrature Amplitude Modulation) and jamming from other channels exists, the dynamic range of the wireless signal received by the relay apparatus must be about 32 dB at the maximum. Based on the IEEE802.11a Standard, the required D/U ratio is calculated to be about 22 dB or higher. Furthermore, ARIB STD-T71 regulates that the leakage ratio of a wireless signal to adjacent channels must be −25 dB or lower and that the leakage ratio to channels which are adjacent to the adjacent channels must be −40 dB or lower. By using a wireless signal fulfilling these regulations, the relay apparatus can normally communicate.

However, in the conventional wireless communication system described in the specification of Japanese Patent No. 2885143, the relay apparatus needs to have AGC (Automatic Gain Control) functions for controlling the gain such as, for example, the nonlinear amplifiers 6a through 6d in a number corresponding to the number of wireless channels, in order to keep the wireless signals within the dynamic range. This complicates the structure of the system.

Even in the case where a signal is transmitted to a control apparatus using a frequency-division multiplexing system also, there is a problem that the structure of the system is complicated. A relay apparatus, when receiving wireless signals from a plurality of wireless communication terminals simultaneously, cannot adjust the levels of the plurality of wireless signals at one time. In the wireless communication system described in the specification of Japanese Patent No. 2885143, the relay apparatus first separates the frequency-converted signal into a number of signals corresponding to the number of the channels and adjusts the levels of the signals to be the same, and then performs multiplexing. Therefore, the relay apparatus needs to include many components such as a divider, and mixers, synthesizers, band-pass filters, and nonlinear amplifiers in a number corresponding to the number of channels of wireless signals. This complicates the structure of the relay apparatus and makes it difficult to reduce the size of the relay apparatus.

In addition, in the conventional wireless communication system described in the specification of Japanese Patent No. 2885143, the relay apparatus and the control apparatus need to have an oscillator. As a result, there is a problem that the system having such a structure is expensive.

As described above, the conventional wireless communication system described in the specification of Japanese Patent No. 2885143, although being capable of fulfilling the first requirement, has a problem of complicating the structure thereof.

Moreover, the IEEE802.11a Standard does not provide any regulation for the case where the relay apparatus uses wireless signals of a plurality of channels. Therefore, the regulations on a wireless signal provided by the IEEE802.11a Standard cannot be applied as they are to a system using a plurality of channels. The reasons for this will be described below.

In the case where communication is performed using signals of a plurality of channels, channels are assigned different frequencies, respectively. FIG. 45 is a diagram showing spectra of wireless LAN signals in conformity to the IEEE802.11a Standard, which are transmitted from first and second wireless communication terminals which use two adjacent channels. The solid line represents the spectrum of signal a, and the dashed line represents the spectrum of signal b.

Signal a transmitted from the first wireless communication terminal and signal b transmitted from the second wireless communication terminal belong to channels adjacent to each other. Hereinafter, a case where signal a is jammed by a signal component leaking from signal b will be described.

Signal a has a signal component 1001a, a signal leakage component 1002a, and a signal leakage component 1003a. The signal component 1001a is a component of signal a which is to be received by the relay apparatus. The bandwidth of the signal component 1001a is about 20 MHz. The signal leakage component 1002a is a component leaking to the channel closest to that of the signal component 1001a (hereinafter, referred to as an "adjacent channel") The signal leakage component 1003a is an out-band frequency component with respect to signal a and is a component leaking to the channel second closest to that of the signal component 1001a (hereinafter, referred to as a "second adjacent channel"). In the case where an out-band frequency with respect to a signal overlaps the frequency of the channel adjacent to the signal, the out-band frequency component leaks to the adjacent channel. Here, for the sake of simplicity, the following description will be given with the spectra of the signals being assumed to be at the same level.

The IEEE802.11a Standard regulates that in a wireless communication system in which the modulation system of a wireless signal is 64 QAM and jamming from other channels exists, the dynamic range of the wireless signal received by the relay apparatus must be about 32 dB at the maximum. Based on the IEEE802.11a Standard, the required D/U ratio is calculated to be about 22 dB or higher.

A leakage ratio 1004 is the ratio between the signal leakage component 1002a and the signal component 1001a, and is regulated to be −25 dB or lower. When the signal level is represented by a logarithm, the logarithm of the leakage ratio 1004 is represented by a difference between the logarithm of the level of the signal leakage component 1002a and the logarithm of the level of the signal component 1001a. The following description in this specification will be given with the leakage ratio being assumed to be represented by a logarithm. A leakage ratio 1005 is a difference between the level of the signal leakage component 1003a and the level of the signal component 1001a, and is regulated to be −40 dB or lower.

Signal b has a signal component 1001b, a signal leakage component 1002b, and a signal leakage component 1003b. The signal component 1001b is a component of signal b which is to be received by the relay apparatus. The signal leakage component 1002b is a component leaking to the adjacent channel to the signal component 1001b. The signal leakage component 1003b is a component leaking to the second adjacent channel to the signal component 1001b.

A D/U ratio 1010 is a difference between the level of the signal component 1001a and the level of the signal leakage component 1002b. The signal leakage component 1002b leaks to signal a in the adjacent channel. Accordingly, in order to allow the relay apparatus to convert only signal a into an optical signal without being jammed by the leakage from the adjacent channel, the difference between the level of the signal component 1001a and the level of the signal leakage component 1002b, i.e., the D/U ratio 1010, must be 22 dB or higher.

The level of a wireless signal received by the relay apparatus depends on the distance between the relay apparatus and the wireless communication terminal. In other words, as the distance between the relay apparatus and the wireless communication terminal is longer, the level of the wireless signal received by the antenna of the relay apparatus is lower.

Accordingly, in the case where the dynamic range of the wireless signal received by the relay apparatus is 32 dB, the difference between the level of the signal component 1001b and the level of the signal component 1001a may be 32 dB at the maximum depending on the positional relationship between the first wireless communication terminal and the second wireless communication terminal. In this case, provided that the leakage ratio to the adjacent channel is −25 dB, the D/U ratio 1010 is −7 dB. Thus, the required D/U ratio of 22 dB cannot be fulfilled.

As described above, in the case where a plurality of communication terminals perform communication using two adjacent channels, normal communication may not be possible due to jamming from a signal of another channel, even if the wireless signal received by the relay apparatus has the quality in conformity to the Standard and the level of the wireless signal is within the dynamic range regulated by the Standard. In such a case, the first and second problems can be solved, but the third problem of fulfilling the predetermined D/U ratio cannot be solved.

Next, a case where communication is jammed by a signal leaking from the second adjacent channel will be discussed. FIG. 46 is a diagram showing spectra of wireless LAN signals which are transmitted from first and third wireless communication terminals which use two channels that are away from each other by a two-channel distance.

The solid line represents the spectrum of signal a, and the dashed line represents the spectrum of signal c. Signal a transmitted from the first wireless communication terminal and signal c transmitted from the third wireless communication terminal belong to channels which are away from each other by a two-channel distance. Hereinafter, a case where signal a is jammed by a signal component leaking from signal c will be described.

Signal a has the signal component 1001a, the signal leakage component 1002a, and the signal leakage component 1003a. The signal components of signal a shown in FIG. 46 are the same as the signal components of signal a shown in FIG. 45 and the descriptions thereof will be omitted.

Signal c has a signal component 1001c, a signal leakage component 1002c, and a signal leakage component 1003c. The signal component 1001c is a component of signal c which is to be received by the relay apparatus. The signal leakage component 1002c is a component leaking to the adjacent channel to the signal component 1001c. The signal leakage component 1003c is a component leaking to the second adjacent channel to the signal component 1001c.

A D/U ratio 1010 is a difference between the level of the signal component 1001a and the level of the signal leakage component 1003c.

In the case where the dynamic range of the wireless signal received by the relay apparatus is 32 dB, the difference between the level of the signal component 1001c and the level of the signal component 1001a may be 32 dB at the maximum depending on the positional relationship between the first wireless communication terminal and the third wireless communication terminal. In this case, provided that the leakage ratio to the second adjacent channel is −40 dB, the D/U ratio 1010 is 8 dB. Thus, the required D/U ratio of 22 dB cannot be fulfilled.

As described above, in the case where a plurality of communication terminals perform communication using two channels which are away from each other by a two-channel distance, normal communication may not be possible due to jamming from a signal of another channel, even if the wireless signal received by the relay apparatus has the quality in conformity to the Standard and the level of the wireless signal is within the dynamic range regulated by the Standard. In such a case, the first and second problems can be solved, but the third problem of fulfilling the predetermined D/U ratio cannot be solved.

SUMMARY OF THE INVENTION

Accordingly, an objective of the present invention is to provide a wireless communication system capable of keeping the levels of wireless signals received by a relay apparatus within a predetermined dynamic range.

Another objective of the present invention is to provide a wireless communication system capable of fulfilling first through third requirements, i.e., keeping the levels of wireless signals received by a relay apparatus within a predetermined dynamic range, capable of keeping the leakage ratio of a wireless signal to a certain level or lower, and capable of keeping the D/U ratio of a wireless signal received by the relay apparatus at a certain level or higher.

To achieve the above objects, the present invention has the following aspects.

A first aspect of the present invention is directed to a wireless communication system comprising a control apparatus; at least one relay apparatus connected with the control apparatus via an optical transmission path; and a plurality of wireless communication terminals communicating wirelessly with the relay apparatus. The control apparatus comprises a first optical transmitting section for converting a downstream electric signal into a downstream optical signal and transmitting the downstream optical signal to the relay apparatus via the optical transmission path, and a first optical receiving section for converting an upstream optical signal transmitted from the relay apparatus via the optical transmission path into an upstream electric signal.

The relay apparatus comprises a second optical receiving section for converting the downstream optical signal transmitted from the control apparatus via the optical transmission path into the downstream electric signal; a transmitting/receiving antenna section for transmitting the downstream electric signal converted by the second optical receiving section to the wireless communication terminal as a wireless signal, and receiving a wireless signal transmitted from the wireless communication terminal as the upstream electric signal; and a second optical transmitting section for converting the upstream electric signal received by the transmitting/receiving antenna section into the upstream optical signal and transmitting the upstream optical signal to the control apparatus via the optical transmission path. The wireless communication system further comprises wireless signal level restriction means for adjusting the level of a wireless signal transmitted or received by the relay apparatus such that a receiving level of the wireless signal received by the relay apparatus is kept within a predetermined range.

Accordingly, the level of a wireless signal received by the relay apparatus can be kept within a predetermined range. Since the wireless signal received by the relay apparatus can be kept within a predetermined range, high quality optical transmission of the wireless signal can be realized.

Preferably, where the wireless communication terminals use a respective channel, the predetermined range may be smaller than a difference between (a) a leakage ratio which is the ratio of the level of a wireless signal using the respective channel with respect to the level of a frequency component leaking to another channel different from the respective channel, and (b) a signal to noise ratio which is the ratio of the level of a leakage signal from a wireless communication terminal using another channel different from the respective channel with respect to the level of the wireless signal using the respective channel.

Accordingly, the level of the wireless signal received by the relay apparatus can be kept within a range smaller than the difference between the leakage ratio and the signal to noise ratio (D/U ratio). Therefore, the relay apparatus can normally communicate without being jammed by a signal leaking from another channel.

In one example, the wireless signal level restriction means is a level control section, provided in the relay apparatus, for adjusting the level of the downstream electric signal which is output by the second optical receiving section; and the level control section attenuates the level of the downstream electric signal so as to narrow a communicable area of the relay apparatus, and thus allows the level of a wireless signal transmitted by a wireless communication terminal existing in the communicable area to be within the predetermined range.

Accordingly, the relay apparatus can attenuate the level of the wireless signal to be transmitted so as to narrow the communicable area of the relay apparatus. Therefore, the level of the wireless signal transmitted from a wireless communication terminal existing in the communicable area can be kept in a predetermined range. Thus, even when the relay apparatus communicates using wireless signals of a plurality of channel, the required D/U ratio can be fulfilled. As a result, the relay apparatus can normally communicate without being jammed by a signal leaking from another channel.

In another example, the control apparatus comprises a plurality of the first optical transmitting sections; the wireless signal level restriction means is a signal dividing section, provided in the control apparatus, for dividing the downstream electric signal; the signal dividing section divides the downstream electric signal and thus attenuates the level of the downstream electric signal so as to narrow a communicable area of the relay apparatus, and thus allows the level of a wireless signal transmitted by a wireless communication terminal existing in the communicable area to be within the predetermined range; and the first optical transmitting sections convert the downstream electric signals divided by the signal dividing section into downstream optical signals.

Accordingly, the level of the downstream optical signal transmitted from the control apparatus is lowered, and so the level of the wireless signal transmitted by the relay apparatus is lowered. Therefore, the level of the wireless signal transmitted from a wireless communication terminal existing in the communicable area can be kept in a predetermined range. Thus, even when the relay apparatus communicates using wireless signals of a plurality of channel, the required D/U ratio can be fulfilled. As a result, the relay apparatus can normally communicate without being jammed by a signal leaking from another channel.

In still another example, the wireless signal level restriction means is a pilot signal generation section, provided in the control apparatus, for generating a pilot signal to be transmitted while being superposed on the downstream electric signal; the first optical transmitting section converts the downstream electric signal having the pilot signal superposed thereon into a downstream optical signal; the relay apparatus further comprises a pilot signal detection section for detecting the level of the pilot signal superposed on the downstream electric signal converted by the second optical receiving section; and a level control section for controlling the level of the wireless signal such that the level of the pilot signal detected by the pilot signal detection section is constant; and the pilot signal generation section increases the level of the generated pilot signal so as to narrow a communicable area of the relay apparatus, and thus allows the level of a wireless signal transmitted by a wireless communication terminal existing in the communicable area to be within the predetermined range.

Accordingly, by increasing the level of the pilot signal generated by the control apparatus, the level of the wireless signal transmitted from the relay apparatus can be lowered. Therefore, the communicable area of the relay apparatus can be narrowed, and thus the level of the wireless signal transmitted from a wireless communication terminal existing in the communicable area can be kept in a predetermined range.

In still another example, the wireless signal level restriction means is provided in the control apparatus, and comprises a monitoring section for monitoring whether or not the quality of the upstream electric signal converted by the first optical receiving section fulfills a predetermined condition; and a level control section for, when the monitoring section determines that the quality of the upstream electric signal does not fulfill the predetermined condition, lowering the level of the downstream electric signal which is to be input to the first optical transmitting section so as to reduce an optical modulation index; and the level control section reduces the optical modulation index and thus attenuates the power of the downstream optical signal so as to narrow a communicable area of the relay apparatus, and thus allows the level of a wireless signal transmitted by a wireless communication terminal existing in the communicable area to be within the predetermined range.

Accordingly, when the quality of the upstream electric signal is deteriorated, the control apparatus lowers the modulation index of the downstream optical signal, so that the power of the downstream optical signal to be transmitted to the relay apparatus can be lowered. Therefore, the communicable area of the relay apparatus can be narrowed, and thus the level of the wireless signal transmitted from a wireless communication terminal existing in the communicable area can be kept in a predetermined range.

In still another example, the wireless signal level restriction means is provided in the control apparatus, and comprises a monitoring section for monitoring whether or not the quality of the upstream electric signal converted by the first optical receiving section fulfills a predetermined condition; and a level control section for, when the monitoring section determines that the quality of the upstream electric signal does not fulfill the predetermined condition, lowering the level of a bias current which is set by the first optical transmitting section so as to reduce an optical modulation index; and the level control section reduces the optical modulation index and thus attenuates the power of the downstream optical signal so as to narrow a communicable area of the relay apparatus, and thus allows the level of a wireless signal transmitted by a wireless communication terminal existing in the communicable area to be within the predetermined range.

Accordingly, when the quality of the upstream electric signal is deteriorated, the control apparatus lowers the level of the bias current and thus reduces the modulation index of the downstream optical signal, so that the power of the downstream optical signal to be transmitted to the relay apparatus can be lowered. Therefore, the communicable area of the relay apparatus can be narrowed, and thus the level of the wireless signal transmitted from a wireless communication terminal existing in the communicable area can be kept in a predetermined range.

Furthermore, the wireless signal level restriction means may include a level attenuation section for attenuating the wireless signal to such a level that the upstream optical signal converted by the second optical transmitting section is not distorted.

Accordingly, even when the level of the wireless signal received by the relay apparatus from the wireless communication terminal is very high, the level of the wireless signal can be lowered. Therefore, the upstream optical signal is not distorted. Thus, high quality optical transmission of the wireless signal can be realized.

Preferably, communicable areas of the relay apparatuses adjacent to each other partially overlap each other; the relay apparatuses each comprise level adjustment means for controlling a gain by adjusting the level of the wireless signal transmitted to, and received from, the wireless communication terminal; and the level adjustment means may adjust the level of the wireless signal, such that a difference between (a) a delay time required for a signal transmitted from the control apparatus to be transmitted via each of the adjacent relay apparatuses onto the wireless communication terminal existing in a region where the communicable areas overlap each other, and (b) a delay time required for a signal transmitted from the control apparatus to be transmitted via the relay apparatus adjacent to the each relay apparatus onto the wireless communication terminal existing in the region where the communicable areas overlap each other, is within a predetermined time period.

Accordingly, even when an optical signal transmitted from the control apparatus reaches the wireless communication terminal via a plurality of relay apparatuses, the delay skew among the signals can be kept within a delay skew tolerated by the wireless communication system. Therefore, signal deterioration due to multi-path interference can be prevented. Even when, oppositely, a wireless signal is transmitted from a region where receiving areas overlap each other and the wireless signal is received by a plurality of receiving antenna section, the delay skew among the wireless signals transmitted from the region where the receiving areas overlap each other can be kept within a predetermined time period by adjusting the unidirectivity of the receiving antenna section.

Furthermore, where two relay apparatuses adjacent to each other is one set, one set of adjacent relay apparatuses may communicate using a frequency which is different from the frequency used by another set of adjacent relay apparatuses.

Accordingly, even when the receiving area of a set of relay apparatuses between which the delay skew of signals has been adjusted overlaps a receiving area of another set of relay apparatuses, multi-path interference is not generated because the two sets of relay apparatus use difference frequencies.

In one example, the transmitting/receiving antenna section has a directivity toward a relay apparatus, among the two adjacent relay apparatuses, which is connected with the control apparatus via a longer optical transmission path than the optical transmission path which connects the control apparatus and the relay apparatus including the transmitting/receiving antenna section.

Accordingly, three or more relay apparatuses communicating using the same frequency can be installed consecutively.

Furthermore, the wireless communication system may further comprise an optical splitting/coupling section for splitting the optical transmission path which connects the control apparatus and each of the relay apparatuses, wherein one end of the split optical transmission path is connected to the relay apparatus and the other end is connected to another optical splitting/coupling section. The optical splitting/coupling section may split one optical fiber connected to the control apparatus into at least a predetermined number of optical fibers, and each of the split optical fibers may be connected to a relay apparatus.

Accordingly, a great number of relay apparatuses can be installed.

Furthermore, the level adjustment means adjusts the level of the wireless signal such that the delay times are each a maximum delay time tolerated by the wireless communication system.

Accordingly, even when more relay apparatuses are installed, the delay time of a signal reaching the wireless communication terminal or the control apparatus via the relay apparatuses which will be added may be the maximum delay time tolerated by the wireless communication system. Therefore, it is not necessary to change the setting of the other existing relay apparatuses when more relay apparatuses are installed.

In another example, communicable areas of the relay apparatuses adjacent to each other partially overlap each other; the relay apparatuses each comprise optical signal control means for controlling a delay time of the optical signal transmitted to, and received from, the control apparatus; and the optical signal control means controls the delay time of the optical signal, such that a difference between (a) a delay time required for a signal transmitted from the control apparatus to be transmitted via each of the adjacent relay apparatuses onto the wireless communication terminal existing in a region where the communicable areas overlap each other, and (b) a delay time required for a signal transmitted from the control apparatus to be transmitted via the relay apparatus adjacent to the each relay apparatus onto the wireless communication terminal existing in the region where the communicable areas overlap each other, is within a predetermined time period.

Accordingly, it is not necessary to provide a level adjustment section for controlling the gain in the relay apparatus. Therefore, the structure of the wireless communication system can be simplified.

In another example, the relay apparatus may transmit or receive a wireless signal which is modulated with a frequency different from the frequency used by the adjacent relay apparatus. The level adjustment section may control the level of the wireless signal, such that the level of the wireless signal with respect to the wireless communicable area formed by another relay apparatus using the same wireless modulation signal is a predetermined level or lower.

Accordingly, even when the communicable area of the relay apparatus overlaps a communicable area of another relay apparatus, multi-path interference is not generated. Therefore, signal deterioration can be prevented.

Preferably, the transmitting/receiving antenna section may have such a directivity that a receiving sensitivity thereof in a vertical direction is within the predetermined range; and the predetermined range may be a range tolerated by the second optical transmitting section.

Accordingly, the relay apparatus receives a wireless signal transmitted by a wireless communication terminal located in an area right below the relay apparatus or in the vicinity thereof with a low gain. Therefore, the wireless signal transmitted from a position in the vicinity of the relay apparatus can be kept in a predetermined dynamic range. The relay apparatus receives a wireless signal transmitted by a wireless communication terminal which is not located in an area right below the relay apparatus or in the vicinity thereof, i.e., a wireless communication terminal located far from the relay apparatus with a high gain. Therefore, the level of the wireless signal can be kept in a predetermined dynamic range. As a result, a high quality upstream optical signal can be transmitted to the control apparatus. Since it is not necessary to provide an AGC circuit in the relay apparatus, the structure of the wireless communication system can be simplified. Thus, the system can be constructed at low cost.

In one example, the wireless signal level restriction means is a radiowave absorber, provided in the transmitting/receiving antenna section, for absorbing a wireless signal transmitted from the vertical direction.

Accordingly, a wireless signal transmitted by the wireless communication terminal located in an area right below the relay apparatus or in the vicinity thereof is absorbed by the radiowave absorber. Therefore, the receiving antenna section receives the wireless signal at low gain. Thus, a wireless signal transmitted from the vicinity of the wireless base station can be kept within a predetermined range.

In another example, the transmitting/receiving antenna section includes a pole antenna having a two-way directivity; and the pole antenna is installed such that a receiving sensitivity thereof in a vertical direction is within a predetermined range. The pole antenna may be installed on a ceiling of a building or a floor of a building. Alternatively, the pole antenna may be installed on a wall of a building.

Accordingly, the directivity of the transmitting/receiving antenna section with respect to the vertical direction can be restricted without providing a radiowave absorber. Therefore, the structure of the system can be more simplified than in the case where the transmitting/receiving antenna section includes an antenna and a radiowave absorber.

In still another example, the transmitting/receiving antenna section comprises a transmitting antenna section for transmitting the downstream electric signal converted by the second optical receiving section to the wireless communication terminal as a wireless signal; and a receiving antenna section for receiving a wireless signal transmitted from the wireless communication terminal as the upstream electric signal; wherein the wireless signal level restriction means is the transmitting antenna section and is provided at such a position that the transmitting antenna section shields a wireless signal transmitted from the vertical direction. Preferably, the transmitting antenna section may have a directivity in a direction excluding a direction in which the receiving antenna section is provided.

Accordingly, the directivity of the receiving antenna section with respect to the vertical direction can be restricted without providing a radiowave absorber. Therefore, the structure of the system can be more simplified than in the case where the receiving antenna section includes an antenna and a radiowave absorber.

The wireless communication terminals each use a respective channel, the wireless signal level restriction means may further comprise a level attenuation section for attenuating the level of a signal received by the transmitting/receiving antenna section, and keeping a signal to noise ratio which is the ratio of the level of a leakage signal from a wireless communication terminal using another channel different from the respective channel with respect to the level of a wireless signal using the respective channel to a predetermined value or lower.

Accordingly, the wireless signals bypassing from the transmitting antenna section to the receiving antenna section can be reduced. Therefore, signal deterioration due to oscillation in an electric circuit in the wireless base station or interference by upstream and downstream signals can be prevented.

In one example, each of the transmitting/receiving antenna sections has a unidirectivity with which a wireless signal from a wireless communication terminal located right below the each transmitting/receiving antenna section is not received, and receives a wireless signal transmitted from a wireless communication terminal existing in a receivable area with a predetermined level; at least one of the transmitting/receiving antenna sections is located in a direction in which the unidirectivity is directed, and receives a wireless signal from the wireless communication terminal located right below the transmitting/receiving antenna section of the relay apparatus adjacent to the at least one transmitting/receiving antenna section; and the predetermined level is within the predetermined range.

Accordingly, the transmitting/receiving antenna section does not receive a wireless signal having a high level which is transmitted from an area right below the relay apparatus or in the vicinity thereof, i.e., a position in a close range. Therefore, the signal level of a wireless signal which is input to the second optical transmitting section can be kept in a predetermined range. Thus, by installing a plurality of relay apparatuses, a wide communication area can be covered and high quality optical transmission of the signals can be realized. Since the relay apparatus does not need to include an AGC circuit, the wireless optical transmission system can have a simplified structure and can be constructed at low cost.

Preferably, among the transmitting/receiving antenna sections, the transmitting/receiving antenna sections of the relay apparatuses, other than the relay apparatus located at the shortest distance in the direction represented by the unidirectivity, may be located in the direction in which the unidirectivity is directed and receive a wireless signal from the wireless communication terminal located right below the transmitting/receiving antenna section of the relay apparatus adjacent to the transmitting/receiving antenna sections. In one example, the unidirectivity of each of the transmitting/receiving antenna sections is a directivity toward a direction right below the transmitting/receiving antenna section of the relay apparatus adjacent in an oblique downward direction with respect to the vertical direction.

Receivable areas of the relay apparatuses adjacent to each other partially may overlap each other.

Accordingly, the receiving areas are formed consecutively. Therefore, the degree of freedom regarding the locations of the wireless communication terminals can be improved.

Preferably, the transmitting/receiving antenna section may have a unidirectivity toward a relay apparatus, among the adjacent relay apparatuses, which is connected with the control apparatus via a longer optical transmission path than the optical transmission path which connects the control apparatus and the relay apparatus including the transmitting/receiving antenna section; and the unidirectivity may be adjusted such that a difference between (a) a delay time required for a wireless signal transmitted from a region where the receivable areas overlap each other to be received by the transmitting/receiving antenna section and transmitted onto the control apparatus, and (b) a delay time required for the wireless signal to be received by the transmitting/receiving antenna section of the adjacent relay apparatus and transmitted onto the control apparatus, is within a predetermined time period. The unidirectivity may be adjusted by changing an expansion angle of the unidirectivity or by changing an angle at which the transmitting/receiving antenna section is installed.

Accordingly, even when a wireless signal is transmitted from a region where receiving areas overlap each other and the wireless signal is received by a plurality of receiving antenna sections, the delay skew among the wireless signals transmitted from the region where receiving areas overlap each other can be kept in a predetermined time period by adjusting the unidirectivity of the receiving antenna section. Thus, signal deterioration due to multi-path interference can be prevented.

Preferably, the relay apparatus may further comprise a level adjustment section for amplifying or attenuating a wireless signal received by the transmitting/receiving antenna section; the level adjustment section may amplify or attenuate the wireless signal such that the level of the wireless signal transmitted from the region where the receivable areas overlap each other is a predetermined level; and the predetermined level may be such a level that a difference between the predetermined level and the level of a wireless signal transmitted from the region where the receivable areas overlap each other and received by the adjacent relay apparatus is within a predetermined range. The wireless communication terminals may communicate using wireless signals having different frequencies from one another.

A second aspect of the present invention is directed to a relay apparatus for receiving a wireless signal transmitted from each of a plurality of wireless communication terminals scattered in a wireless communication zone, converting the wireless signal into an optical signal and transmitting the optical signal via an optical transmission path. The relay apparatus is installed on a ceiling, a floor or a wall of a building. The relay apparatus comprises a transmitting/receiving antenna section for receiving a wireless signal transmitted from a wireless communication terminal; and an optical transmitting section for converting the wireless signal received by the transmitting/receiving antenna section into an optical signal and transmitting the optical signal to the optical transmission path. The transmitting/receiving antenna section has such a directivity that a receiving sensitivity thereof in a vertical direction is within a predetermined level. The predetermined level is such a level that a receiving level of the received wireless signal is within a predetermined range tolerated by the optical transmitting section.

A third aspect of the present invention is directed to a receiving antenna for receiving a wireless signal transmitted from each of a plurality of wireless communication terminals scattered in a wireless communication zone. The receiving antenna is installed on a ceiling, a floor or a wall of a building. The receiving antenna has such a directivity that a receiving sensitivity thereof in a vertical direction is within a predetermined level. The predetermined level is such a level that a receiving level of the received wireless signal is within a predetermined range tolerated by the optical transmitting section.

A fourth aspect of the present invention is directed to a wireless communication system, in which a relay apparatus converts an optical signal transmitted from a control apparatus connected with the relay apparatus via an optical transmission path into an electric signal and transmits the electric signal as a wireless signal to a wireless communication terminal. The control apparatus comprises a first optical transmitting section for converting a downstream electric signal into a downstream optical signal and transmitting the downstream optical signal to the relay apparatus via the optical transmission path. The relay apparatus comprises a first optical receiving section for converting a downstream optical signal transmitted from the control apparatus via the optical transmission path into a downstream electric signal; and an antenna section for transmitting the downstream electric signal converted by the first optical receiving section to the wireless communication terminal as a wireless signal. The wireless communication system comprises quality evaluation means for evaluating the transmission quality in the optical transmission path and determining whether or not the transmission quality fulfills a predetermined condition; and signal transmission stopping means for, when the quality evaluation means determines that the transmission quality does not fulfill the predetermined condition, stopping transmission of the wireless signal.

Accordingly, when the transmission quality in the optical transmission path is deteriorated, transmission of the wireless signal can be stopped. Accordingly, for example, wireless signals which do not fulfill the public conditions regulated by the Radio Law or the like are not transmitted. Therefore, other communication devices and electric devices can be prevented from being adversely influenced.

For example, the quality evaluation means and the signal transmission stopping means are provided in the relay apparatus. The quality evaluation means evaluates the quality of a downstream optical signal, and determines whether or not the downstream optical signal fulfills the predetermined condition. When the quality evaluation means determines that the quality of the downstream optical signal does not fulfill the predetermined condition, the signal transmission stopping means stops transmission of the wireless signal.

Accordingly, when the quality of the downstream optical signal received from the control apparatus is deteriorated, the relay apparatus can stop transmission of the wireless signal. Therefore, wireless signals having deteriorated quality are not transmitted.

In an example, the quality evaluation means is a received optical power detection section for detecting the power of the downstream optical signal received by the relay apparatus and determining whether or not the power is a predetermined value or lower. When the received optical power detection section determines that the power of the downstream optical signal is the predetermined value or lower, the signal transmission stopping means stops transmission of the wireless signal.

Accordingly, when the power of the downstream optical signal transmitted from the control apparatus is decreased, the relay apparatus stops transmission of the wireless signal. For example, when abnormality occurs in the optical transmission path, the transmission loss of a signal is increased. When the transmission loss of a signal is increased, the power of downstream optical signal is decreased. Thus, the relay apparatus can evaluate the transmission loss of the signal by detecting the power of the downstream optical signal.

Alternatively, the quality evaluation means and the signal transmission stopping means may be provided in the relay apparatus. The quality evaluation means may evaluate the quality of a downstream electric signal, and determine whether or not the quality of the downstream electric signal fulfills a predetermined condition. When the quality evaluation means determines that the quality of the downstream electric signal does not fulfill the predetermined condition, the signal transmission stopping means may stop transmission of the wireless signal.

Accordingly, when the quality of the downstream electric signal is deteriorated, the relay apparatus can stop transmission of the wireless signal. Therefore, wireless signals having deteriorated quality are not transmitted.

In another example, the quality evaluation means comprises a wireless signal level detection section for detecting the level of a frequency band component of a wireless signal to be transmitted from the antenna section, from the downstream electric signal converted by the first optical receiving section; an unnecessary radiation level detection section for detecting the level of an out-band frequency component of the wireless signal to be transmitted from the antenna section, from the downstream electric signal converted by the first optical receiving section; and a level determination section for determining whether or not the level of the out-band frequency component detected by the unnecessary radiation level detection section with respect to the level of the frequency band component detected by the wireless signal level detection section is a certain lever or higher. When the level determination section determines that the level of the out-band frequency component with respect to the level of the frequency band component is the certain lever or higher, the signal transmission stopping means stops transmission of the wireless signal.

Accordingly, the relay apparatus can stop transmission of a wireless signal having a high level of out-band frequency component. When the level of the out-band frequency component included in a wireless signal is high, a communication device communicating using the same frequency band as that of the out-band frequency component may be possibly adversely influenced. Since it is only necessary to detect the level of a specific frequency, the structure of the wireless communication system can be simplified.

In another example, the control apparatus further comprises a test signal generation section for generating two test signals having different frequencies. The first optical transmitting section converts a downstream electric signal having the test signal, generated by the test signal generation section, superposed thereon into a downstream optical signal. The quality evaluation means comprises a test signal level detection section for detecting the level of the frequency band component of the test signal superposed on the downstream electric signal converted by the first optical receiving section; a distortion level detection section for detecting the level of a mutual modulation distortion of the test signal superposed on the downstream electric signal converted by the first optical receiving section; and a level determination for determining whether or not the level of the mutual modulation distortion detected by the distortion level detection section with respect to the level of the frequency band component detected by the test signal level detection section is a certain level or higher. When the level determination section determines that the level of the mutual modulation distortion of the test signal with respect to the level of the frequency band component of the test signal is the certain level or higher, the signal transmission stopping means stops transmission of the wireless signal.

Accordingly, the relay apparatus can stop transmission of a wireless signal having an increased mutual modulation distortion and thus having deteriorated quality. Since it is only necessary to detect the level of a specific frequency, the structure of the wireless communication system can be simplified.

In still another example, the control apparatus further comprises a test signal generation section for generating a test signal. The first optical transmitting section converts a downstream electric signal having a test signal, generated by the test signal generation section, superposed thereon into a downstream optical signal. The quality evaluation means comprises a test signal level detection section for detecting the level of the frequency band component of the test signal superposed on the downstream electric signal converted by the first optical receiving section; a distortion level detection section for detecting the level of a harmonic distortion of the test signal superposed on the downstream electric signal converted by the first optical receiving section; and a level determination section for determining whether or not the level of the harmonic distortion detected by the distortion level detection section with respect to the level of the frequency band component detected by the test signal level detection section is a certain level or higher. When the level determination section determines that the level of the harmonic distortion of the test signal with respect to the level of the frequency band component of the test signal is the certain level or higher, the signal transmission stopping means stops transmission of the wireless signal.

Accordingly, the relay apparatus can stop transmission of a wireless signal having an increased harmonic distortion and thus having deteriorated quality. Since it is only necessary to detect the level of a specific frequency, the structure of the wireless communication system can be simplified.

Alternatively, the antenna section may receive a wireless signal transmitted from the wireless communication terminal as an upstream electric signal. The relay apparatus may further comprise a second optical transmitting section for converting the upstream electric signal received by the antenna section into an upstream optical signal and transmitting the upstream optical signal to the control apparatus via the optical transmission path. The control apparatus may further comprise a second optical receiving section for converting the upstream optical signal transmitted from the relay apparatus via the optical transmission path into an upstream electric signal. The quality evaluation means and the signal transmission stopping means may be provided in the relay apparatus. The quality evaluation means may evaluate the quality of the upstream optical signal, and determine whether or not the quality of the upstream optical signal fulfills a predetermined condition. When the quality evaluation means determines that the quality of the upstream optical signal does not fulfill the predetermined condition, the signal transmission stopping means may stop transmission of the wireless signal.

Accordingly, when the quality of the upstream optical signal is deteriorated, the relay apparatus can stop transmission of the wireless signal. Accordingly, wireless signals having deteriorated quality are not transmitted.

In an example, the quality evaluation means comprises an optical coupler section for splitting an upstream optical signal converted by the second optical transmitting section and reflected light reflected by the optical transmission path from each other; and an optical power detection section for detecting the power of the reflected light split by the optical coupler section and determining whether or not the power of the reflected light is a certain value or higher. When the optical power detection section determines that the power of the reflected light is the certain level of higher, the signal transmission stopping means stops transmission of the wireless signal.

Accordingly, for example, when the light reflection increases due to occurrence of abnormality in the optical transmission path for connecting the control apparatus and the relay apparatus, the relay apparatus can stop transmission of the wireless signal. Thus, a signal with deteriorated quality which has been transmitted from the control apparatus via the optical transmission path in which the abnormality has occurred is not converted into a wireless signal to be transmitted. Since it is only necessary to detect the light reflected by the optical transmission path, the structure of the wireless communication system can be simplified.

Alternatively, the quality evaluation means and the signal transmission stopping means are provided in the control apparatus. The quality evaluation means may evaluate the quality of a downstream optical signal, and determine whether or not the quality of the downstream optical signal fulfills a predetermined condition. When the quality evaluation means determines that the quality of the downstream optical signal does not fulfill the predetermined condition, the signal transmission stopping means may stop transmission of the downstream optical signal and thus stop transmission of the wireless signal.

Accordingly, when the quality of the downstream optical signal is deteriorated, the control apparatus stops transmission of the downstream optical signal. Since transmission of the downstream optical signal from the control apparatus is thus stopped, transmission of a wireless signal having deteriorated quality from the relay apparatus can be stopped.

In an example, the quality evaluation means comprises an optical coupler section for splitting a downstream optical signal converted by the first optical transmitting section and reflected light reflected by the optical transmission path from each other; and an optical power detection section for detecting the power of the reflected light split by the optical coupler section and determining whether or not the power of the reflected light is a certain value or higher. When the optical power detection section determines that the power of the reflected light is the certain level of higher, the signal transmission stopping means stops transmission of the wireless signal.

Accordingly, for example, when the light reflection increases due to occurrence of abnormality in the optical transmission path for connecting the control apparatus and the relay apparatus, the control apparatus can stop transmission of the downstream optical signal and thus stop transmission of the wireless signal. Therefore, signals with deteriorated quality are not transmitted from the relay apparatus. Since it is only necessary to detect the light reflected by the optical transmission path, the structure of the wireless communication system can be simplified.

Alternatively, the antenna section may receive a wireless signal transmitted from the wireless communication terminal as an upstream electric signal. The relay apparatus may further comprise a second optical transmitting section for converting the upstream electric signal received by the antenna section into an upstream optical signal and transmitting the upstream optical signal to the control apparatus via the optical transmission path. The control apparatus may further comprise a second optical receiving section for converting the upstream optical signal transmitted from the relay apparatus via the optical transmission path into an upstream electric signal. The quality evaluation means and the signal transmission stopping means may be provided in the control apparatus. The quality evaluation means may evaluate the quality of the upstream optical signal. When the quality evaluation means determines that the quality of the upstream optical signal does not fulfill a predetermined condition, the signal transmission stopping means may stop transmission of the downstream optical signal and thus stop transmission of the wireless signal from the relay apparatus.

Accordingly, for example, when abnormality occurs in the optical transmission path and as a result, the quality of the upstream optical signal is deteriorated, the control apparatus stops transmission of the downstream optical signal. Thus, the downstream optical signal, having deteriorated quality as a result of being transmitted through the optical transmission path in which the abnormality has occurred, can be prevented from being transmitted from the relay apparatus as a wireless signal.

In an example, the quality evaluation means is a received optical power detection section, provided in the control apparatus, for detecting the power of the upstream optical signal received by the control apparatus and determining whether or not the power of the upstream optical signal is a predetermined value or lower. When the received optical power detection section determines that the power of the downstream optical signal is a predetermined value or lower, the signal transmission stopping means stops transmission of the downstream optical signal.

Accordingly, when the optical power received by the control apparatus is decreased, transmission of the downstream optical signal can be stopped. Since the control apparatus is only required to have a function of detecting the received optical power, the structure of the wireless communication system can be simplified.

Alternatively, the antenna section may receive a wireless signal transmitted from the wireless communication terminal as an upstream electric signal. The relay apparatus may further comprise a second optical transmitting section for converting the upstream electric signal received by the antenna section into an upstream optical signal and transmitting the upstream optical signal to the control apparatus via the optical transmission path. The control apparatus may further comprise a second optical receiving section for converting the upstream optical signal transmitted from the relay apparatus via the optical transmission path into an upstream electric signal. The quality evaluation means and the signal transmission stopping means may be provided in the control apparatus. The quality evaluation means may evaluate the quality of the upstream electric signal. When the quality evaluation means determines that the quality of the upstream electric signal does not fulfill a predetermined condition, the signal transmission stopping means may stop transmission of the downstream optical signal and thus stop transmission of the wireless signal from the relay apparatus.

Accordingly, when the quality of a signal is deteriorated and the control apparatus cannot normally demodulate the signal, transmission of a downstream optical signal can be stopped and thus a wireless signal having deteriorated quality can be prevented from being transmitted from the relay apparatus.

In an example, the quality evaluation means comprises a signal level detection section for detecting the level of a frequency band component of a wireless signal to be received from the wireless communication terminal, from the upstream electric signal converted by the second optical receiving section; an unnecessary radiation level detection section for detecting the level of an out-band frequency component of the wireless signal to be received from the wireless communication terminal, from the upstream electric signal converted by the second optical receiving section; and a level determination section for determining whether or not the level of the out-band frequency component detected by the unnecessary radiation level detection section with respect to the level of the frequency band component detected by the wireless signal level detection is a certain lever or higher. When the level determination section determines that the level of the out-band frequency component with respect to the level of the frequency band component is the certain lever or higher, the signal transmission stopping means stops transmission of the downstream optical signal.

Accordingly, the control apparatus can stop transmission of a wireless signal including an out-band frequency component having a regulated level or higher.

In another example, the relay apparatus further comprises a test signal generation section for generating two test signals having different frequencies. The second optical transmitting section converts an upstream electric signal having the test signal, generated by the test signal generation section, superposed thereon into an upstream optical signal. The quality evaluation means comprises a test signal level detection section for detecting the level of the frequency band component of the test signal superposed on the upstream electric signal converted by the second optical receiving section; a distortion level detection section for detecting the level of a mutual modulation distortion of the test signal superposed on the upstream electric signal converted by the second optical receiving section; and a level determination section for determining whether or not the level of the mutual modulation distortion detected by the distortion level detection section with respect to the level of the frequency band component detected by the test signal level detection section is a certain level or higher. When the level determination section determines that the level of the mutual modulation distortion of the test signal with respect to the level of the frequency band component of the test signal is a certain level or higher, the signal transmission stopping means stops transmission of the downstream optical signal.

Accordingly, the control apparatus can stop transmission of a wireless signal having an increased mutual modulation distortion and thus having deteriorated quality. Since it is only necessary to detect the level of a specific frequency, the structure of the wireless communication system can be simplified.

In another example, the relay apparatus further comprises a test signal generation section for generating a test signal. The second optical transmitting section converts an upstream electric signal having the test signal, generated by the test signal generation section, superposed thereon into an upstream optical signal. The quality evaluation means comprises a test signal level detection section for detecting the level of the frequency band component of the test signal superposed on the upstream electric signal converted by the second optical receiving section; a distortion level detection section for detecting the level of a harmonic distortion of the test signal superposed on the upstream electric signal converted by the second optical receiving section; and a level determination section for determining whether or not the level of the harmonic distortion detected by the distortion level detection section with respect to the level of the frequency band component detected by the test signal level detection section is a certain level or higher. When the level determination section determines that the level of the harmonic distortion of the test signal with respect to the level of the frequency band component of the test signal is a certain level or higher, the signal transmission stopping means stops transmission of the downstream optical signal.

Accordingly, the control apparatus can stop transmission of a wireless signal having an increased harmonic distortion and thus having deteriorated quality. Since it is only necessary to detect the level of a specific frequency, the structure of the wireless communication system can be simplified.

The wireless signal may be a signal usable in a wireless LAN or a signal of broadcast wave.

Preferably, all the optical connectors for connecting optical transmission paths are obliquely polished connectors. Thus, unlike the case where other connectors are used, light reflection to a light emitting element or multiple reflection can be prevented even when the optical connectors are loosened. Accordingly, quality deterioration of an optical signal can be prevented.

DETAILED DESCRIPTION OF THE INVENTION

Hereinafter, embodiments of the present invention will be described with reference to the attached drawings.

Embodiment 1

Figure 1:
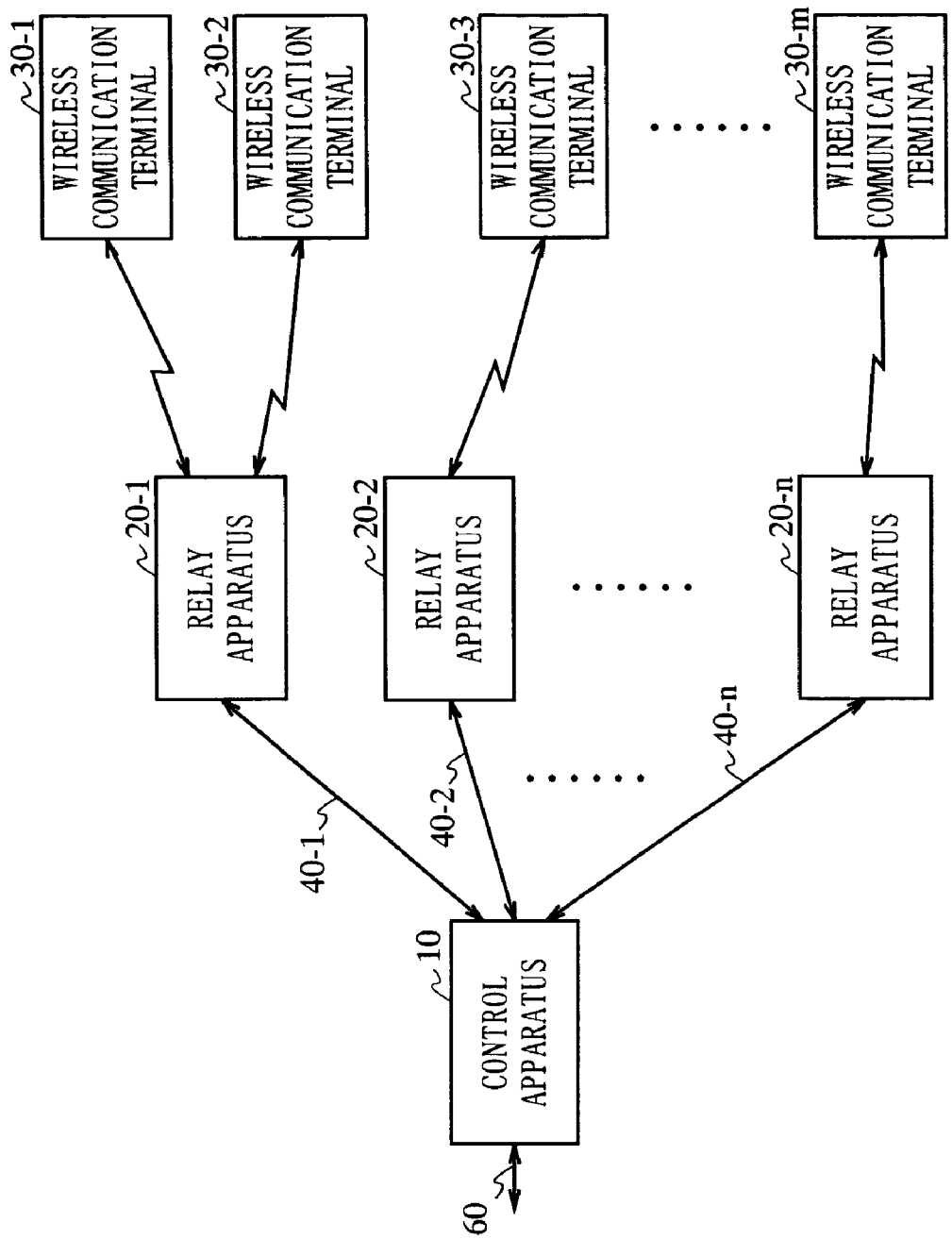
FIG. 1 is a block diagram showing a structure of a wireless communication system according to Embodiment 1 of the present invention.

FIG. 1 is a block diagram showing a structure of a wireless communication system according to Embodiment 1 of the present invention.

In FIG. 1, the wireless communication system includes a control apparatus 10, relay apparatuses 20-1 through 20-n (n: a natural number of 1 or greater), and wireless communication terminals 30-1 through 30-m. The control apparatus 10 and the relay apparatuses 20-1 through 20-n are connected to each other via optical transmission paths 40-1 through 40-n, respectively. The relay apparatuses 20-1 through 20-n and the wireless communication terminals 30-1 through 30-m are connected to each other wirelessly. The optical transmission paths are, for example, optical fibers.

The control apparatus 10 and an external network (not shown) are connected to each other via an Ethernet (registered trademark) cable 60. The control apparatus 10 and the external network may be connected to each other via a cable other than the Ethernet (registered trademark) cable 60 (for example, a telephone line, a coaxial cable, an optical fiber, etc.).

Hereinafter, unless it is necessary to distinguish one by one, the relay apparatuses 20-1 through 20-n (n: a natural number of 1 or greater), the wireless communication terminals 30-1 through 30-m (m: a natural number of 1 or greater), and the optical transmission paths 40-1 through 40-n will be collectively referred to as a relay apparatus 20, a wireless communication terminal 30, and an optical transmission path 40, respectively.

The relay apparatus 20 converts a wireless signal transmitted from a wireless communication terminal 30 into an upstream optical signal, and transmits the upstream optical signal to the control apparatus 10 via the optical transmission path 40. The control apparatus 10 converts the upstream optical signal transmitted from the relay apparatus 20 via the optical transmission path 40 into an upstream electric signal, demodulates the upstream electric signal, and then transmits the resultant signal to an external network via the Ethernet (registered trademark) cable 60.

On the other hand, the control apparatus 60 converts signals to be transmitted to the wireless communication terminals 30-1 through 30-m into downstream optical signals and transmits the downstream optical signals to the relay apparatuses 20-1 through 20-n via the optical transmission paths 40-1 through 40-n. The relay apparatuses 20-1 through 20-n convert the received downstream optical signals into wireless signals and transmit the wireless signals to the wireless communication terminals 30-1 through 30-m.

Figure 2:
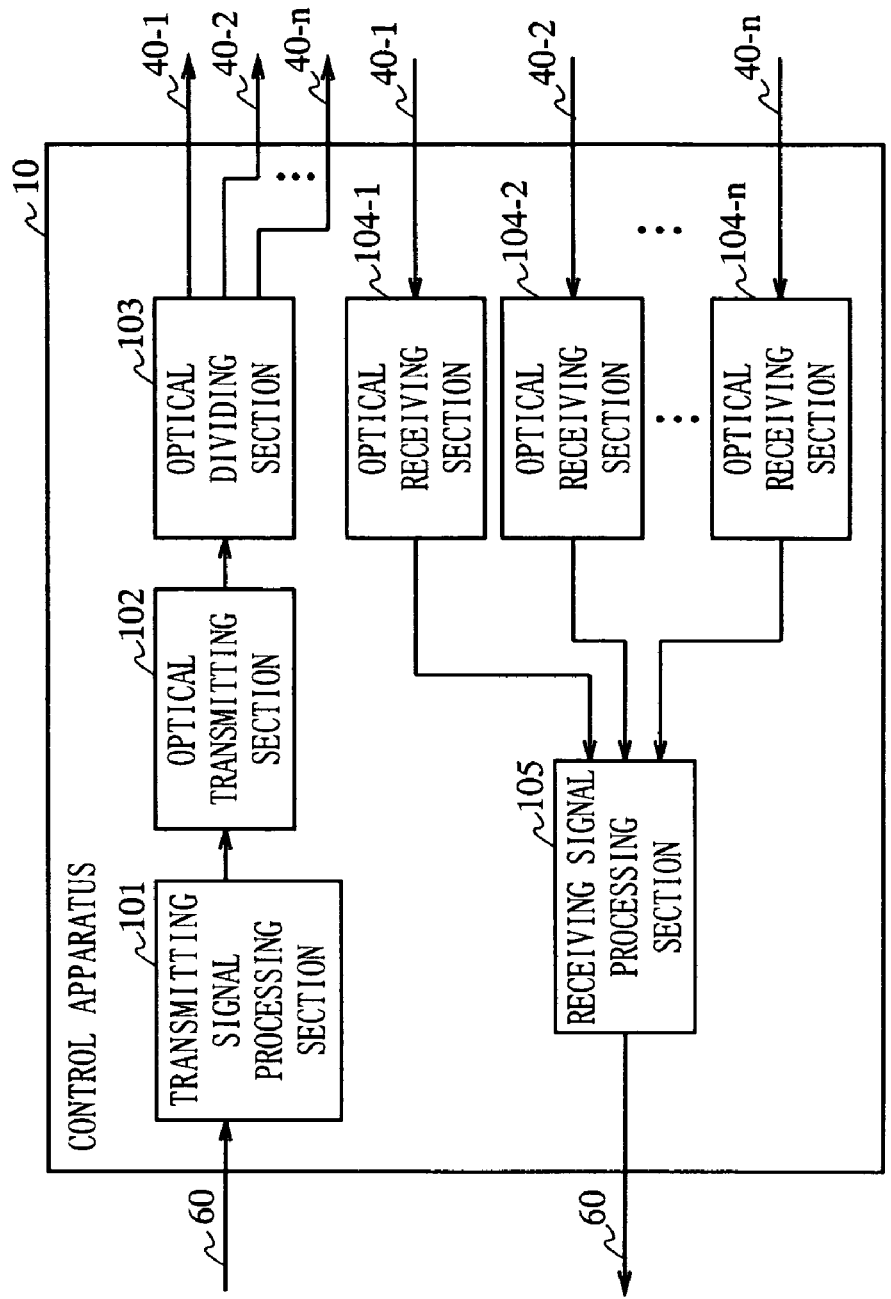
FIG. 2 is a block diagram showing a structure of a control apparatus shown in FIG. 1.

FIG. 2 is a block diagram showing a detailed structure of the control apparatus 10 shown in FIG. 1. In FIG. 2, the control pparatus 10 includes a transmitting signal processing section 101, an optical transmitting section 102, an optical dividing section 103, optical receiving sections 104-1 through 104-n, and a receiving signal processing section 105.

The transmitting signal processing section 101 modulates a signal transmitted from the external network via the Ethernet (registered trademark) cable 60 and outputs the modulated signal to the optical transmitting section 102.

The optical transmitting section 102 converts the signal modulated by the transmitting signal processing section 101 into a downstream optical signal and outputs the downstream optical signal to the optical dividing section 103.

The optical dividing section 103 divides the optical signal converted by the optical transmitting section 102 to n-number of downstream optical signals and transmits the n-number of downstream optical signals to the optical transmission paths 40-1 through 40-n.

The optical receiving sections 104-1 through 104-n, upon receiving upstream optical signals transmitted from the respective relay apparatuses 20-1 through 20-n via the optical transmission paths 40-1 through 40-n, convert the received upstream optical signals into electric signals.

The receiving signal processing section 105 demodulates the electric signals converted by the optical receiving sections 104-1 through 104-*n*. Then, the receiving signal processing section 105 transmits the demodulated signals to an external network via the Ethernet (registered trademark) cable 60. The receiving signal processing section 105 may perform signal processing other than demodulation of a signal. Such signal processing is, for example, simple addition, diversity receiving, RAKE receiving, amplitude adjustment, signal selection, etc.

Figure 3:
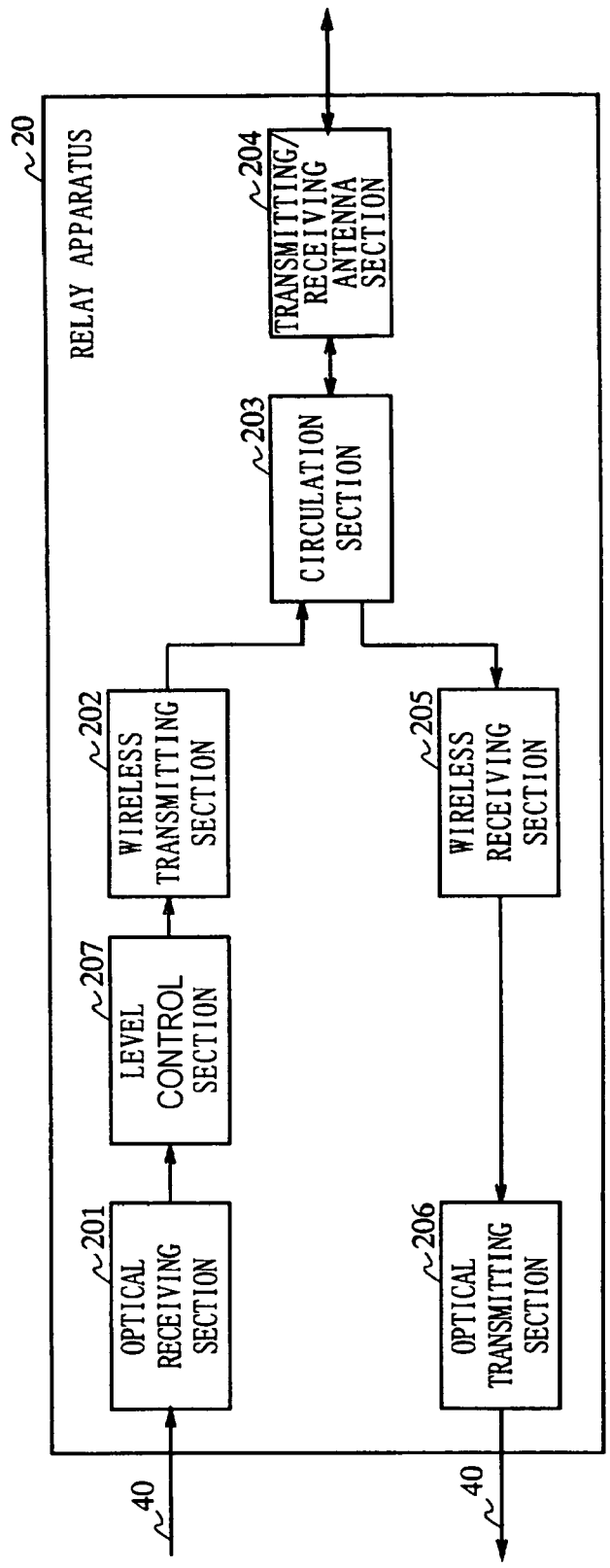
FIG. 3 is a block diagram showing a structure of a relay apparatus shown in FIG. 1.

FIG. 3 is a block diagram showing a detailed structure of the relay apparatus 20 shown in FIG. 1. In FIG. 3, the relay apparatus 20 includes an optical receiving section 201, a wireless transmitting section 202, a circulation section 203, a transmitting/receiving antenna section 204, a wireless receiving section 205, an optical transmitting section 206, and a level control section 207.

The optical receiving section 201, upon receiving a downstream optical signal transmitted from the control apparatus 10 via the optical transmission path 40, converts the received downstream optical signal into a downstream electric signal and outputs the downstream electric signal to the level control section 207.

The level control section 207 is, for example, an AGC (Automatic Gain Controller) amplifier, and controls the level of the downstream electric signal converted by the optical receiving section 201 and outputs the resultant signal to the wireless transmitting section 202. The level control section 207 adjusts the level of the downstream electric signal, such that the level of the wireless signal received by the relay apparatus 20 from the wireless communication terminal 30 is kept within a predetermined dynamic range. The details of the adjustment will be described later.

The wireless transmitting section 202 performs processing, such as amplification, on the downstream electric signal which is output from the level control section 207, and outputs the resultant signal to the circulation section 203.

The circulation section 203 outputs the downstream electric signal which is output from the wireless transmitting section 202 to the transmitting/receiving antenna section 204. The circulation section 203 also outputs an electric signal received by the transmitting/receiving antenna section 204 to the wireless receiving section 205.

The wireless receiving section 205 performs processing, such as amplification, on the upstream electric signal which is output from the circulation section 203, and outputs the resultant signal to the optical transmitting section 206.

The optical transmitting section 206 converts the upstream electric signal which is output from the wireless receiving section 205 into an upstream optical signal, and transmits the upstream optical signal to the optical transmission path 40.

The transmitting/receiving antenna section 204 transmits the downstream electric signal which is output from the circulation section 203 as a wireless signal to the air. The transmitting/receiving antenna section 204 also receives a wireless signal transmitted from the wireless communication terminal 30.

Figure 4A:
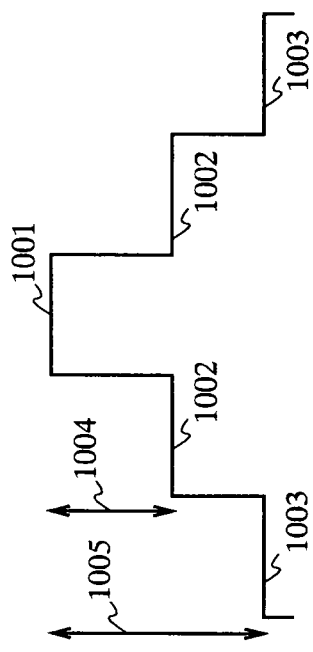
FIG. 4A is a diagram showing a spectrum of a wireless signal used in a wireless LAN in conformity to the IEEE802.11a Standard and received by the relay apparatus.

Here, how much the level of a downstream electric signal should be adjusted will be described. FIG. 4A is a diagram showing a spectrum of a wireless signal which is used in a wireless LAN in conformity to the IEEE802.11a Standard and is received by a relay apparatus. The wireless signal shown in FIG. 4A has a signal component 1001, a signal leakage component 1002, and a signal leakage component 1003. The signal component 1001 is a signal component which is to be received by the relay apparatus (a signal component to be transmitted by the wireless communication terminal), and the bandwidth of the signal component 1001 is about 20 MHz. Now, when amplifying the signal component to be transmitted by the wireless communication terminal to the relay apparatus, out-band frequency components with respect to the signal component to be transmitted are output due to the nonlinearity of the amplifier, in addition to the signal to be transmitted.

The signal leakage component 1002 is an out-band frequency component with respect to the signal component 1001, and is a component leaking to the channel closest to the signal component 1001 (hereinafter, referred to as an "adjacent channel"). The signal leakage component 1003 is an out-band frequency component with respect to the signal component 1001, and is a component leaking to the channel second closest to the signal component 1001 (hereinafter, referred to as an "second adjacent channel"). For the sake of simplicity, the following description will be given with the spectra of the signals being assumed to be at the same level.

In a wireless communication system, in the case where the modulation system of a wireless signal is 64 QAM (Quadrature Amplitude Modulation), normal communication is possible when the signal-to-jam ratio (hereinafter, referred to as a "D/U (Desired/Undesired) ratio") is about 22 dB or higher. The IEEE802.11a Standard regulates that when jamming from another channel exists, the dynamic range of the signal received by the relay apparatus must be about 32 dB at the maximum.

A leakage ratio 1004 is represented by a difference between the level of the signal leakage component 1002 and the level of the signal component 1001. A leakage ratio 1005 is a difference between the level of the signal leakage component 1003 and the level of the signal component 1001.

The ARIB STD-T71 regulates that the leakage ratio 1004 must be about −25 dB or lower and the leakage ratio 1005 to the second adjacent channel must be about −40 dB or lower.

In order to realize the D/U ratio of 22 dB and the leakage ratio to the adjacent channel of −25 dB or lower, the dynamic range of a wireless signal received from the wireless communication terminal needs to be 3 dB or lower. However, since it is difficult and is not practical to restrict the dynamic range of a received wireless signal to 3 dB or lower, signals of two adjacent channels cannot be used concurrently.

Figure 4B:
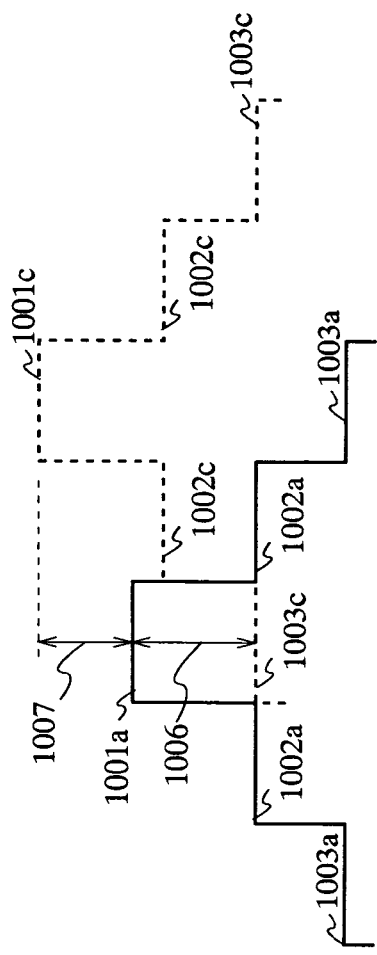
FIG. 4B is a diagram showing spectra of wireless LAN signals transmitted from first and second wireless communication terminals using two channels which are apart from each other by a two-channel distance.

Next, a case where two signals which are away from each other by a two-channel distance are used will be discussed. FIG. 4B is a diagram showing spectra of wireless LAN signals transmitted from first and second wireless communication terminals which use two channels that are away from each other by a two-channel distance.

The solid line represents the spectrum of signal a, and the dashed line represents a spectrum of signal c. Signal a transmitted from the first wireless communication terminal and signal c transmitted from the second wireless communication terminal belong to channels which are away from each other by a two-channel distance. Hereinafter, a case where signal a is jammed by a signal component leaking from signal c will be described.

Signal a has a signal component 1001*a*, a signal leakage component 1002*a*, and a signal leakage component 1003*a*. The signal component 1001*a* is a component of signal a which is to be received by the relay apparatus. The signal leakage component 1002*a* is an out-band frequency component with respect to the signal component 1001*a*, and is a component leaking to the adjacent channel to the signal component 1001*a*. The signal leakage component 1003*a* is an out-band frequency component with respect to the signal component 1001*a*, and is a component leaking to the second adjacent channel to the signal component 1001*a*.

Signal c has a signal component 1001*c*, a signal leakage component 1002*c*, and a signal leakage component 1003*c*.

The signal component 1001c is a component of signal c which is to be received by the relay apparatus. The signal leakage component 1002c is a component leaking to the adjacent channel to the signal component 1001c. The signal leakage component 1003c is a component leaking to the second adjacent channel to the signal component 1001c. A D/U ratio 1006 is a ratio of leakage from the second adjacent channel with respect to signal a, and is a difference between the level of the signal component 1001a and the level of the signal leakage component 1003c.

A level difference 1007 is a difference between the level of the signal component 1001a and the signal component 1001c. In the case where 64 QAM is used as the modulation system, it is understood that in order to guarantee the D/U ratio 1006 of 22 dB, the level difference 1007 may be 18 dB because the leakage ratio from the second adjacent channel is −40 dB. In other words, the difference between the level of signal a and the level of signal c can be 18 dB or lower when the dynamic range of the wireless signal received by the relay apparatus is 18 dB or lower.

Accordingly, the level control section 207 of the relay apparatus 20 is only required to adjust the power of the wireless signal which is transmitted from the relay apparatus 20 to the wireless communication terminal 30, such that the dynamic range of the wireless signal received by the relay apparatus is 18 dB or lower. Thus, in each channel used by the respective wireless communication terminal, by keeping the level of the wireless signal received by the relay apparatus within a range which is smaller than the difference between the leakage ratio to another channel and the D/U ratio, the relay apparatus can perform normal communication.

Figure 5:
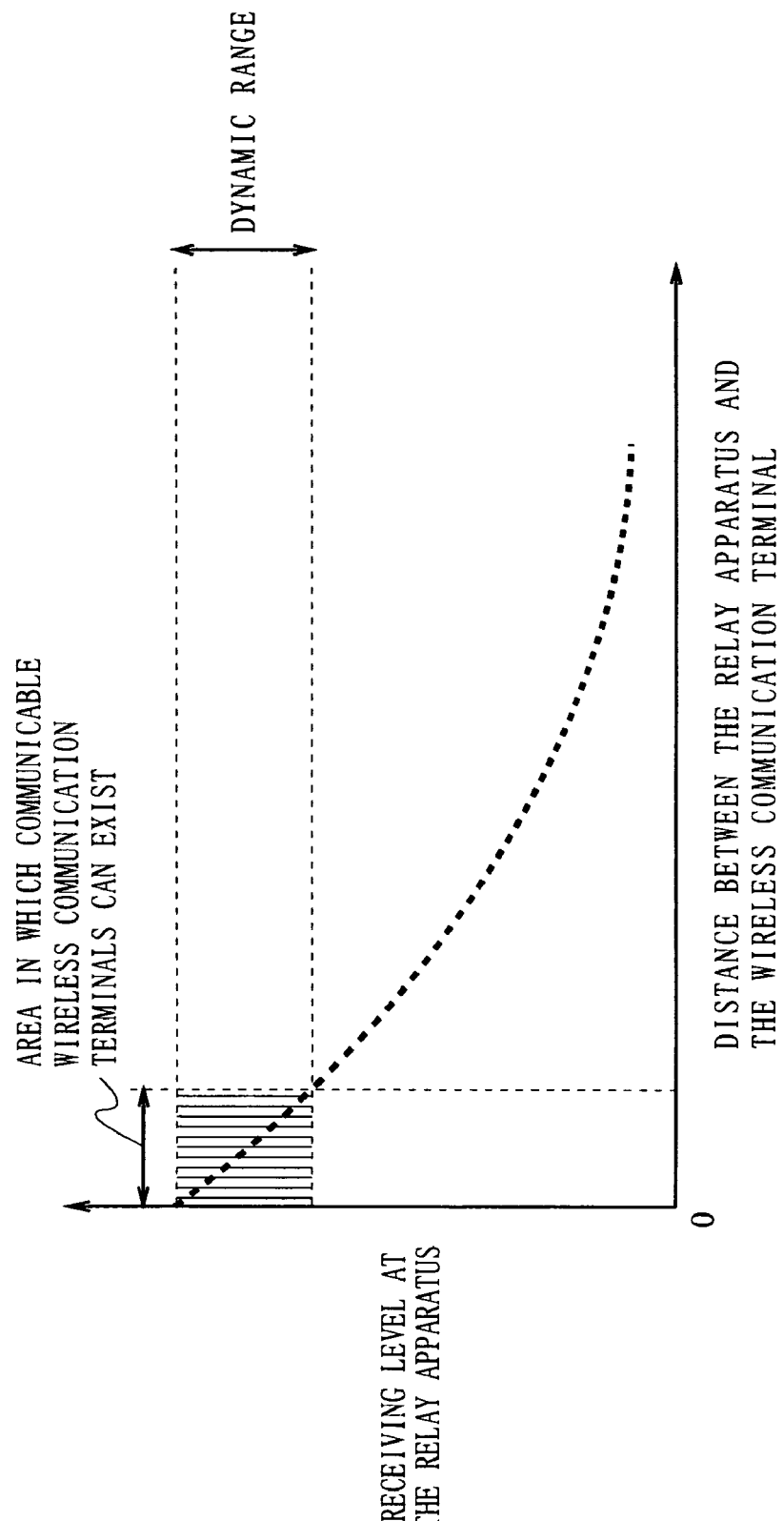
FIG. 5 is a graph representing the relationship between the level of a signal received by the relay apparatus and the distance between the relay apparatus and the wireless communication terminal.

FIG. 5 is a graph representing the relationship between the level of a signal received by the relay apparatus 20 and the distance between the relay apparatus 20 and the wireless communication terminal 30. In the graph shown in FIG. 5, the vertical axis represents the level of a wireless signal received by the relay apparatus 20, and the horizontal axis represents the distance between the relay apparatus 20 and the wireless communication terminal 30.

As shown in FIG. 5, the level of a wireless signal received by the relay apparatus 20 depends on the distance thereof from the wireless communication terminal. For example, when the wireless signal received by the relay apparatus 20 is jammed by another channel, the relay apparatus 20 decreases the power of the wireless signal to be transmitted to the wireless communication terminal 30. This narrows the area in which the wireless communication terminals 30 communicable with the relay apparatus 20 can exist. Namely, the dispersion in the distance between the relay apparatus and the wireless communication terminals is reduced. Since the dispersion among the wireless signals transmitted from the wireless communication terminals existing in the narrowed wireless communication area and received by the relay apparatus 20 can be thus reduced, the received wireless signals can be kept within a predetermined dynamic range (the part indicated by the vertical stripes in FIG. 5).

As described above, in this embodiment, the relay apparatus adjusts the power of a wireless signal to be transmitted to a wireless communication terminal. This can adjust the area in which the communicable wireless communication terminals can exist. Therefore, the levels of the wireless signals transmitted from the wireless communication terminals and received by the relay apparatus can be kept within a predetermined dynamic range. As a result, wireless LAN signals of a plurality of channels can be used for communication in one area without being jammed by a signal from another channel.

It should be noted that n number of downstream optical signals transmitted from the control apparatus, and n number of upstream optical signals transmitted from the relay apparatus, respectively correspond to the optical transmission paths 40-1 through 40-n shown in FIG. 1. In the case where an upstream optical signal and a downstream optical signal are transmitted via different transmission paths, the optical transmission paths 40-1 through 40-n are each composed of a two-core optical fiber. In the case of one-core bidirectional transmission, the optical transmission paths 40-1 through 40-n are each composed of a one-core optical fiber.

In this embodiment, the case where the modulation system is 64 QAM has been described. In the case where other modulation systems are used, the required D/U ratio is lowered. Accordingly, even when adjacent channels are used concurrently, communication is made possible by suppressing the dynamic range. In this case also, how much the dynamic range should be suppressed may be determined in substantially the same manner as in this embodiment.

In this embodiment, in the case where the level of the wireless signal received by the relay apparatus is so high that the signal is distorted when converted into an upstream optical signal, the relay apparatus may include an attenuator for attenuating the level of the received wireless signal. This can realize high quality optical transmission of wireless signals.

Figure 6:
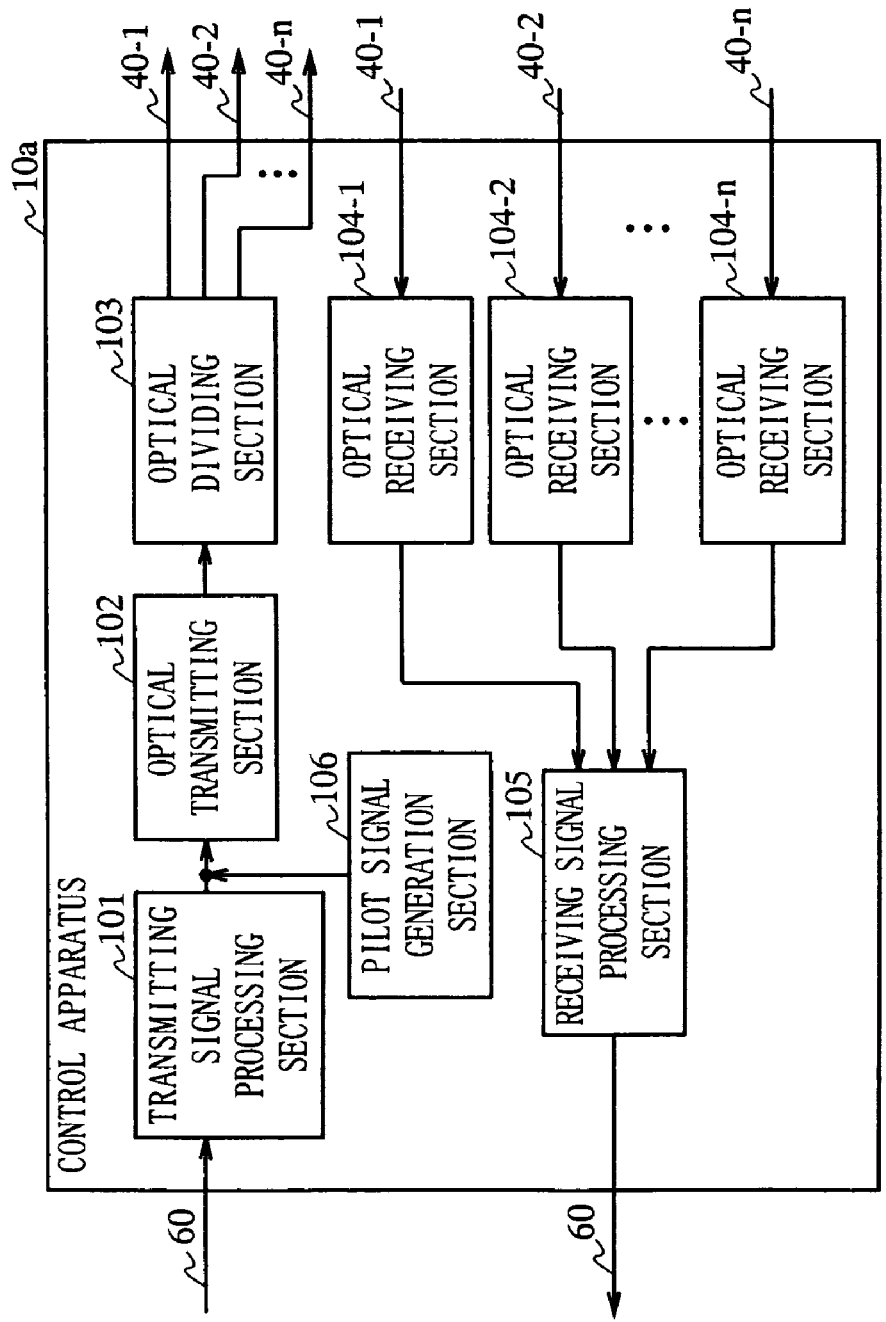
FIG. 6 is a block diagram showing a structure of a control apparatus according to a variation of Embodiment 1 of the present invention.

Next, a variation of Embodiment 1 will be described. FIG. 6 is a block diagram showing a structure of a control apparatus 10a included in a wireless communication system according to this variation. The control apparatus 10a is different from the control apparatus 10 shown in FIG. 2 in further including a pilot signal generation section 106. The other parts of the structure are substantially the same as those of Embodiment 1, and elements which are substantially the same as those of FIG. 2 bear identical reference numerals thereto and descriptions thereof will be omitted.

The pilot signal generation section 106 generates a pilot signal and outputs the pilot signal to the optical transmitting section 102. A pilot signal is a signal for controlling the level of a wireless signal which is transmitted from the relay apparatus, and has a lower frequency than that of the transmitted wireless signal. The level of the pilot signal is in proportion to the level of the wireless signal to be transmitted from the relay apparatus. When the wireless signal received by the relay apparatus 20 is jammed by a signal of another channel, the pilot signal generation section 106 increases the level of the pilot signal to be generated.

The optical transmitting section 102 superposes the pilot signal generated by the pilot signal generation section 106 on a downstream electric signal which is output from the transmitting signal processing section 101 and converts the resultant signal into a downstream optical signal.

Figure 7:
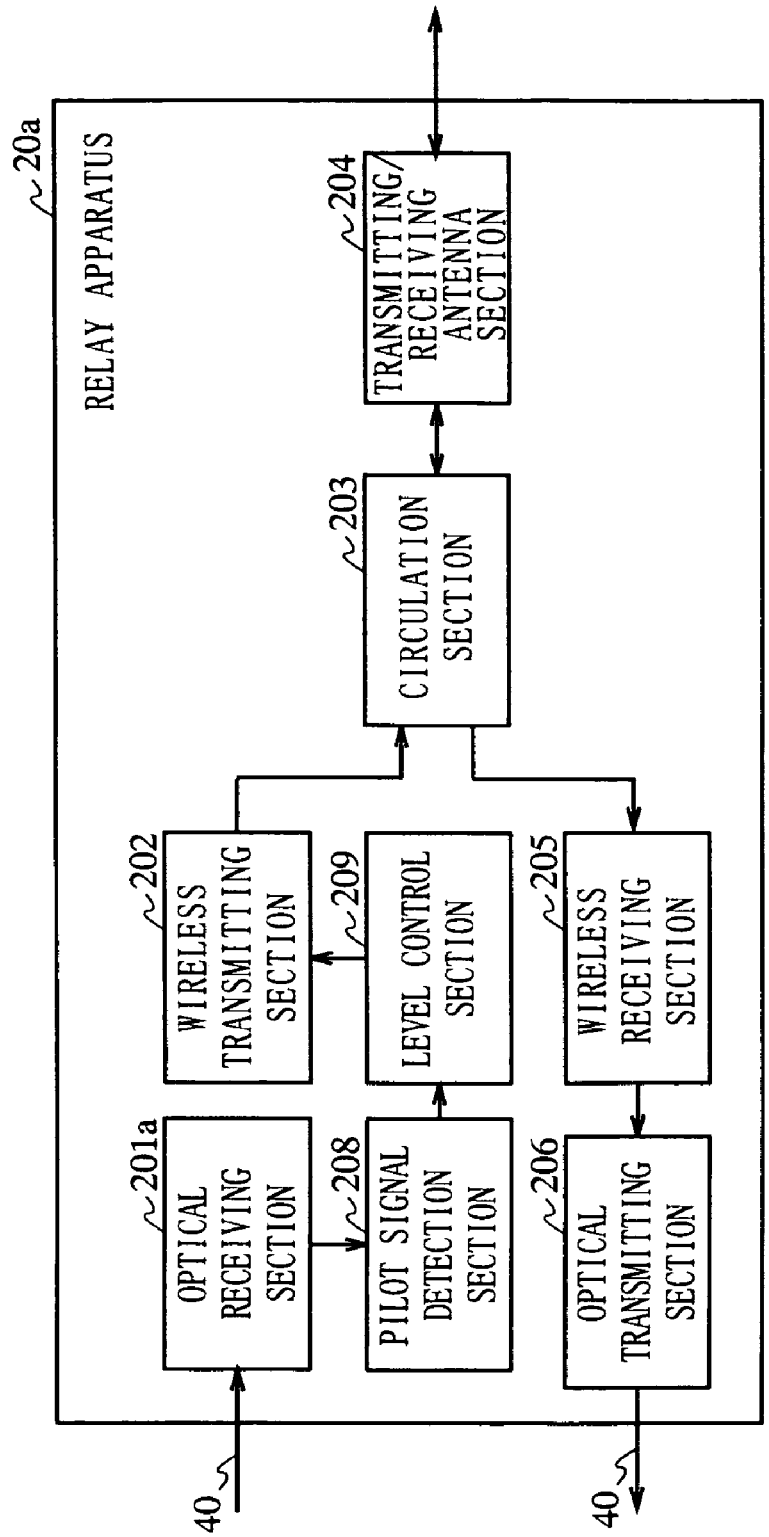
FIG. 7 is a block diagram showing a structure of a relay apparatus according to the variation of Embodiment 1.

FIG. 7 is a block diagram showing a structure of a relay apparatus 20a included in the wireless communication system according to this variation. The relay apparatus 20a shown in FIG. 7 includes an optical receiving section 201a, a wireless transmitting section 202a, a circulation section 203a, a transmitting/receiving antenna section 204, a wireless receiving section 205, an optical transmitting section 206, a pilot signal detection section 208, and a level control section 209. Elements which are substantially the same as those of FIG. 3 bear identical reference numerals thereto and descriptions thereof will be omitted.

The optical receiving section 201a converts a downstream optical signal transmitted from the control apparatus 10 via the optical transmission path 40 into a downstream electric signal and outputs the downstream electric signal to the pilot signal detection section 208.

The pilot signal detection section 208 detects the level of the pilot signal superposed on the downstream electric signal and outputs the downstream electric signal to the level control section 209 together with the detected level.

The level control section 209 adjusts the level of the downstream electric signal and outputs the resultant signal to the wireless transmitting section 202. The level control section 209 adjusts the level of the downstream electric signal based on the level of the pilot signal detected by the pilot signal detection section 208, such that the level of the pilot signal is kept constant. In other words, the level control section 209 amplifies the downstream electric signal when the level of the pilot signal is relatively low, and oppositely, attenuates the downstream electric signal when the level of the pilot signal is relatively high.

In general, it is difficult to accurately detect the level of a frequency-modulated wireless signal. Especially when amplitude modulation, burst modulation or spread spectrum signal modulation is used as the modulation system, it is difficult to accurately detect the level of the wireless signal. However, the above-described method, which merely requires that the relay apparatus 20 should detect the amplitude of the pilot signal, allows the level of the wireless signal to be easily estimated.

As described above, in this variation, in the case where an upstream optical signal transmitted from the relay apparatus cannot be accurately demodulated, the control apparatus increases the level of the pilot signal to be generated. The relay apparatus lowers the level of the downstream electric signal such that the level of the pilot signal received from the control apparatus is kept constant. This can narrow the communicable range of the relay apparatus and thus can keep the levels of wireless signals received from the wireless communication terminals within a predetermined dynamic range. Therefore, wireless LAN signals of a plurality of channels can be used for communication in one area without being jammed by a signal from another channel.

Embodiment 2

Figure 8:
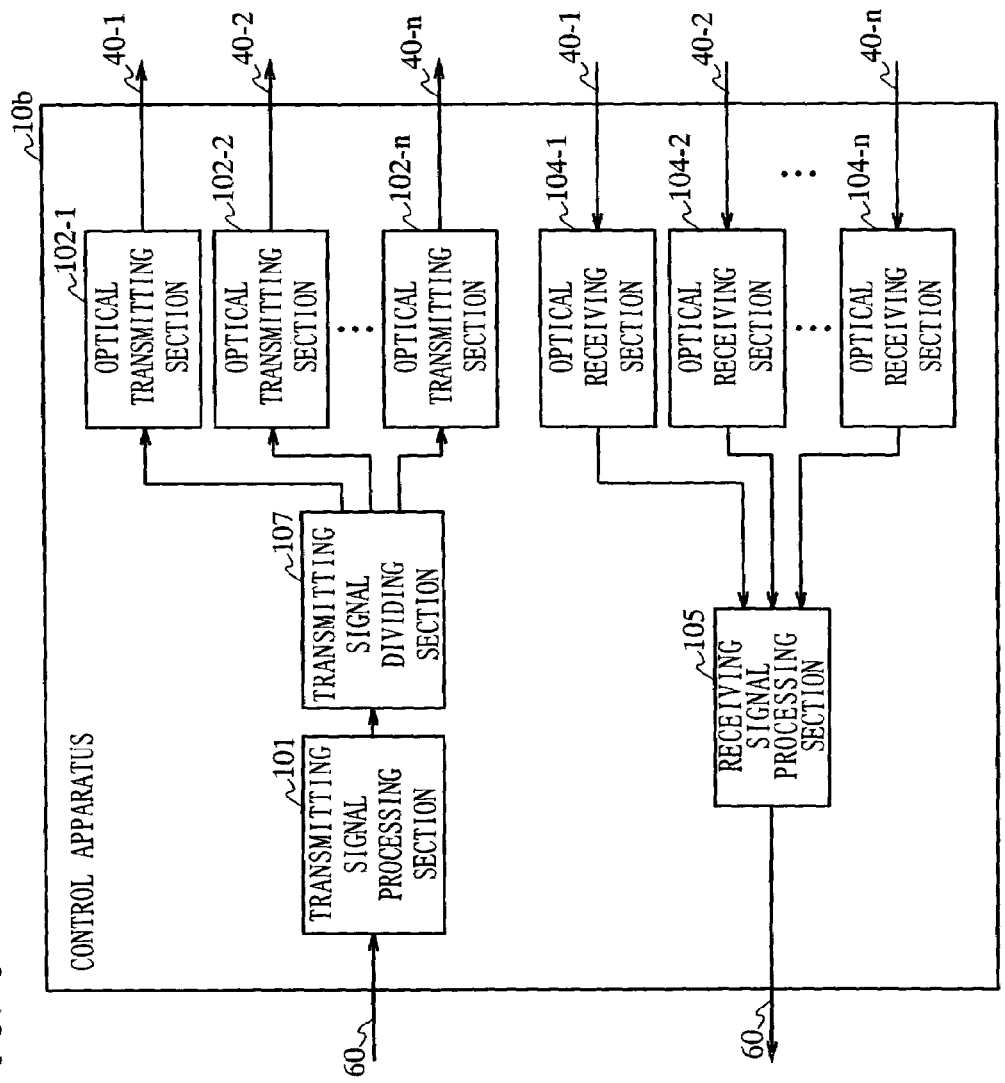
FIG. 8 is a block diagram showing a structure of a control apparatus included in a wireless communication system according to Embodiment 2 of the present invention.

FIG. 8 is a block diagram showing a structure of a control apparatus 10b included in a wireless communication system according to Embodiment 2 of the present invention.

The control apparatus 10b shown in FIG. 8 is different from the control apparatus 10 shown in FIG. 2 in including a transmitting signal dividing section 107 instead of the optical dividing section 103. The other parts of the structure are substantially the same as those of Embodiment 1, and elements which are substantially the same as those of FIG. 2 bear identical reference numerals thereto and descriptions thereof will be omitted. In this embodiment, the relay apparatus 20 has the structure shown in FIG. 3 except that the level control section 207 is not included.

In the control apparatus 10b, the transmitting signal processing section 101 modulates a signal transmitted from an external network and outputs the modulated signal to the transmitting signal dividing section 107.

The transmitting signal dividing section 107 divides the signal modulated by the transmitting signal processing section 101 into n number of signals. Then, the transmitting signal dividing section 107 outputs the divided n number of signals to optical transmitting sections 102-1 through 102-n, respectively.

The optical transmitting sections 102-1 through 102-n convert the signals divided by the transmitting signal dividing section 107 into downstream optical signals, and transmit the downstream optical signals to the optical transmission paths 40-1 through 40-n. Optical transmission of the n number of downstream optical signals to respective stations is performed in this manner.

With the above-described structure, the transmitting signal dividing section 107 outputs the divided electric signals to the optical transmitting sections 102-1 through 102-n, and this can decrease the optical power which is output by each optical transmitting section. Since this lowers the level of the downstream optical signals, the level of the wireless signals transmitted by the relay apparatus can be lowered.

As described above, according to this embodiment, the control apparatus lowers the level of an optical signal to be transmitted to the relay apparatus. This lowers the power of a wireless signal transmitted from the relay apparatus to a wireless communication terminal. Since this narrows the area in which communicable wireless communication terminals can exist, the dynamic range of the wireless signals transmitted from the wireless communication terminals and received by the relay apparatus 20 is decreased. Therefore, wireless LAN signals of a plurality of channels can be used for communication in one area without being jammed by a signal from another channel.

In addition, since the divided downstream electric signals are converted into downstream optical signals by the optical transmitting sections, the level of the electric signal which is input to each optical transmitting section is decreased. When an electric signal having a high level is converted into an optical signal, the signal is likely to be distorted. Therefore, the reliability of an optical source (light emitting element) included in the optical transmitting section in this embodiment for converting an electric signal having a low level is improved. Moreover, since the electric signals to be processed have a low level, an inexpensive optical source can be used. Furthermore, in the case where an optical signal which is output from one optical source is divided, once the optical source malfunctions, the functions of the entire system are lost. However, according to this embodiment, even when one optical source malfunctions, only the optical transmitting section having that optical source stops functioning. Therefore, only the relay apparatus corresponding to that optical transmitting section which has stopped functioning stops working, and thus the influence on the entire system can be reduced.

In this embodiment, n number of upstream optical signals which are transmitted from the relay apparatuses are received by optical receiving sections 104-1 through 104-n, respectively. Alternatively, the n number of upstream optical signals can be collectively received as one optical signal.

Figure 9:
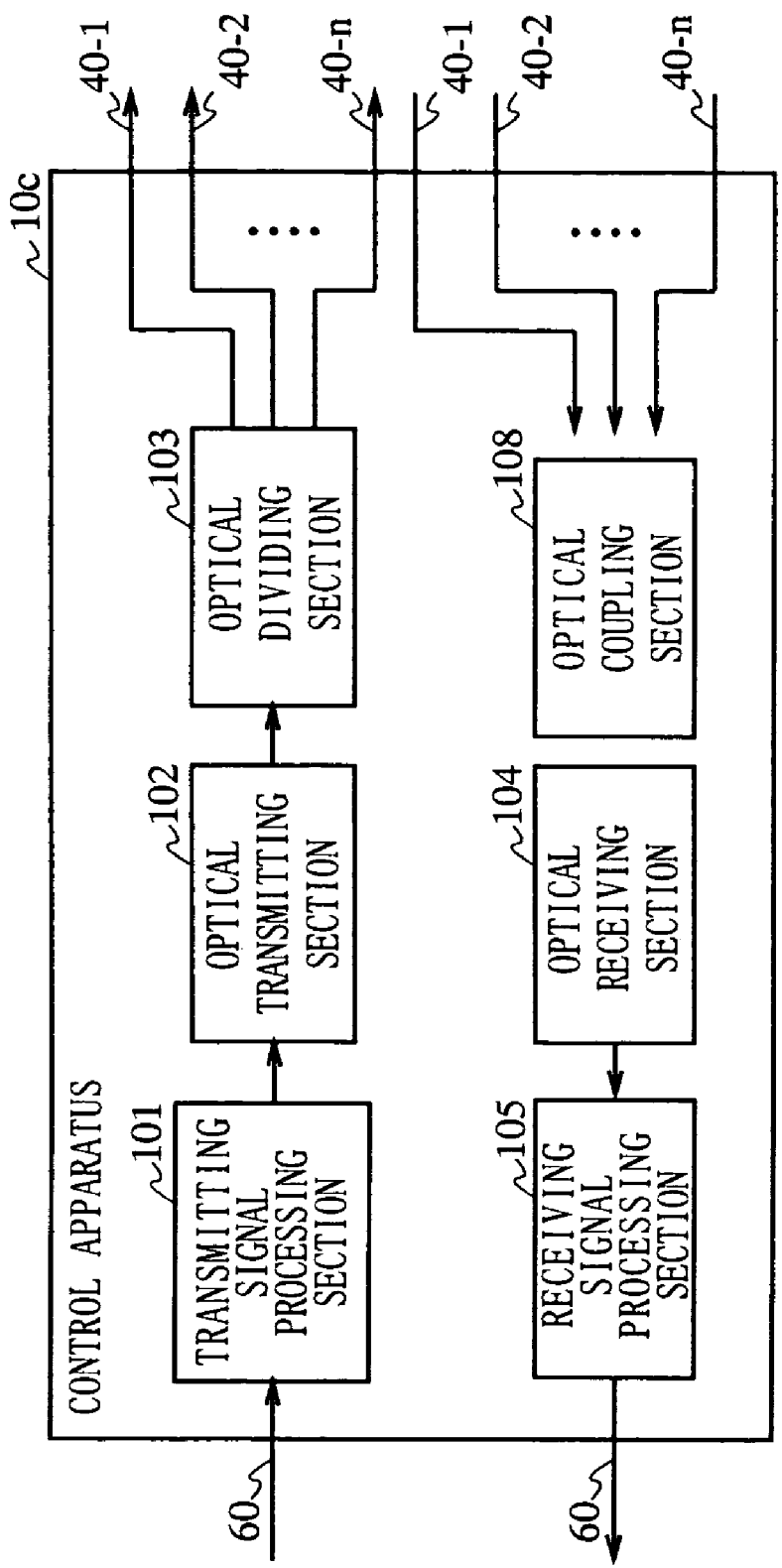
FIG. 9 is a block diagram showing a structure of a control apparatus for collectively receiving upstream optical signals.

FIG. 9 is a block diagram showing a structure of a control apparatus 10c for collectively receiving upstream optical signals. The control apparatus shown in FIG. 9 is different from the control apparatus 10 shown in FIG. 2 in further including an optical coupling section 108 and including one optical receiving section. The other parts of the structure are substantially the same as those of Embodiment 1, and elements which are substantially the same as those of FIG. 2 bear identical reference numerals thereto and descriptions thereof will be omitted.

The optical coupling section 108 couples n number of upstream optical signals which are transmitted via the optical transmission paths 40-1 through 40-n into one optical signal and outputs the one optical signal to the optical receiving section 104.

The optical receiving section 104 converts the upstream optical signal coupled together by the optical coupling section 108 into an upstream electric signal and outputs the electric signal to the receiving signal processing section 105.

With the above-described structure, the control apparatus can collectively receive a plurality of upstream optical signals as one optical signal. Therefore, the control apparatus requires only one optical receiving section, which simplifies the structure of the system. Thus, the system can be constructed at low cost. It should be noted that when the wavelengths of the plurality of upstream optical signals are close to one another, beat is generated. When a plurality of upstream optical signals having frequencies close to one another are received by one optical receiving section, swell of frequencies (beat) may be generated. In this case, the control apparatus may include some function for preventing generation of beat.

Next, a first variation of this embodiment will be described. In this variation, the control apparatus adjusts the optical modulation index of an optical signal to be transmitted. The optical modulation index refers to the degree at which the amplitude of a carrier wave modulated by an optical signal is changed.

Figure 10:
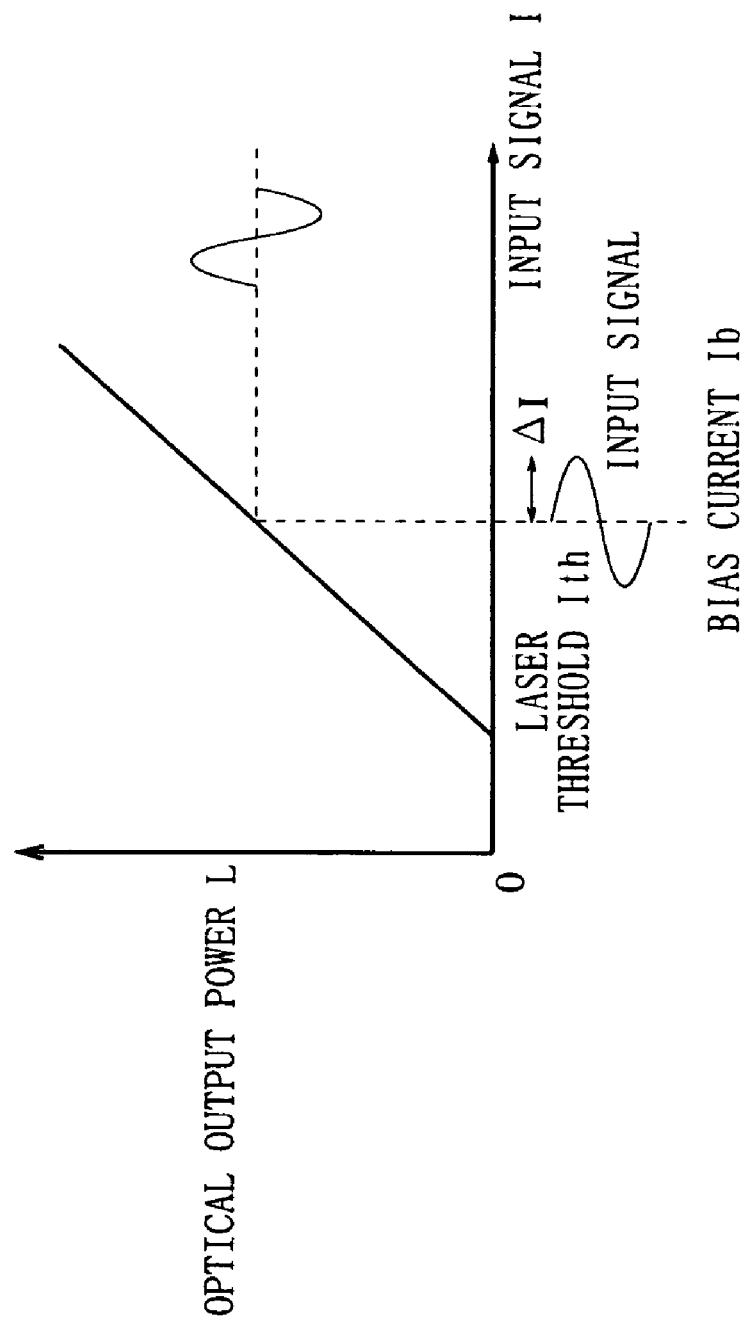
FIG. 10 is a diagram showing the relationship between the input signal which is input to a light emitting element and the optical output power (laser IL characteristic)

FIG. 10 shows the relationship between the input signal which is input to a light emitting element and the optical output power (laser IL characteristic). In FIG. 10, the horizontal axis represents the electric current value of the input signal which is input to the light emitting element, and the vertical axis represents the power of the optical signal which is output from the light emitting element.

Here, the optical modulation index m is represented by:

$$m = \Delta I / (Ib - Ith) \quad (1)$$

In equation (1), $\Delta I$ represents the electric current value of the input signal, and Ib represents the bias current value. Ith is the laser threshold value (the lowest output excitation level) of the light emitting element (not shown).

A bias current is a DC current for driving the light emitting element included in the optical transmitting section. The bias current also provides the central point of change of a transmitting signal, which is an AC signal.

By adjusting the optical modulation index of an optical signal transmitted from the control apparatus, the level of the wireless signal transmitted from the relay apparatus can be indirectly adjusted.

Figure 11:
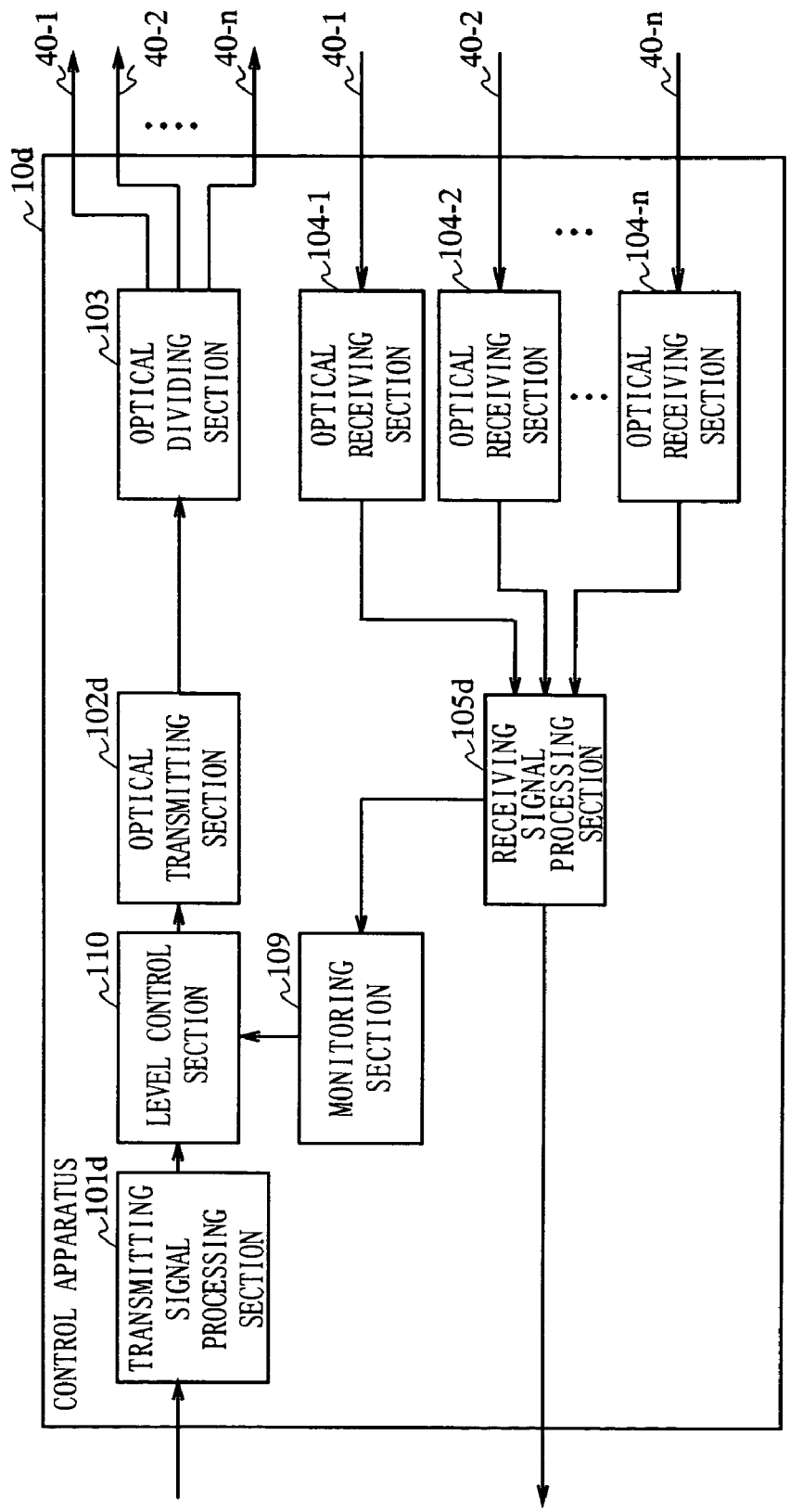
FIG. 11 is a block diagram showing a structure of a control apparatus included in a wireless communication system according to a variation of Embodiment 2.

FIG. 11 is a block diagram showing a structure of a control apparatus 10d included in a wireless communication system according to this variation. In FIG. 11, the control apparatus 10d includes a transmitting signal processing section 101d, an optical transmitting section 102d, an optical dividing section 103, optical receiving sections 104-1 through 104-n, a receiving signal processing section 105d, a monitoring section 109, and a level control section 110.

The receiving signal processing section 105d outputs upstream electric signals converted by the optical receiving sections 104-1 through 104-n to the monitoring section 109.

The monitoring section 109 evaluates the quality of each of the upstream electric signals which are output from the receiving signal processing section 105d, and determines whether each upstream electric signal is jammed by another channel or not. In the case where a signal of another channel leaks to the upstream electric signal and the quality of the upstream electric signal is deteriorated, the monitoring section 109 instructs the level control section 110 to lower the level of the input signal to be output to the optical transmitting section 102d.

The transmitting signal processing section 101d outputs the modulated transmitting signal to the level control section 110.

The level control section 110 controls a variable attenuator (not shown) or a variable amplifier (not shown) provided on the stage before the optical transmitting section 102. This adjusts the level of the transmitting signal. The level control section 110 outputs the signal of the adjusted level to the optical transmitting section 102d.

The optical transmitting section 102d converts the transmitting signal into a downstream optical signal and outputs the downstream optical signal to the optical transmission path 40. At this point, if the level of the transmitting signal is lowered, the optical modulation index is lowered. Accordingly, the power of the downstream optical signal which is output from the optical transmitting section 102d is lowered.

In the case where the optical receiving section 201 of the relay apparatus detects an average electric current, flowing in an optical receiving element and corresponding to the average received optical amount, and detects the level of the wireless signal based on the average value, the average electric current flowing in the optical receiving element does not change even if the optical modulation index of the downstream optical signal is changed. Accordingly, the operation of the relay apparatus 20 is substantially the same as that in Embodiment 1 described above. In this case, the relay apparatus 20 does not need to include the level control section 207 shown in FIG. 3.

As described above, when the control apparatus 10 increases the optical modulation index of the optical signal to be transmitted to the relay apparatus 20, the power of the wireless signal transmitted from the relay apparatus is increased. By contrast, when the control apparatus decreases the optical modulation index of the optical signal to be transmitted to the relay apparatus 20, the power of the wireless signal transmitted from the relay apparatus is decreased. In other words, the control apparatus can control the power of the wireless signal to be transmitted from the relay apparatus. Accordingly, the dynamic range of the wireless signal received by the relay apparatus can be controlled.

As described above, according to this variation, the control apparatus evaluates the quality of a signal transmitted from the relay apparatus. When the quality of the upstream signal does not fulfill a predetermined condition, the control apparatus lowers the level of the optical signal to be transmitted to the relay apparatus. This lowers the power of the wireless signal transmitted from the relay apparatus to a wireless communication terminal. Since this narrows the area in which communicable wireless communication terminals can exist, the dynamic range of a wireless signal transmitted from a wireless communication terminal and received by there lay apparatus is lowered. Therefore, wireless LAN signals of a plurality of channels can be used for communication in one area without being jammed by a signal from another channel.

It should be noted that the monitoring section 109 may be structured such that, upon detecting that the quality of the signal is deteriorated, the monitoring section 109 notifies that to the relay apparatus via the optical transmitting section 102 and controls the transmitting power of the wireless signal transmitted from the relay apparatus to be lowered. In this case, the control apparatus does not need to include the level control section.

Alternatively, the control apparatus may generate an instruction for controlling the level of the wireless signal transmitted from the relay apparatus and transmit the instruction to the relay apparatus as digital information.

So far, methods for controlling the level of an input signal for adjusting the optical modulation index have been described. In order to adjust the optical modulation index, the level of the bias current may be controlled.

Figure 12:
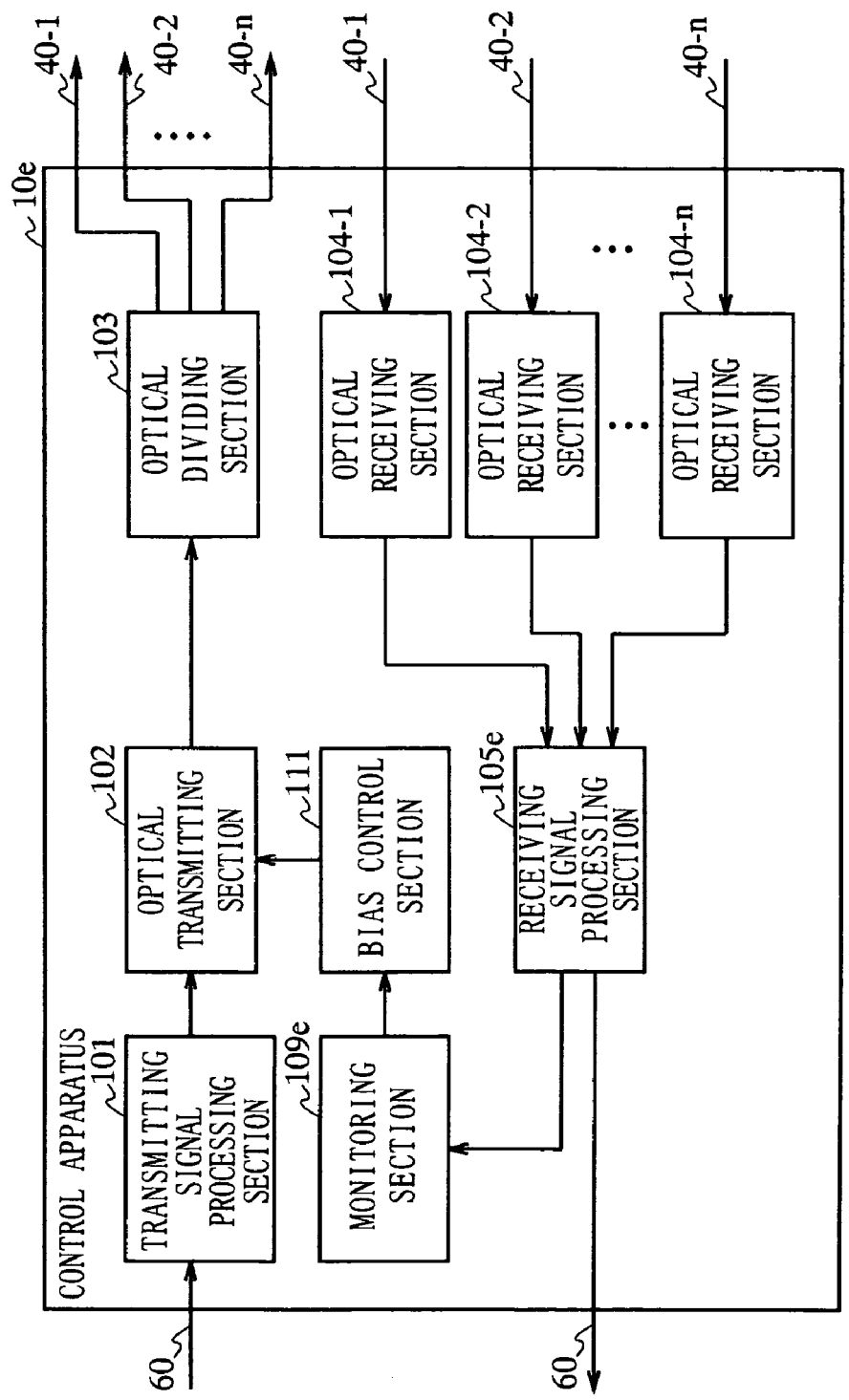
FIG. 12 is a block diagram showing a structure of a control apparatus for adjusting an optical modulation index by controlling the level of a bias current.

FIG. 12 is a block diagram showing a structure of a control apparatus 10e for adjusting the optical modulation index by controlling the level of the bias current.

The control apparatus 10e shown in FIG. 12 includes a transmitting signal processing section 101, an optical transmitting section 102, an optical dividing section 103, optical receiving sections 104-1 through 104-n, a receiving signal processing section 105e, a monitoring section 109e, and a bias control section 111. Elements which are substantially the same as those of FIG. 11 bear identical reference numerals thereto and descriptions thereof will be omitted.

The transmitting signal processing section 101 outputs a modulated transmitting signal to the optical transmitting section 102.

The monitoring section 109e evaluates the quality of an upstream electric signal which is output from the receiving signal processing section 105e, and determines whether the upstream electric signal is jammed by another channel or not. In the case where a signal of another channel leaks to the upstream electric signal and the quality of the upstream electric signal is deteriorated, the monitoring section 109e instructs the bias control section 111 to lower the level of the bias current to be output to the optical transmitting section 102.

The bias control section 111, in accordance with the instruction from the monitoring section 109e, adjusts the bias current which is to be input to a light emitting element of the optical transmitting section 102. Specifically, the bias control section 111 adjusts the bias current which is to be input to the light emitting element by controlling a bias circuit (not shown) for driving the light emitting element.

The optical transmitting section 102 converts the transmitting signal into a downstream electric signal and outputs the downstream electric signal to the optical transmission path 40. At this point, since the level of the bias current is lowered, the optical modulation index is lowered. Accordingly, the power of the downstream optical signal which is output from the optical transmitting section 102 is lowered.

As described above, according to this variation, the control apparatus evaluates the quality of a signal transmitted from the relay apparatus, and when the quality of the upstream signal does not fulfill a predetermined condition, lowers the level of the optical signal to be transmitted to the relay apparatus. This lowers the power of the wireless signal transmitted from the relay apparatus to a wireless communication terminal. Since this narrows the area in which communicable wireless communication terminals can exist, the dynamic range of a wireless signal transmitted from a wireless communication terminal and received by the relay apparatus 20 is decreased. Therefore, wireless LAN signals of a plurality of channels can be used for communication in one area without being jammed by a signal from another channel.

In this embodiment, means for adjusting the power of an optical signal to be transmitted by the control apparatus has been described. Such means is not limited to the above-described means and may be any means which is capable of adjusting the power of a downstream optical signal. For example, a power adjustment section for adjusting the power of a downstream optical signal may be included in the control apparatus.

Figure 13:
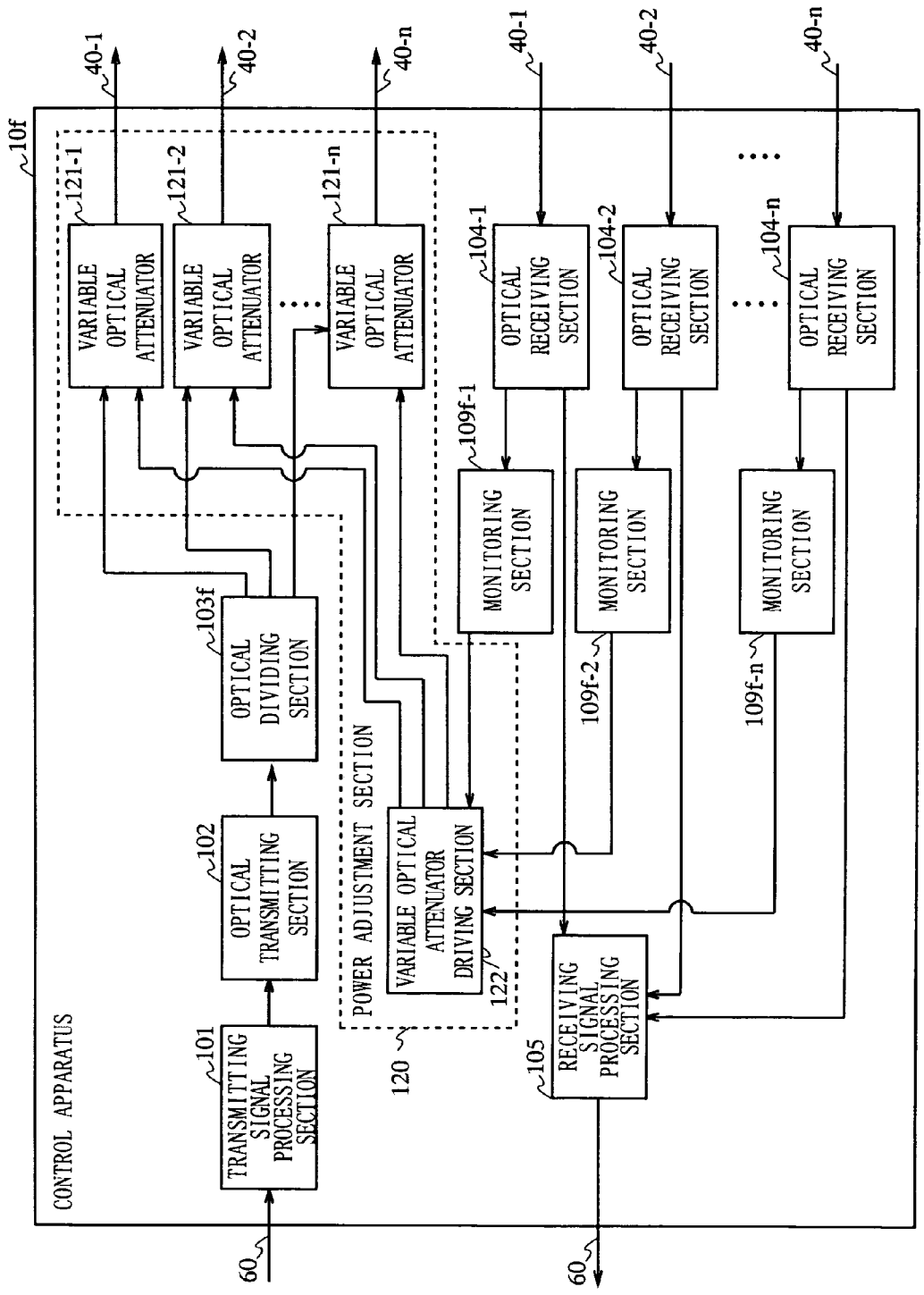
FIG. 13 is a block diagram showing a structure of a control apparatus for adjusting the power of a downstream optical signal.

FIG. 13 is a block diagram showing a structure of a control apparatus 10f for adjusting the power of a downstream optical signal. In FIG. 13, the control apparatus 10f includes a transmitting signal processing section 101, an optical transmitting section 102, an optical dividing section 103f, optical receiving sections 104-1 through 104-n, a receiving signal processing section 105, monitoring sections 109f-1 through 109f-n, and a power adjustment section 120. Elements which are substantially the same as those of FIG. 12 bear identical reference numerals thereto and descriptions thereof will be omitted.

The optical dividing section 103f outputs downstream optical signals divided to n number of signals to variable optical attenuators 121-1 through 121-n described below.

The monitoring sections 109f-1 through 109f-n monitor the quality of upstream optical signals received by the optical receiving sections 104-1 through 104-n. The monitoring sections 109f-1 through 109f-n, when the quality of the respective upstream optical signal is deteriorated, instruct a variable optical attenuator driving section 122 to lower the level of the downstream optical signal which is output from the optical dividing section 103.

The power adjustment section 120 includes the variable optical attenuators 121-1 through 121-n and the variable optical attenuator driving section 122, and adjusts the power of a downstream optical signal which is output from the optical transmitting section 102f.

The variable optical attenuators 121-1 through 121-n attenuate the power of the downstream optical signals which are output from the optical dividing section 103f and transmit the resultant signals to the optical transmission paths 40-1 through 40-n.

The variable optical attenuator driving section 122, in accordance with the instruction from the monitoring sections 109f-1 through 109f-n, adjusts the level of the electric current for driving the variable optical attenuators 121-1 through 121-n, such that the power of the downstream optical signal which is output from the optical dividing section 103f is lowered.

As described above, when the quality of an upstream optical signal transmitted from the relay apparatus is deteriorated, the control apparatus lowers the power of the downstream optical signal to be transmitted to the relay apparatus. Accordingly, the power of the wireless signal transmitted from the relay apparatus can be lowered.

Embodiment 3

Hereinafter, a wireless communication system according to Embodiment 3 of the present invention will be described. The wireless communication system according to this embodiment, upon detecting that the quality of an optical signal is deteriorated, stops transmission of the wireless signal from a relay apparatus. When a wireless signal with deteriorated quality is transmitted or received, other communication devices or human body may possibly be adversely influenced. Therefore, when communicating using a wireless signal, the quality of the wireless signal transmitted by a communication device needs to fulfill the public conditions regulated by the Radio Law. In this embodiment, an exemplary case where the wireless communication system evaluates the quality of an optical signal will be described.

Figure 14:
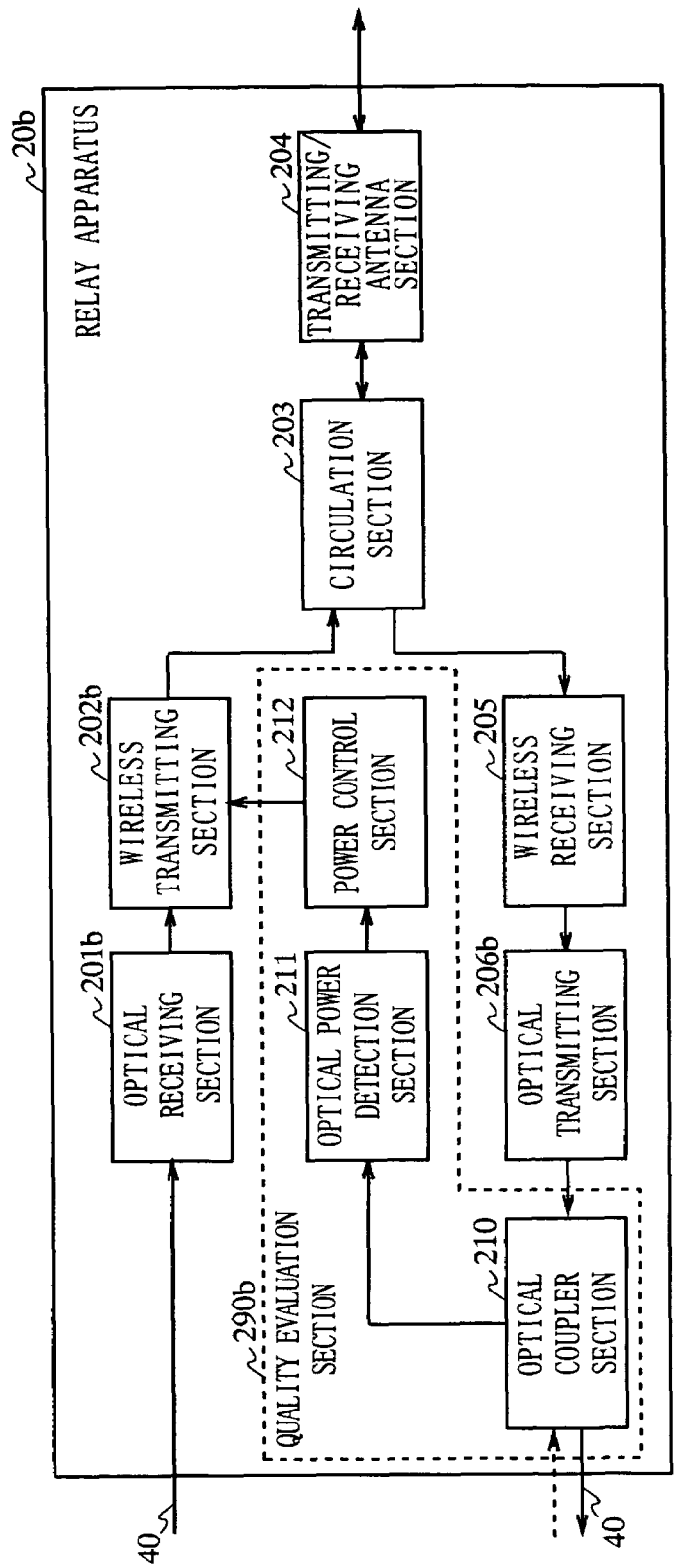
FIG. 14 is a block diagram showing a structure of a relay apparatus included in a wireless communication system according to Embodiment 3 of the present invention.

FIG. 14 is a block diagram showing a structure of a relay apparatus 20b included in a wireless communication system according to this embodiment. In FIG. 14, the relay apparatus 20b includes an optical receiving section 201b, a wireless transmitting section 202b, a circulation section 203, a transmitting/receiving antenna section 204, a wireless receiving section 205, an optical transmitting section 206b, and a quality evaluation section 290b. Elements which are substantially the same as those of FIG. 3 bear identical reference numerals thereto and descriptions thereof will be omitted.

A downstream optical signal transmitted from a control apparatus 10 via the optical transmission path 40 is converted into a downstream electric signal via the optical receiving section 201b. The optical receiving section 201b outputs the converted downstream electric signal to the wireless transmitting section 202b.

On the other hand, the optical transmitting section 206b converts an upstream electric signal which is output from the wireless receiving section 205 into an upstream optical signal and outputs the upstream optical signal to an optical coupler section 210 described below.

The quality evaluation section 290b includes the optical coupler section 210, an optical power detection section 211, and a power control section 212.

The optical coupler section 210 transmits the upstream optical signal converted by the optical transmitting section 206b to the optical transmission path 40. The optical coupler section 210 also outputs light reflected by the optical transmission path 40 to the optical power detection section 211.

The optical power detection section 211 detects the level of the reflected light which is output from the optical coupler section 210, and determines whether or not the level of the reflected light is a predetermined value or higher. In the case where abnormality occurs in the optical transmission path 40, the level of the reflected light when an optical signal is output to the optical transmission path 40 increases. When the level of the reflected light is the predetermined value or higher, the optical power detection section 211 determines that abnormality has occurred in the optical transmission path. In that case, the optical power detection section 211 instructs the power control section 212 to stop transmission of the wireless radiowave signal.

The power control section 212 controls the wireless transmitting section 202b to stop transmission of the wireless radiowave signal to the wireless communication terminal. Specifically, the power control section 212 turns off the power of the wireless transmitting section 202b or turns off the switch (not shown) in the signal path of the wireless transmitting section 202b.

When abnormality occurs in the optical transmission path 40 and thus the quality of the optical signal is deteriorated, the quality of the wireless signal cannot fulfill the conditions regulated on the parameters of spurious emission power, out-band radiation power, etc., which are defined by the Radio Law. Spurious emission power and out-band radiation power refer to the power for emitting unnecessary waves outside the necessary frequency band. When these waves are emitted, other communication devices may be possibly jammed. Thus, the power for emitting the unnecessary waves is desirably as small as possible. The tolerable values of spurious emission power and out-band radiation power are defined by the Radio Law for each frequency band. When the transmission quality of the upstream optical signal is deteriorated, the relay apparatus 20b stops transmission of the wireless signal.

As described above, according to this embodiment, when abnormality occurs in an optical transmission path, transmission of a wireless signal from the relay apparatus can be stopped. Therefore, wireless signals which do not fulfill the public conditions are not transmitted. In addition, since the relay apparatus is only required to detect the level of the reflected light, the structure of the system can be simplified.

It should be noted that in the case where the optical transmission path is composed of a two-core optical fiber, the abnormality in the optical transmission path often influences equally both of the optical fibers in the same cable. The method of this embodiment is effective for this case. In the case of one-core bidirectional transmission, the possibility that the abnormality influences the transmission of only one direction is quite low. The method of this embodiment is also effective for this case.

Next, a variation of Embodiment 3 will be described. In a wireless communication system according to this variation, a relay apparatus 20c evaluates the quality of a downstream optical signal received from the control apparatus 10.

Figure 15:
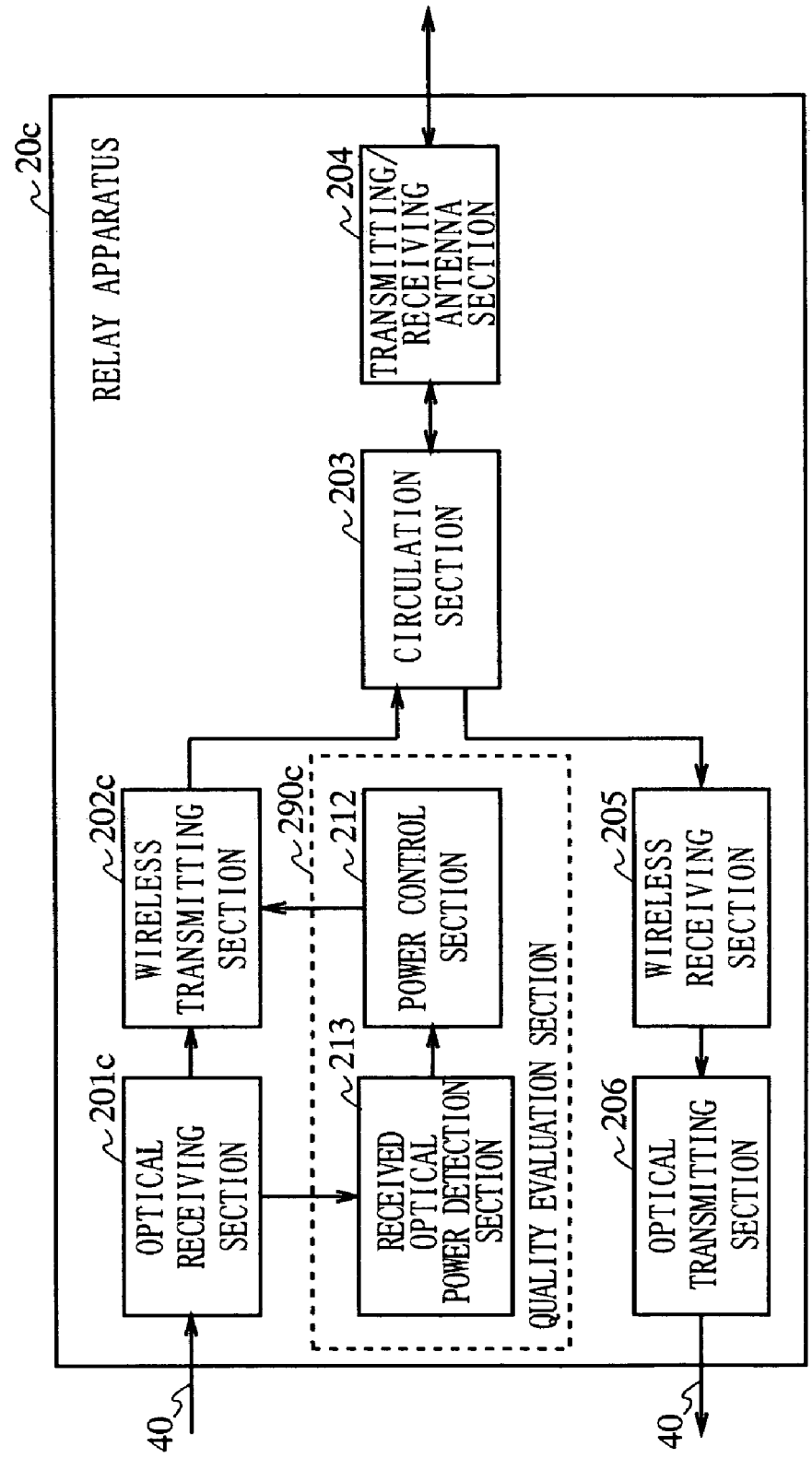
FIG. 15 is a block diagram showing a structure of a relay apparatus included in a wireless communication system according to a variation of Embodiment 3.

FIG. 15 is a block diagram showing a structure of the relay apparatus 20c included in the wireless communication system according to this variation. In FIG. 15, the relay apparatus 20c includes an optical receiving section 201c, a wireless transmitting section 202c, a circulation section 203, a transmitting/receiving antenna section 204, a wireless receiving section 205, an optical transmitting section 206c, and a quality evaluation section 290c. Elements which are substantially the same as those of FIG. 3 bear identical reference numerals thereto and descriptions thereof will be omitted.

The optical receiving section 201c converts a downstream optical signal transmitted from the optical transmission path 40 into a downstream electric signal and outputs the downstream electric signal to the wireless transmitting section 202 and a received optical power detection section 213 described below.

The quality evaluation section 290c includes a power control section 212 and the received optical power detection section 213.

The received optical power detection section 213 detects the power of a downstream optical signal received by the optical receiving section 201, and determines whether or not the power of the downstream optical signal is a predetermined value or higher. When the power of the downstream optical signal is less than the predetermined value or higher, the received optical power detection section 213 instructs the power control section 212 to stop transmission of the wireless signal.

The power control section 212, in accordance with the instruction from the received optical power detection section 213, stops output of the wireless signal. Specifically, the power control section 212 stops output of the wireless signal by turning off the power of the wireless transmitting section 202c. Alternatively, the power control section 212 may stop output of the wireless signal by turning off the switch in the path of the wireless transmitting section 202c.

When abnormality occurs in the optical transmission path 40, the transmission quality of the optical signal is deteriorated in general. Therefore, deterioration in the transmission quality can be indirectly detected by monitoring abnormality of the optical transmission path. When abnormality occurs in the transmission path and thus the transmission loss is increased, the power of the optical signal detected by the received optical power detection section 213 is decreased. Thus, by monitoring the power of a downstream optical signal received by the relay apparatus, the transmission quality of the optical signal can be evaluated.

As described above, according to this variation, when abnormality occurs in the optical transmission path, transmission of a wireless signal from the relay apparatus can be stopped. Therefore, wireless signals which do not fulfill the public conditions are not transmitted. In this variation, the relay apparatus is only required to have a function of detecting the level of an optical signal transmitted from the control apparatus via the optical transmission path, and does not need to include a complicated detection circuit for measuring the spurious emission power or the out-band radiation power.

Embodiment 4

Hereinafter, a wireless communication system according to Embodiment 4 of the present invention will be described.

In the wireless communication system according to this embodiment, the relay apparatus evaluates the quality of a downstream electric signal.

Figure 16:
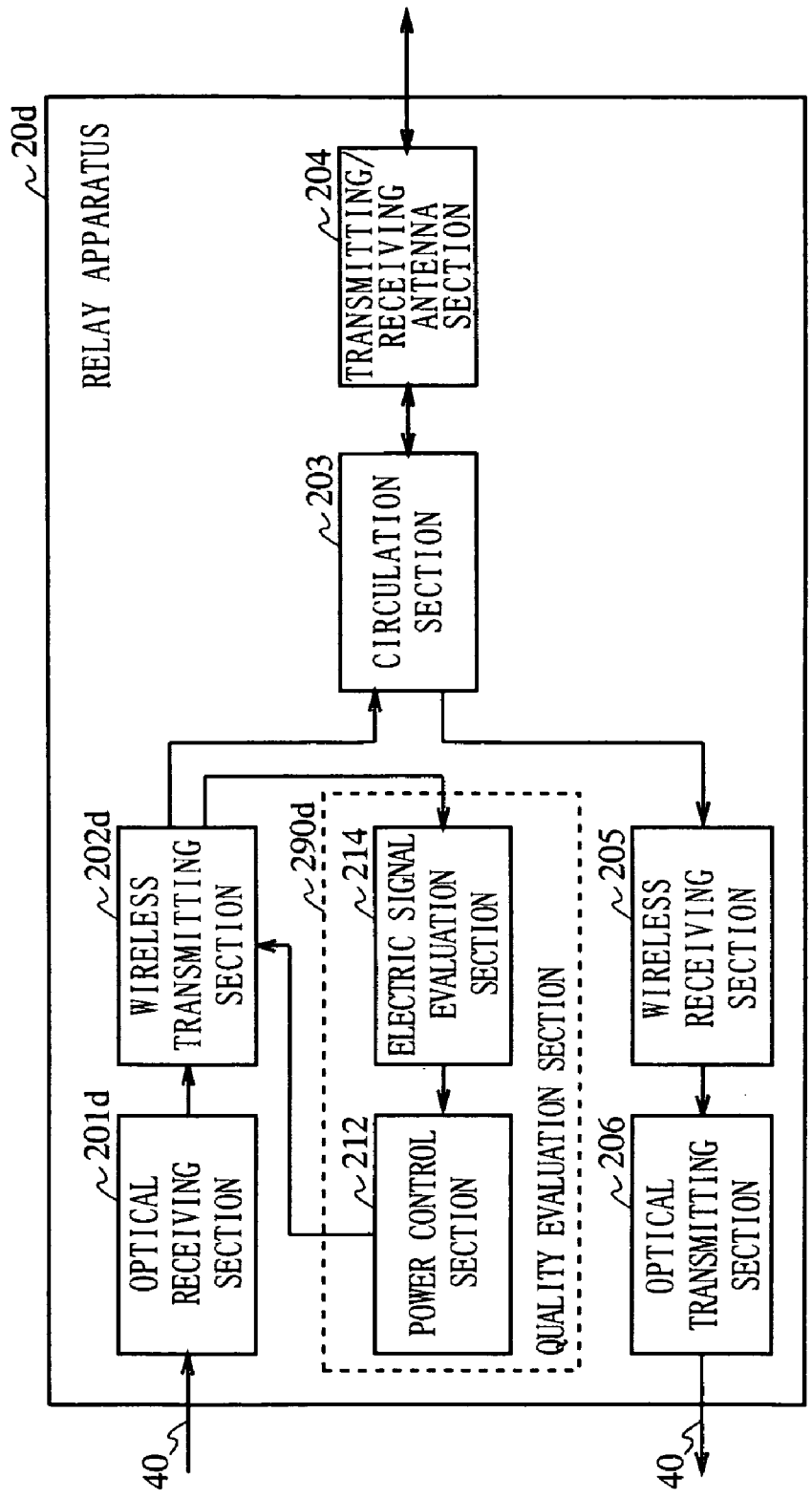
FIG. 16 is a block diagram showing a structure of a relay apparatus included in a wireless communication system according to Embodiment 4.

FIG. 16 is a block diagram showing a structure of a relay apparatus 20d included in the wireless communication system according to this embodiment. In FIG. 16, the relay apparatus 20d includes an optical receiving section 201d, a wireless transmitting section 202d, a circulation section 203, a transmitting/receiving antenna section 204, a wireless receiving section 205, an optical transmitting section 206, and a quality evaluation section 290d. Elements which are substantially the same as those of FIG. 3 bear identical reference numerals thereto and descriptions thereof will be omitted.

The wireless transmitting section 202d performs processing, such as amplification, on a downstream electric signal converted by the optical receiving section 201d and then outputs the resultant signal to the circulation section 203 and an electric signal evaluation section 214 described below.

The quality evaluation section 290d includes a power control section 212 and the electric signal evaluation section 214.

The electric signal evaluation section 214 evaluates the quality of the downstream electric signal which is output from the wireless transmitting section 202d.

Figure 17:
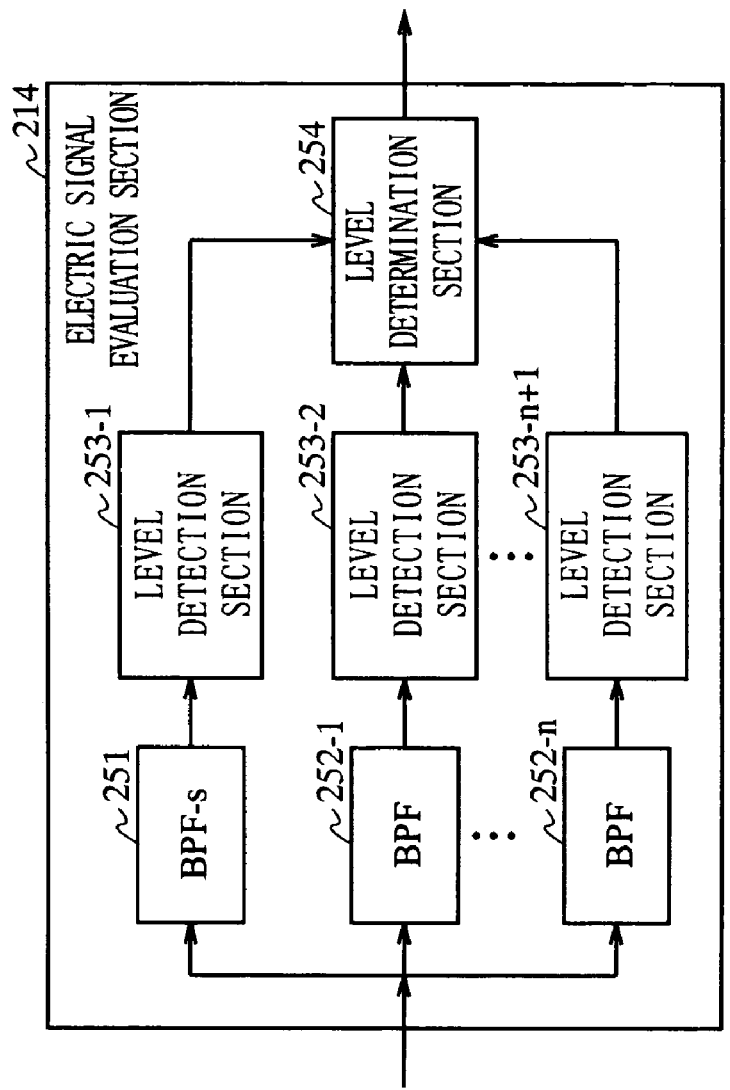
FIG. 17 is a block diagram showing a detailed structure of an electric signal evaluation section.

FIG. 17 is a block diagram showing a detailed structure of the electric signal evaluation section 214. In FIG. 17, the electric signal evaluation section 214 includes a band-pass filter-s (hereinafter, referred to as a "BPF-s") 251, band-pass filters (hereinafter, referred to as "BPFs") 252-1 through 252-n, level detection sections 253-1 through 253-n+1, and a level determination section 254.

The BPF-s 251 and the BPFs 252-1 through 252-n pass a frequency component in accordance with the spectrum mask. The BPF-s 251 passes a wireless signal of a frequency band which should be transmitted and removes out-band frequency components of the wireless signal. The BPF-s 251 outputs the frequency component of the passed signal to the level detection section 253-1. The level detection section 253-1 detects the level of the signal which is output from the BPF-s 251 and outputs the level to the level determination section 254.

The BPFs 252-1 through 252-n pass out-band frequency components of the wireless signal and outputs the out-band frequency components to the level detection sections 253-2 through 253-n+1. The BPFs 252-1 through 252-n pass different out-band frequency components from one another.

The level determination section 254 determines whether or not the level of the out-band frequency component detected by each of the level detection sections 253-2 through 253-n+1 with respect to the level of the frequency component detected by the level detection section 253-1 is a certain level or higher. When the quality of a wireless signal is deteriorated, the level of the out-band frequency components of the wireless signal, i.e., the level of unnecessary radiation power is increased. When the level of the unnecessary radiation power with respect to the level of the wireless signal is the certain level or higher, the level determination section 254 instructs the power control section 212 to stop transmission of the wireless signal.

The power control section 212, in accordance with the instruction from the electric signal evaluation section 214, stops output of the wireless signal. The specific operation of the power control section 212 is substantially the same as that of the power control section 212 shown in FIG. 15 and will not be described here.

As described above, in this embodiment, when the level of the unnecessary radiation power with respect to the level of a wireless signal is a certain level or higher and the relay apparatus determines that the quality of the wireless signal cannot fulfill the public conditions anymore, the relay apparatus stops transmission of the wireless signal. Therefore, wireless signals which do not fulfill the public conditions are not transmitted.

Next, a variation of Embodiment 4 will be described. In a wireless communication system according to this variation, the control apparatus converts a downstream electric signal having a test signal superposed thereon into a downstream optical signal and transmits the downstream optical signal to a relay apparatus. The relay apparatus evaluates the quality of the test signal received from the control apparatus.

Specifically, the relay apparatus evaluates the mutual modulation distortion of the test signal. A mutual modulation distortion refers to a signal which is generated when a plurality of signals of different frequencies are converted into downstream optical signals by a control apparatus. A mutual modulation distortion is generated because the IL characteristic of the light emitting element has nonlinearity.

In general, when signals of two different waves are input to a light emitting element, an amplifier or the like, frequency components of the respective fundamentals, and also components other than frequencies of the respective fundamentals, appear; for example, a harmonic component, sum of and difference between the frequencies of the two fundamentals, sum of and difference between the frequency of each fundamental and the frequency of the harmonic, and sum of and difference between the frequencies of the two harmonics. Such a frequency component which is generated by the mutual relationship between the plurality of frequencies (the components other than the harmonic) is referred to as a "mutual modulation distortion". For example, when two waves having frequency a and frequency b are input to a light emitting element, an amplifier or the like, frequency $2a-b$ or the like is generated as a mutual modulation distortion. Frequency $2a-b$ is close to the frequency of the main signal and therefore may possibly jam the main signal.

Figure 18:
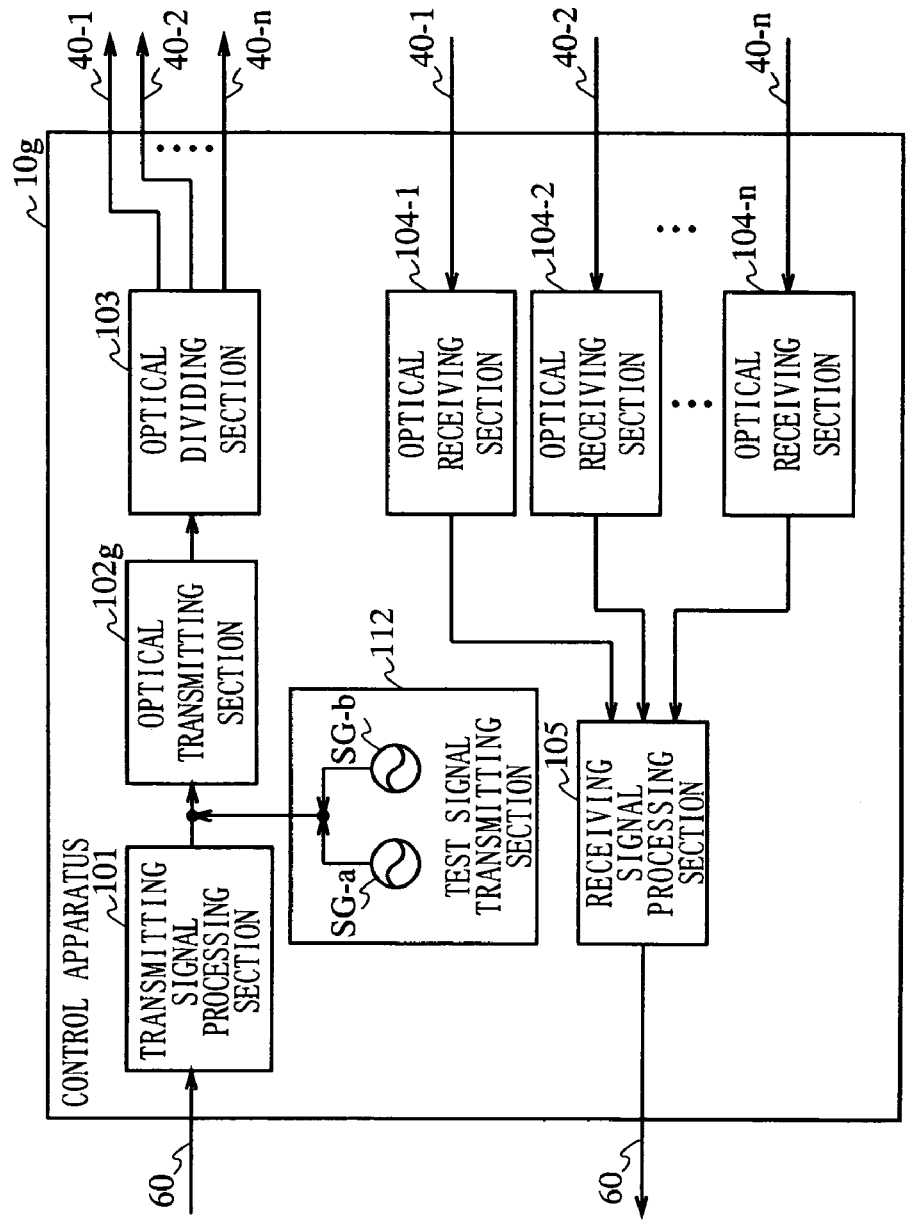
FIG. 18 is a block diagram showing a structure of a control apparatus included in a wireless communication system according to a variation of Embodiment 4.

FIG. 18 is a block diagram showing a structure of a control apparatus 10g included in the wireless communication system according to this variation. In FIG. 18, the control apparatus 10g includes a transmitting signal processing section 101, an optical transmitting section 102g, an optical dividing section 103, optical receiving sections 104-1 through 104-n, a receiving signal processing section 105, and a test signal transmitting section 112. Elements which are substantially the same as those of FIG. 2 bear identical reference numerals thereto and descriptions thereof will be omitted.

The test signal transmitting section 112 generates a test signal to be superposed on a downstream electric signal and outputs the test signal to the optical transmitting section 102g. The test signal transmitting section 112 includes an oscillator SG-a and an oscillator SG-b.

The oscillator SG-a generates test signal a and outputs test signal a to the optical transmitting section 102g. It is assumed that the frequency of test signal a is a. The oscillator SG-b generates test signal b and outputs test signal b to the optical transmitting section 102g. It is assumed that the frequency of test signal b is b.

The optical transmitting section 102g superposes test signals a and b which are output from the test signal transmitting section 112 on a downstream electric signal which is output from the transmitting signal processing section 101, and converts the downstream electric into a downstream optical signal.

Next, a relay apparatus for evaluating the test signal transmitted from the control apparatus 10g will be described. The structure of the relay apparatus according to this variation is substantially the same as the structure of the relay apparatus 20d shown in FIG. 16 except for the structure of the electric signal evaluation section. Therefore, the description given above with reference to FIG. 16 will be incorporated here, and only the electric signal evaluation section will be described below. In order to distinguish the electric signal evaluation section included in the relay apparatus according to this variation from the electric signal evaluation section 214 shown in FIG. 17, the electric signal evaluation section included in the relay apparatus according to this variation will be referred to as an electric signal evaluation section 214e.

Figure 19:
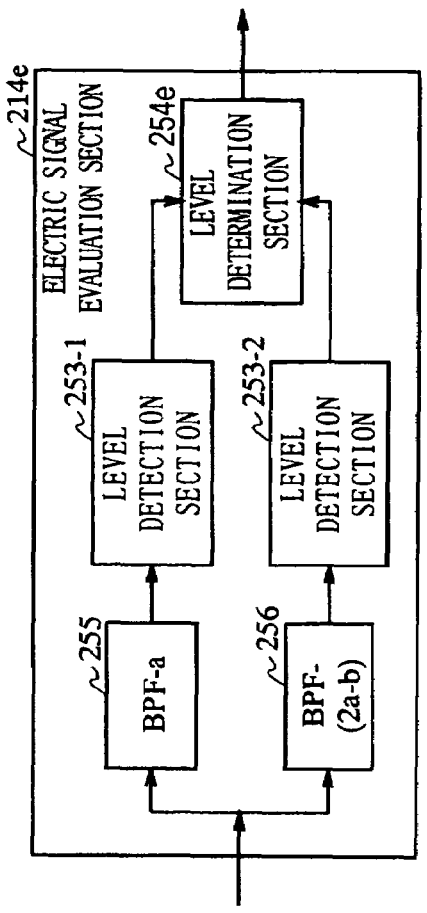
FIG. 19 is a block diagram showing a detailed structure of an electric signal evaluation section.

FIG. 19 is a block diagram showing a detailed structure of the electric signal evaluation section 214e. In FIG. 19, the electric signal evaluation section 214e includes a band-pass filter-a (hereinafter, referred to as a "BPF-a") 255, a band-pass filter-(2a-b) (hereinafter, referred to as a "BPF-(2a-b)") 256, level detection sections 253-1 and 253-2, and a level determination section 254e.

The BPF-a 255 passes test signal a having frequency a and removes out-band frequency components of test signal a. The BPF-a 255 then outputs test signal a which has passed to the level detection section 253-1. The level detection section 253-1 detects the level of test signal a and outputs the level to the level determination section 254.

The BPF-(2a-b) 256 passes a frequency (2a-b) of the mutual modulation distortion and outputs the frequency (2a-b) to the level detection section 253-2.

The level determination section 254e determines whether or not the level of the mutual modulation distortion detected by the level detection section 253-2 with respect to the level of test signal a detected by the level detection section 253-1 is a certain level of higher. When the level of the mutual modulation distortion with respect to the level of test signal a is a certain level of higher, the level determination section 254e instructs the power control section 212 to stop transmission of the wireless signal.

The power control section 212, in accordance with the instruction from the electric signal evaluation section 214e, stops output of the wireless signal. The specific operation of the power control section 212 is substantially the same as that of the power control section 212 shown in FIG. 15 and will not be described here.

As described above, according to this variation, the relay apparatus evaluates the mutual modulation distortion of the test signal transmitted from the control apparatus. When the level of the mutual modulation distortion with respect to the level of the test signal is a certain level or higher, the relay apparatus stops transmission of the wireless signal. Therefore, transmission of wireless signals having deteriorated quality can be prevented.

In general, it is difficult to directly measure the spurious emission power, the out-band radiation power and the like, and it costs high to measure these parameters. However, according to this variation, it is only necessary to measure the mutual modulation distortion of a test signal. Measurement of the mutual modulation distortion only requires, for example, checking of preset frequencies, and therefore is advantageous in being realized with a simple circuit.

In the above variation, a method for measuring the mutual modulation distortion of a test signal has been described. The transmission quality may be evaluated by measuring a harmonic distortion of the test signal instead of the mutual modulation distortion.

A harmonic is a component having a frequency having a value obtained by multiplying the frequency of the fundamental by an integer. For example, when signal a having frequency a is input to a nonlinear circuit, a distortion is generated and harmonics having, for example, frequencies 2a and 3a are output together with frequency a. When the transmission quality of the signal is deteriorated, the levels of such harmonics are increased. Accordingly, the transmission quality can be evaluated by measuring a harmonic distortion.

In that case, only one type of test signal needs to be transmitted from the control apparatus to the relay apparatus. Therefore, the test signal transmitting section 112 shown in FIG. 18 is only required to include the oscillator SG-a. Accordingly, a downstream optical signal having test signal a superposed thereon is transmitted to the relay apparatus. In the relay apparatus, the electric signal evaluation section 214e shown in FIG. 19 is only required to include a band-pass filter-2a for passing frequency 2a, instead of the BPF-(2a-b).

Figure 20:
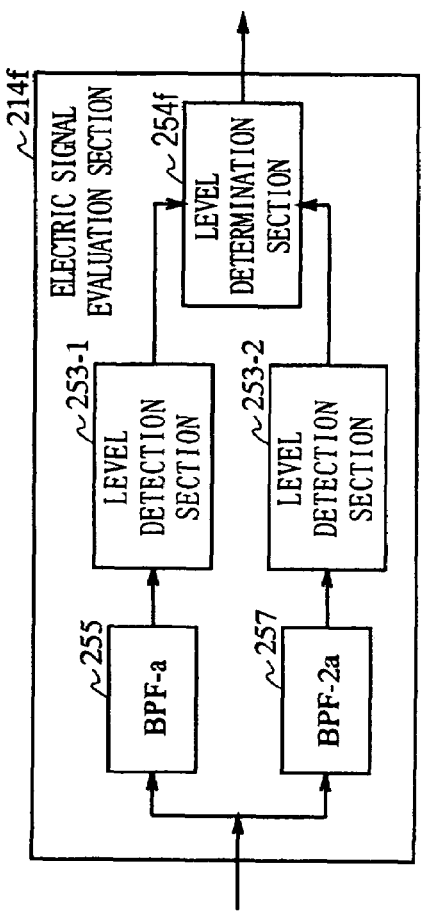
FIG. 20 is a block diagram showing a detailed structure of an electric signal evaluation section.

FIG. 20 is a block diagram showing a structure of an electric signal evaluation section 214f. For detecting a harmonic distortion, the relay apparatus 20d shown in FIG. 16 includes the electric signal evaluation section 214f shown in FIG. 20, instead of the electric signal evaluation section 214. In FIG. 20, the electric signal evaluation section 214f includes a band-pass filter-a (hereinafter, referred to as a "BPF-a") 255, a band-pass filter-2a (hereinafter, referred to as a "BPF-2a") 257, level detection sections 253-1 and 253-2, and a level determination section 254.

The BPF-a 255 passes test signal a having frequency a and removes out-band frequency components of test signal a. The BPF-a 255 then outputs test signal a which has passed to the level detection section 253-1. The level detection section 253-1 detects the level of test signal a and outputs the level to the level determination section 254.

The BPF-2a 257 passes frequency 2a of a harmonic and outputs frequency 2a to the level detection section 253-2.

The level determination section 254f determines whether or not the level of the harmonic distortion detected by the level detection section 253-2 with respect to the level of test signal a detected by the level detection section 253-1 is a certain level of higher. When the level of the harmonic distortion with respect to the level of test signal a is the certain level of higher, the level determination section 254f instructs the power control section 212 to stop transmission of the wireless signal.

The power control section 212, in accordance with the instruction from the electric signal evaluation section 214f, stops output of the wireless signal. The specific operation of the power control section 212 is substantially the same as that of the power control section 212 shown in FIG. 15 and will not be described here.

As described above, according to this variation, the relay apparatus evaluates the harmonic distortion of the test signal transmitted from the control apparatus. When the level of the harmonic distortion with respect to the level of the test signal is a certain level or higher, the relay apparatus stops transmission of the wireless signal. Therefore, transmission of wireless signals having deteriorated quality can be prevented.

In Embodiments 3 and 4, cases where the relay apparatus evaluates the quality of a wireless signal or an optical signal have been described. Alternatively, a control apparatus, instead of the relay apparatus, may evaluate the quality of these signals. Hereinafter, cases where a control apparatus evaluates the quality of a wireless signal or an optical signal will be described.

Embodiment 5

Figure 21:
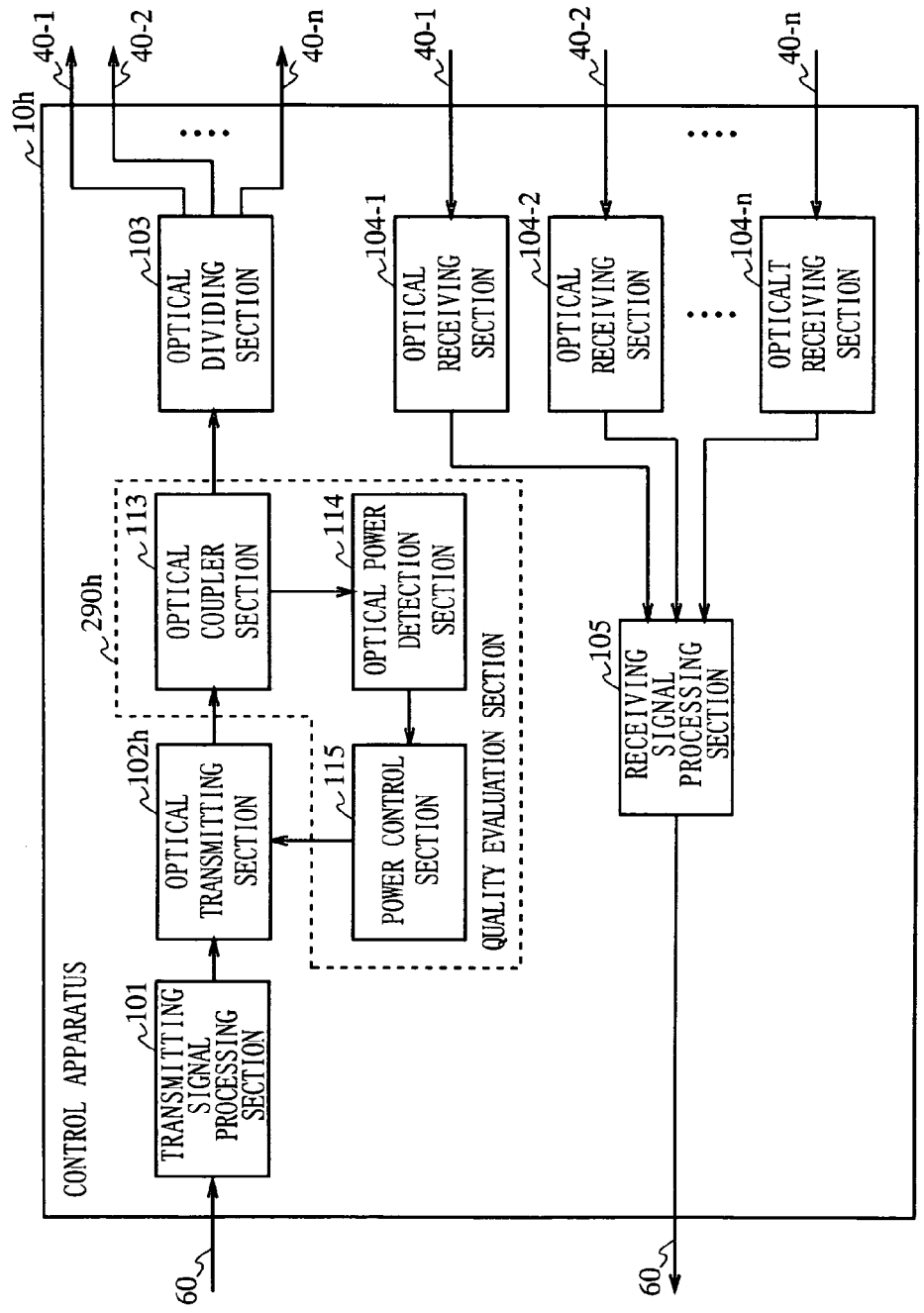
FIG. 21 is a block diagram showing a structure of a control apparatus according to Embodiment 5.

FIG. 21 is a block diagram showing a structure of a control apparatus 10h included in a wireless communication system according to a fifth example. In FIG. 21, the control apparatus 10h includes a transmitting signal processing section 101, an optical transmitting section 102*h*, an optical dividing section 103, optical receiving sections 104-1 through 104-*n*, a receiving signal processing section 105, and a quality evaluation section 290*h*. Elements which are substantially the same as those of FIG. 2 bear identical reference numerals thereto and descriptions thereof will be omitted.

The optical transmitting section 102*h* converts a signal transmitted from an external network into a downstream optical signal and outputs the downstream optical signal to an optical coupler section 113 described below.

The quality evaluation section 290*h* includes the optical coupler section 113, and an optical power detection section 114, and a power control section 115.

The optical coupler section 113 outputs an upstream optical signal to the optical dividing section 103 and outputs light reflected by the optical transmission path 40 to the optical power detection section 114.

The optical power detection section 114 detects the power of the reflected light which is output from the optical coupler section 113, and when the power of the reflected light is a predetermined value or higher, instructs the power control section 115 to stop transmission of the downstream optical signal.

The power control section 115 controls the optical transmitting section 102*h* to stop transmission of the downstream optical signal. Specifically, the power control section 115 turns off the power of the optical transmitting section 102*h* or turns off the switch (not shown) in the signal path of the optical transmitting section 102*h*. The optical coupler section 113, the optical detection section 114, and the power control section 115 respectively have substantially the same functions as those of the optical coupler section 210, the optical detection section 211, and the power control section 212 shown in FIG. 14, and the descriptions thereof will be omitted.

The relay apparatus according to this embodiment has the structure of the relay apparatus shown in FIG. 14 except that the quality evaluation section 290*b* is not included.

As described above, according to this embodiment, when abnormality occurs in an optical transmission path, transmission of an optical signal from the control apparatus can be stopped. Therefore, wireless signals which do not fulfill the public conditions are not transmitted from the relay apparatus. In addition, since the control apparatus is only required to detect the reflected light, the structure of the system can be simplified.

Figure 22:
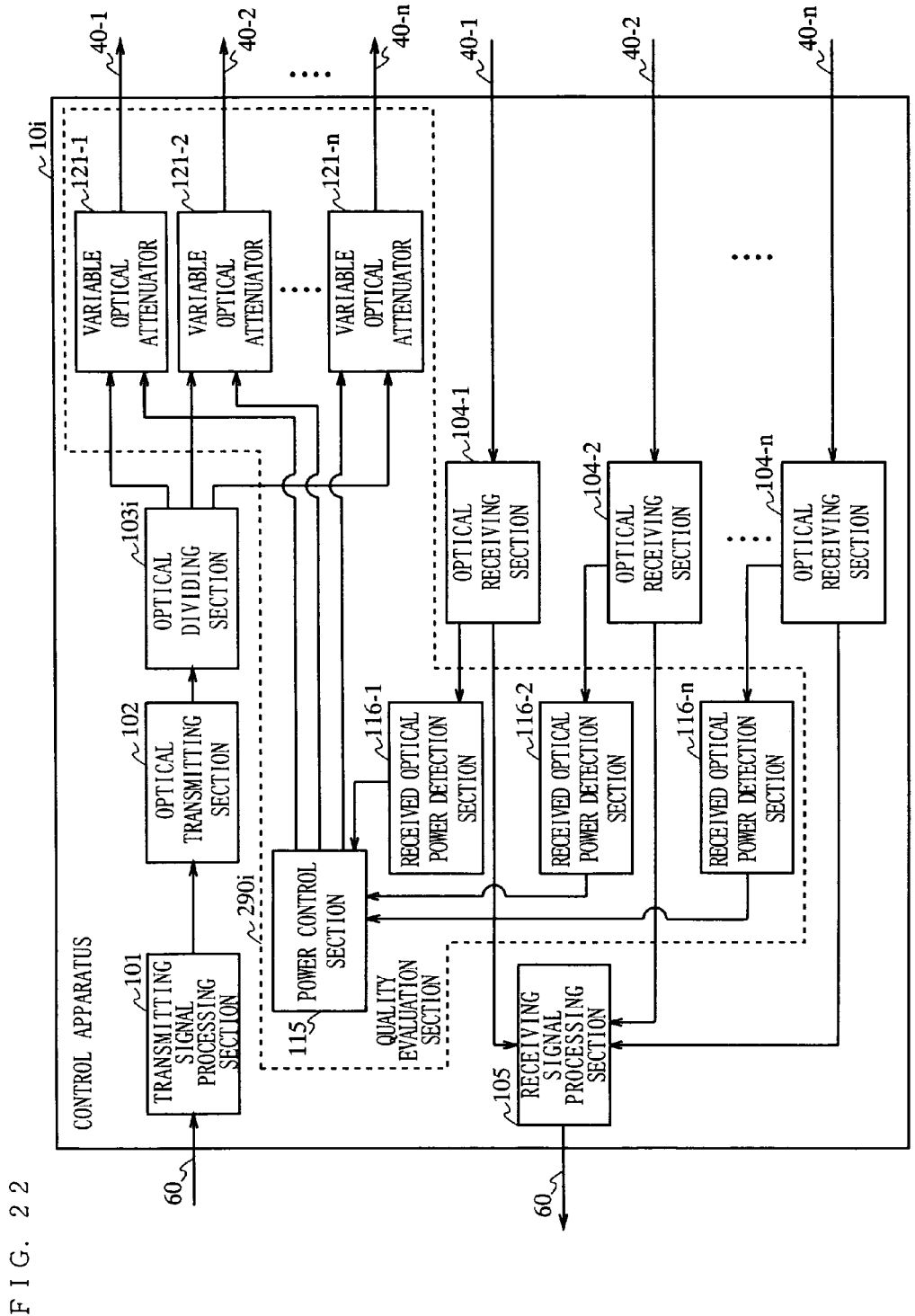
FIG. 22 is a block diagram showing a structure of a control apparatus included in a wireless communication system according to a variation of Embodiment 5.

Next, a variation of Embodiment 5 will be described. FIG. 22 is a block diagram showing a structure of a control apparatus 10*i* according to a variation of Embodiment 5.

In FIG. 22, the control apparatus 10*i* includes a transmitting signal processing section 101, an optical transmitting section 102*h*, an optical dividing section 103*i*, optical receiving sections 104-1 through 104-*n*, a receiving signal processing section 105, and a quality evaluation section 290*i*. Elements which are substantially the same as those of FIG. 2 bear identical reference numerals thereto and descriptions thereof will be omitted.

The optical dividing section 103*i* outputs downstream optical signals divided into n number of signals to variable optical attenuators 121-1 through 121-*n* described below.

The quality evaluation section 290*i* includes a power control section 115, received optical power detection sections 116-1 through 116-*n*, and the variable optical attenuators 121-1 through 121-*n*.

The received optical power detection section 116-1 through 116-*n* detect the power of upstream optical signals received by the optical receiving sections 104-1 through 104-*n*, and determine whether or not the power of the respective upstream optical signal is a predetermined value or higher. The received optical power detection sections 116-1 through 116-*n*, when the power of the respective upstream optical signal is less than the predetermined value, instruct the power control section 115 to stop transmission of the downstream optical signal.

The variable optical attenuators 121-1 through 121-*n* attenuate the downstream optical signals which are output from the optical dividing section 103*i* and transmit the resultant signals to the optical transmission paths 40-1 through 40-*n*.

The power control section 115, in accordance with the instruction from each of the received optical power detection sections 116-1 through 116-*n*, stops transmission of the downstream optical signal. Specifically, the power control section 115 stops output of the downstream optical signal by controlling the attenuation amount of the downstream optical signal attenuated by each of the variable optical attenuators 121-1 through 121-*n*. At this point, the power control section 115 stops transmission of the downstream signal only to the optical transmission path in which the abnormality has occurred. For example, when the power of an upstream optical signal detected by the received optical power detection section 116-2 is less than the predetermined value, the power control section 115 controls the variable optical attenuator 121-2 so as to stop transmission of the downstream optical signal to the optical transmission path 40-2.

The functions of the received optical detection section 116 and the power control section 115 are substantially the same as the functions of the received optical detection section 213 and the power control section 212 shown in FIG. 15, and the detailed descriptions thereof will be omitted.

As described above, according to this variation, when abnormality occurs in an optical transmission path, transmission of the downstream optical signal from the control apparatus can be stopped. Therefore, wireless signals which do not fulfill the public conditions are not transmitted from the relay apparatus. In this variation, the control apparatus is only required to have a function of detecting the level of an optical signal transmitted from the control apparatus via the optical transmission path, and does not need to include a complicated detection circuit for measuring the spurious emission power or the out-band radiation power.

Embodiment 6

Figure 23:
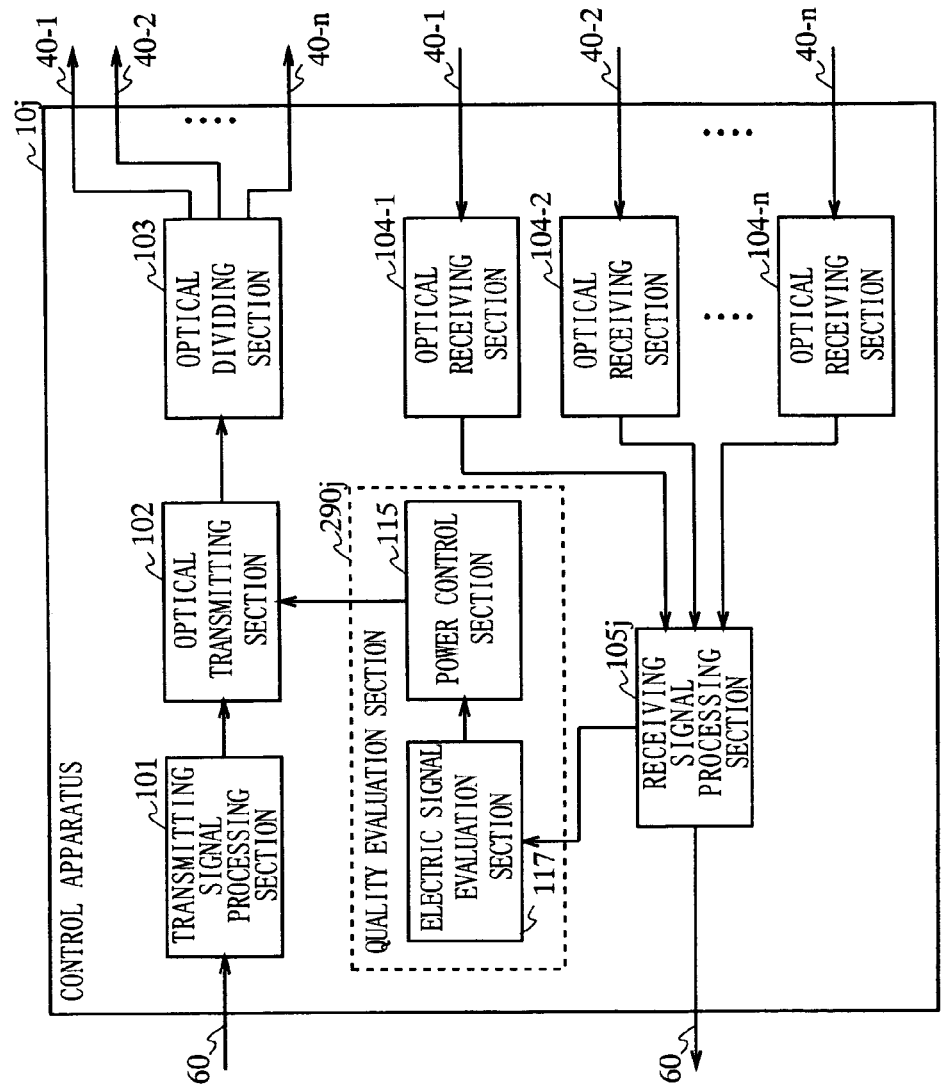
FIG. 23 is a block diagram showing a structure of a control apparatus included in a wireless communication system according to Embodiment 6 of the present invention.

FIG. 23 is a block diagram showing a structure of a control apparatus 10*j* according to Embodiment 6 of the present invention.

In FIG. 23, the control apparatus 10*j* includes a transmitting signal processing section 101, an optical transmitting section 102, an optical dividing section 103, optical receiving sections 104-1 through 104-*n*, a receiving signal processing section 105*j*, and a quality evaluation section 290*j*. Elements which are substantially the same as those of FIG. 2 bear identical reference numerals thereto and descriptions thereof will be omitted.

The receiving signal processing section 105*j* outputs an upstream electric signal converted by each of the optical receiving sections 104-1 through 104-*n* to an electric signal evaluation section 117 described below.

The quality evaluation section 290*j* includes a power control section 115 and the electric signal evaluation section 117.

The electric signal evaluation section 117 evaluates the quality of the electric signal which is output from the receiving signal processing section 105*j*, and when the quality of the electric signal is deteriorated, stops transmission of a downstream optical signal. The electric signal evaluation section 117 corresponds to the electric signal evaluation section 214 shown in FIG. 17. Therefore, the description given above with reference to FIG. 17 will be incorporated here and the detailed description thereof will be omitted.

The power control section 115 corresponds to the power control section 212 shown in FIG. 16. The power control section 115, in accordance with the instruction from the electric signal evaluation section 117, stops output of the downstream optical signal from the optical transmitting section 102.

The relay apparatus according to this embodiment has the structure of the relay apparatus shown in FIG. 14 except that the quality evaluation section 290b is not included.

As described above, in this embodiment, the control apparatus determines whether or not the level of the unnecessary radiation power with respect to the level of the signal transmitted from the relay apparatus is a certain level or higher. For example, when abnormality occurs in an optical transmission path, the quality of an upstream signal is deteriorated. If a downstream signal is transmitted to the relay apparatus in such a case, a wireless signal with deteriorated quality is transmitted. When the quality of the upstream signal is deteriorated, the control apparatus stops transmission of the downstream optical signal. Therefore, wireless signals which do not fulfill the public conditions are not transmitted from the relay apparatus.

Next, a variation of Embodiment 6 will be described. In a wireless communication system according to this variation, the relay apparatus converts an upstream electric signal having a test signal superposed thereon into an upstream optical signal and transmits the resultant signal to a control apparatus. The control apparatus evaluates the quality of the test signal received from the relay apparatus.

Figure 24:
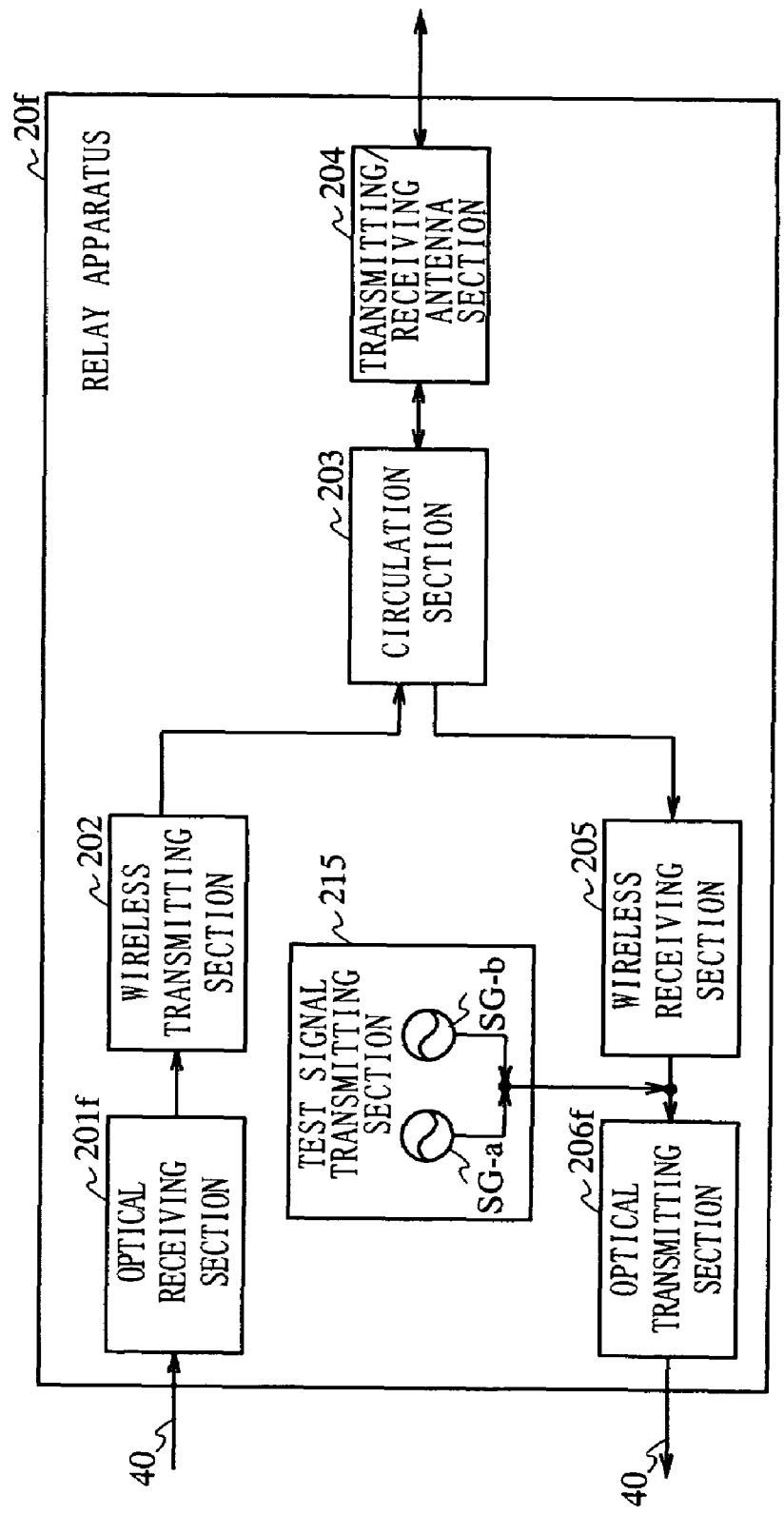
FIG. 24 is a block diagram showing a structure of a relay apparatus included in a wireless communication system according to a variation of Embodiment 6.

FIG. 24 is a block diagram showing a structure of a relay apparatus 20f included in the wireless communication system according to this variation. In FIG. 24, the relay apparatus 20f includes an optical receiving section 201f, a wireless transmitting section 202, a circulation section 203, a transmitting/receiving antenna section 204, a wireless receiving section 205, an optical transmitting section 206f, and a test signal transmitting section 215.

The optical receiving section 201f outputs a converted downstream electric signal to the wireless transmitting section 202.

The test signal transmitting section 215 generates a test signal to be superposed on an upstream electric signal transmitted from the relay apparatus 20f and outputs the test signal to the optical transmitting section 206f. The test signal transmitting section 215 includes an oscillator SG-a and an oscillator SG-b.

The oscillator SG-a generates test signal a and outputs test signal a to the optical transmitting section 206f. The frequency of test signal a is a. The oscillator SG-b generates test signal b and outputs test signal b to the optical transmitting section 206f. The frequency of test signal b is b. The test signal transmitting section 215 corresponds to the test signal transmitting section 112 shown in FIG. 18.

The optical transmitting section 206f superposes test signals a and b which are output from the test signal transmitting section 215 on an upstream electric signal which is output from the wireless receiving section 205, and converts the upstream electric signal into an upstream optical signal.

Next, the control apparatus for evaluating the test signal transmitted from the relay apparatus 20f will be described. The structure of the control apparatus according to this variation is substantially the same as the structure of the control apparatus 10j shown in FIG. 23 except for the structure of the electric signal evaluation section. Therefore, the description given above with reference to FIG. 23 will be incorporated here, and only the differences will be described below. The structure of the electric signal evaluation section for evaluating a mutual modulation distortion is substantially the same as the structure of the electric signal evaluation section 214e shown in FIG. 19. Therefore, the description given above with reference to FIG. 23 will be incorporated here. The electric signal evaluation section evaluates the quality of the test signal superposed on the upstream electric signal which is output from the receiving signal processing section 105j. When the level of the mutual modulation distortion with respect to the level of the test signal is a certain level or higher, the electric signal evaluation section instructs the power control section 115 to stop transmission of the downstream optical signal.

As described above, according to this variation, the control apparatus evaluates the mutual modulation distortion of a test signal transmitted from the relay apparatus, and when the level of the mutual modulation distortion with respect to the level of the test signal is a certain level or higher, stops transmission of the downstream optical signal. This can prevent transmission of a wireless signal having deteriorated quality from the relay apparatus.

In this variation, the control apparatus evaluates a mutual modulation distortion. Alternatively, as in the variation of Embodiment 4, a harmonic distortion may be evaluated. The structure of the electric signal evaluation section for that case is substantially the same as that of the electric signal evaluation section 214f shown in FIG. 20. Therefore, the description given above with reference to FIG. 20 will be incorporated here, and the description thereof will be omitted.

As described above, in this variation, the control apparatus evaluates the mutual modulation distortion or the harmonic distortion of a test signal transmitted from the relay apparatus. When the level of the mutual modulation distortion or the harmonic distortion with respect to the level of the test signal is a certain level or higher, the control apparatus stops transmission of a wireless signal. This can prevent transmission of a wireless signal having deteriorated quality from the relay apparatus. Measurement of the mutual modulation distortion or the harmonic distortion only requires, for example, checking of preset frequencies, and therefore is advantageous in being realized with a simple circuit.

In Embodiments 3 through 6, the descriptions have been given with the assumption that the wireless communication system uses a wireless LAN signal for communication. Alternatively, the wireless communication system may be used as a re-transmission system for areas insensitive to broadcast wave. In a system for communicating using broadcast wave, however, upstream signals are generally considered to be unnecessary. Accordingly, the method of evaluating the quality of an upstream signal as described in Embodiments 5 and 6 cannot be used, but the wireless communication systems according to Embodiments 3 through 6 are usable for the other methods.

As an optical connector for connecting optical transmission paths to each other or for connecting an optical transmission path and a device to each other, an obliquely polished connector is most suitable. When a connector is loose, reflection occurs at an end surface of the connector. Thus, with PC connectors or the like, reflection to light emitting elements occurs, or when there are a plurality of reflection points, multiple reflection occurs. Therefore, the quality of the signals is deteriorated. Here, use of an obliquely polished connector is advantageous in preventing occurrence of light reflection to the light emitting elements or multiple reflection, and thus preventing deterioration in the signal quality even in the state where the connector is loose.

As described above, the wireless communication systems according to Embodiments 3 through 6 enable communication using wireless signals of a plurality of channels in one area, and are useful for intra-building networks for businesses, wireless LAN services, and the like. The wireless communication systems according to Embodiments 3 through 6 are also applicable to uses such as intra-train or intra-plane networks and re-transmission systems for areas insensitive to broadcast wave.

As described above, in Embodiments 1 and 2, wireless communication systems for keeping the signal levels of wireless signals to be transmitted to a wireless communication terminal within a predetermined dynamic range were described. With the wireless communication systems according to Embodiments 1 and 2, the area covered by one relay apparatus is narrowed. In order to cover a larger communication area, a plurality of relay apparatuses are necessary.

However, the length of an optical transmission path for connecting each relay apparatus and the control apparatus varies for each of the plurality of relay apparatuses. Accordingly, when a wireless signal transmitted from one wireless communication terminal is received by a plurality of relay apparatuses, there occurs a delay skew among delay times required for signals transmitted through different transmission paths to reach a control apparatus 31. This arises a problem that the signals are interfered with by each other (multi-path interference) and thus the communication quality is deteriorated.

Hereinafter, methods for keeping the delay skew among the signals transmitted through different wireless transmission paths and optical transmission paths within a predetermined time period will be described.

Embodiment 7

Figure 25:
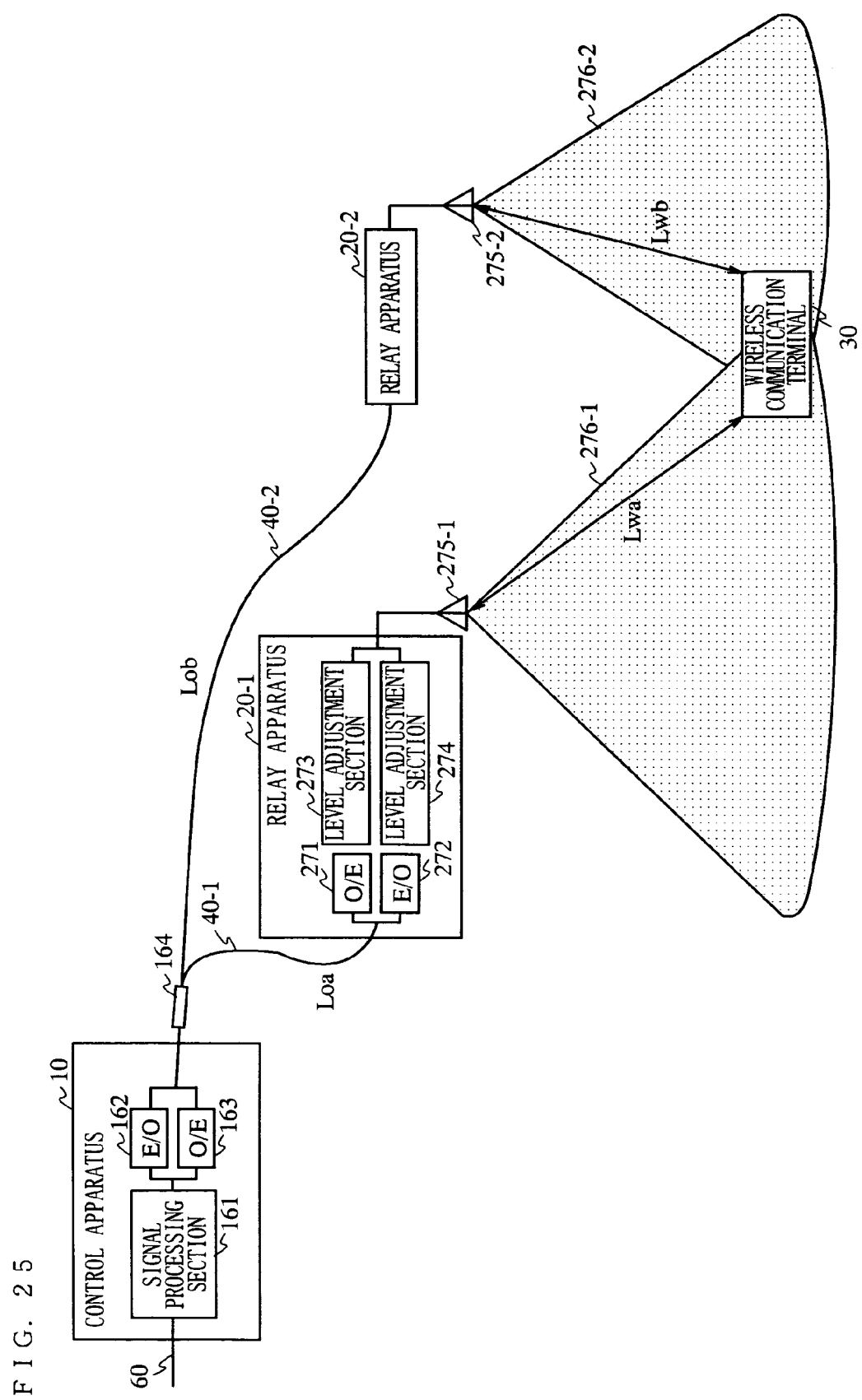
FIG. 25 is a diagram showing a structure of a wireless communication system according to Embodiment 7 of the present invention.

FIG. 25 is a diagram showing a structure of a wireless communication system according to Embodiment 7 of the present invention. In FIG. 25, the wireless communication system includes a control apparatus 10, relay apparatuses 20-1 and 20-2, and a wireless communication terminal 30.

The wireless communication terminal 30 and each of the relay apparatuses 20-1 and 20-2 are connected to each other wirelessly. The relay apparatus 20-1 and the control apparatus 10 are connected to each other via an optical transmission path 40-1, and the relay apparatus 20-2 and the control apparatus 10 are connected to each other via an optical transmission path 40-2. In FIG. 25, one wireless communication terminal exists in a wireless communication zone, but two or more wireless communication terminals may exist in the wireless communication zone.

Since the control apparatus 10 according to this embodiment has substantially the same structure as that of the control apparatus according to Embodiment 1 or Embodiment 2, FIG. 25 shows only the basic structure of the control apparatus 10.

In FIG. 25, the control apparatus 10 includes a signal processing section 161, an electric-to-optical conversion section (E/O) 162, and an optical-to-electric conversion section (O/E) 163, and an optical splitting/coupling section 164.

The signal processing section 161 corresponds to, for example, the transmitting signal processing section 101 and the receiving signal processing section 105 shown in FIG. 9. The electric-to-optical conversion section 162 corresponds to the optical transmitting section 102 shown in FIG. 9, and the optical-to-electric conversion section (O/E) 163 corresponds to the optical receiving section 104 shown in FIG. 9. The optical splitting/coupling section 164 corresponds to the optical dividing section 103 and the optical coupling section 108 shown in FIG. 9.

The optical splitting/coupling section 164 splits a downstream optical signal which is output from the electric-to-optical conversion section 162 of the control apparatus 10 and transmits the downstream optical signals to the optical transmission paths 40-1 and 40-2. The optical splitting/coupling section 164 also outputs upstream optical signals transmitted from the relay apparatuses 20-1 and 20-2 via the optical transmission paths 40-1 and 40-2 to the optical-to-electric conversion section 163 of the control apparatus 10.

The relay apparatus 20-1, upon receiving the optical signal transmitted via the optical transmission path 40-1, converts the received optical signal into an electric signal and transmits the electric signal as a wireless signal from a transmitting/receiving antenna section 275-1.

The relay apparatus 20-1 according to this embodiment basically has substantially the same structure as that of the control apparatus according to Embodiment 1 or Embodiment 2, but is different therefrom in further including level adjustment sections 273 and 274. Since the relay apparatus 20-1 has substantially the same structure of that of the relay apparatuses in Embodiment 1 and Embodiment 2 except for the structure of the level adjustment sections 273 and 274, FIG. 25 shows only the basic structure of the relay apparatus 20-1.

In FIG. 25, the relay apparatus 20-1 includes an optical-to-electric conversion section 271, an electric-to-optical conversion section 272, the level adjustment sections 273 and 274, and a transmitting/receiving antenna section 275-1.

The optical-to-electric conversion section 271 corresponds to the optical receiving section 201 shown in FIG. 3, and converts a downstream optical signal transmitted from the optical transmission path 40-1 into an electric signal and outputs the electric signal to the level adjustment section 273.

The level adjustment section 273 is, for example, a gain variable amplifier or a variable attenuator, and adjusts the level of the downstream electric signal converted by the optical-to-electric conversion section 271. The electric signal having the level adjusted by the level adjustment section 273 passes through a wireless transmitting section or a circulation section (neither is shown) and is transmitted from the transmitting/receiving antenna section 275-1 as a wireless signal.

The level adjustment section 274 also has substantially the same function as that of the level adjustment section 273, and adjusts the level of an electric signal received by the transmitting/receiving antenna section and outputs the resultant signal to the electric-to-optical conversion section 272.

The electric-to-optical conversion section 272 corresponds to the optical transmitting section 206 shown in FIG. 3, and converts a wireless signal received by the transmitting/receiving antenna section 275-1 into an upstream optical signal and transmits the upstream optical signal to the optical transmission path 40-1. So far, the relay apparatus 20-1 has been described. The relay apparatus 20-2 also has substantially the same structure as that of the relay apparatus 20-1.

The control apparatus 10, upon receiving an optical signal transmitted via the optical transmission path 40-1, demodulates the optical signal to a signal in a state to be transmitted to an external network, and transmits the resultant signal to the external network via an Ethernet (registered trademark) cable 60.

The transmitting/receiving antenna section is installed such that a part of the wireless communication area of the transmitting/receiving antenna section overlaps a part of the wireless communication area of an adjacent transmitting/receiving antenna section. Accordingly, the wireless communication area of each transmitting/receiving antenna section includes a region overlapping the wireless communication area of the adjacent transmitting/receiving antenna section.

As shown in FIG. 25, in the case where the wireless communication terminal 30 is located in the region where wireless communication areas 276-1 and 276-2 overlap each other, the wireless communication terminal 30 receives signals split by the optical splitting/coupling section 164 both via the relay apparatuses 20-1 and 20-2.

A total time required for a signal transmitted from the control apparatus 10 to pass through the relay apparatus 20-1 and reach the wireless communication terminal 30 is the sum of a propagation time T (Loa) required for an optical signal to be propagated through an optical transmission path 40-1 and a propagation time T (Lwa) required for a wireless signal to be propagated through a wireless communication area 276-1. A total time required for a signal transmitted from the control apparatus 10 to pass through the relay apparatus 20-2 and reach the wireless communication terminal 30 is the sum of a propagation time T (Lob) required for an optical signal to be propagated through an optical transmission path 40-2 and a propagation time T (Lwb) required for a wireless signal to be propagated through a wireless communication area 276-2.

According to the IEEE802.11a Standard, the IEEE802.11g Standard or the like, a wireless LAN system using the OFDM modulation system can generally tolerate a signal delay skew of about 250 ns. Here, a case where the delay skew is set to be 200 ns in order to provide a margin for the delay skew in wireless transmission paths and optical transmission paths will be discussed. For example, in this system, by reducing the delay skew of wireless signals in the wireless transmission paths to 100 ns, a delay skew up to 100 ns can be tolerated in the optical transmission paths. The delay skew of 100 ns is about 20 m when converted into an optical path length difference. Accordingly, when the optical path length difference exceeds 20 m, the influence of multi-path interference can be alleviated by reducing the delay skew of the signals in the wireless transmission path.

Thus, it is understood that in order to nullify the delay skew among the wireless signals transmitted from a plurality of transmitting/receiving antenna sections and reaching one wireless communication terminal, the wireless communication areas 276-1 and 276-2 may be formed at such positions that the sum of the propagation time T (Loa) and the propagation time T (Lwa), and the sum of the propagation time T (Lob) and the propagation time T (Lwb), are kept within a predetermined time period.

In the relay apparatus 20-1, the level adjustment section 273 controls the gain by adjusting the level of a wireless signal transmitted from the transmitting/receiving antenna section 275-1. This forms the wireless communication area 276-1. Also in the relay apparatus 20-2, the level adjustment section 273 therein controls the level of a wireless signal to be transmitted and thus the wireless communication area 276-2 is formed.

For example, when the propagation rate of an optical signal propagating through an optical transmission path is 1.5 times the propagation rate of a wireless signal propagating in the air, the directivity of each transmitting/receiving antenna section is adjusted so as to fulfill the following relationship and thus the wireless communication areas 276-1 and 276-2 are formed.

$$Lwa - Lwb = 1.5 \times (Lob - Loa) \quad (2)$$

Specifically, the directivity is adjusted by changing the inclining angle of each transmitting/receiving antenna section or changing the directivity expansion angle of each transmitting/receiving antenna section.

For example, when the optical path length difference (Lob−Loa) is 30 m, Lwa−Lwb=45 is obtained from equation (2). Accordingly, in this case, the radius of the wireless communication area 276-1 can be 100 m and the radius of the wireless communication area 276-2 can be 55 m, for example.

The above description is directed to downstream signals. Upstream signals may also be processed by adjusting the level of a wireless signal which is input to the electric-to-optical conversion section 272 in the same manner by the level adjustment section 274.

As described above, according to this embodiment, the wireless communication area can be expanded by providing a plurality of relay apparatuses. Even in the case where a wireless communication terminal receives wireless signals transmitted from a plurality of transmitting/receiving antenna sections, the delay skew among wireless signals in wireless transmission paths and optical transmission paths can be kept within a predetermined time period by gain adjustment. This can prevent signal deterioration due to multi-path interference.

The above embodiment is directed to downstream signals. Regarding upstream signals also, the delay skew among signals can be kept within a predetermined time period by gain adjustment in the same manner. Accordingly, the delay skew among wireless signals in wireless transmission paths and optical transmission paths can be kept within a predetermined time period even when the wireless signals are received from a plurality of transmitting/receiving antenna sections.

Embodiment 8

Hereinafter, Embodiment 8 of the present invention will be described. Unlike the wireless communication system according to Embodiment 7 including two relay apparatuses, a wireless communication system according to this embodiment includes three or more relay apparatuses.

Figure 26:
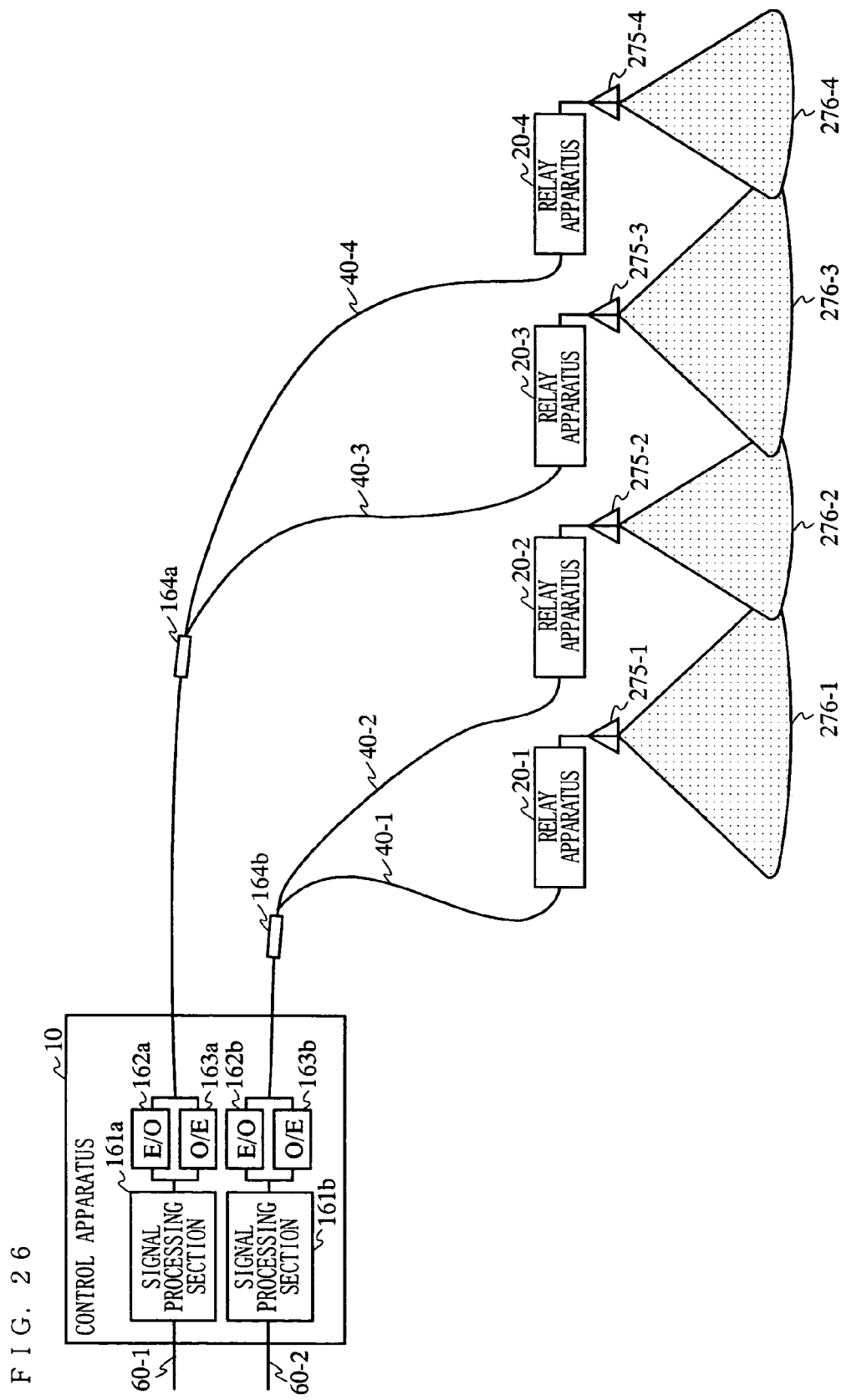
FIG. 26 is a diagram showing a structure of a wireless communication system according to Embodiment 8 of the present invention.

FIG. 26 is a diagram showing a structure of the wireless communication system according to this embodiment. The wireless communication system shown in FIG. 26 is different from the wireless communication system according to Embodiment 7 shown in FIG. 25 in further including relay apparatuses 20-3 and 20-4.

The relay apparatus 20-3 and the control apparatus 10 are connected to each other via an optical transmission path 40-3, and the relay apparatus 20-4 and the control apparatus 10 are connected to each other via an optical transmission path 40-4.

The relay apparatuses 20-1 and 20-2 communicate with a wireless communication terminal using a frequency different from the frequency of wireless signals transmitted and received between the relay apparatuses 20-3 and 20-4 and a wireless communication terminal.

The control apparatus 10 includes two sets of elements for transmitting two different frequencies, respectively. Specifically, the control apparatus 10 includes signal processing sections 161a and 161b, electric-to-optical conversion sections 162a and 162b, optical-to-electric conversion sections 163a and 163b, and optical splitting/coupling sections 164a and 164b. FIG. 26 shows only the basic structure of the control apparatus 10, like the control apparatus 10 shown in FIG. 25.

The signal processing section 161a modulates a signal transmitted from an external network via an Ethernet (registered trademark) cable 60-1 to a downstream electric signal.

The downstream electric signal is converted into a downstream optical signal by the electric-to-optical conversion section 162a and output to the optical splitting/coupling section 164a. The optical splitting/coupling section 164a splits the downstream optical signal and transmits the split downstream optical signals to the optical transmission paths 40-3 and 40-4.

The signal processing section 161b modulates a signal transmitted from an external network via an Ethernet (registered trademark) cable 60-2 to a downstream electric signal. The downstream electric signal is converted into a downstream optical signal by the electric-to-optical conversion section 162b and output to the optical splitting/coupling section 164b. The optical splitting/coupling section 164b splits the downstream optical signal and transmits the split downstream optical signals to the optical transmission paths 40-1 and 40-2.

Upstream optical signals transmitted from the relay apparatuses 20-3 and 20-4 via the optical transmission paths 40-3 and 40-4 are coupled by the optical splitting/coupling section 164b and input to the optical-to-electric conversion section 163a of the control apparatus. Upstream optical signals transmitted from the relay apparatuses 20-1 and 20-2 via the optical transmission paths 40-1 and 40-2 are coupled by the optical splitting/coupling section 164b and input to the optical-to-electric conversion section 163b of the control apparatus.

The structure of the relay apparatuses 20-3 and 20-4 is substantially the same as that of the relay apparatuses 20-1 and 20-2 shown in FIG. 25 and the description thereof will be omitted.

In the relay apparatuses 20-1 and 20-2, the level adjustment sections 273 adjust the levels of the wireless signals to be transmitted therefrom in relation with each other, so as to form the wireless communication areas 276-1 and 276-2. To the two relay apparatuses 20-1 and 20-2, optical signals which are output from the electric-to-optical conversion section 162b of the control apparatus and split by the optical splitting/coupling section 164b are transmitted. From the relay apparatuses 20-1 and 20-2, wireless signals modulated at the same frequency are transmitted.

A wireless communication area 276-3 formed by a transmitting/receiving antenna section 275-3 of the relay apparatus 20-3 overlaps a part of the wireless communication area 276-2 formed by the transmitting/receiving antenna section 275-2 of the relay apparatus 20-2. The wireless communication area 276-3 formed by the transmitting/receiving antenna section 275-3 of the relay apparatus 20-3 also overlaps a part of a wireless communication area 276-4 formed by the transmitting/receiving antenna section 275-4 of the relay apparatus 20-4.

The electric-to-optical conversion section 162a and the electric-to-optical conversion section 162b convert electric signals converted with different frequencies from each other into optical signals and output the optical signals. As a result, the relay apparatus 20-2 and the relay apparatus 20-3 transmit wireless signals converted with different frequencies from each other to the wireless communication terminal. Accordingly, even in the case where the wireless communication terminal is located in a region where the wireless communication area 276-2 formed by the relay apparatus 20-2 and the wireless communication area 276-3 formed by the relay apparatus 20-3 overlap each other, multi-path interference does not occur because the wireless signals used for the communication have different frequencies.

As described in Embodiment 7, in the relay apparatuses 20-1 and the relay apparatus 20-2, the level adjustment sections 273 adjust the gain such that the delay skew among the wireless signals to be transmitted to the region where the respective wireless zones overlap each other is kept within a predetermined time period. Similarly, in the relay apparatuses 20-3 and the relay apparatus 20-4, the level adjustment sections 273 adjust the gain such that the delay skew among the wireless signals to be transmitted to the region where the respective wireless zones overlap each other is kept within a predetermined time period. Since the relay apparatuses 20-2 and 20-3 communicate using different frequencies from each other, it is not necessary to adjust the delay skew of the signals between the relay apparatuses 20-2 and 20-3.

As the wireless modulation system, the frequency multiplexing system, the code division multiplexing system, or the like can be used. In the case of, for example, the frequency multiplexing system, the set of the relay apparatuses 20-1 and 20-2 and the set of the relay apparatuses 20-3 and 20-4 may communicate using wireless signals modulated with different frequencies from each other.

As described above, according to this embodiment, a maximum of four relay apparatuses can be installed in the wireless communication system. Provided that two relay apparatuses, between which the delay skew of signals is adjusted, is one set, two sets of devices communicate using different frequencies from each other. Accordingly, even when the wireless communication terminal receives wireless signals transmitted from a plurality of transmitting/receiving antenna sections, the delay skew among the wireless signals in the wireless transmission paths and the optical transmission paths can be kept within a predetermined time period by gain adjustment. Also, signal deterioration due to multi-path interference can be prevented.

The above embodiment is directed to downstream signals. Regarding upstream signals also, the time skew between signals can be kept within a predetermined time period by gain adjustment in the same manner. Accordingly, the time skew between wireless signals in wireless transmission paths and optical transmission paths can be kept within a predetermined time period even when the wireless signals are received from a plurality of transmitting/receiving antenna sections.

By application of this embodiment, five or more relay apparatuses can be installed.

Figure 27:
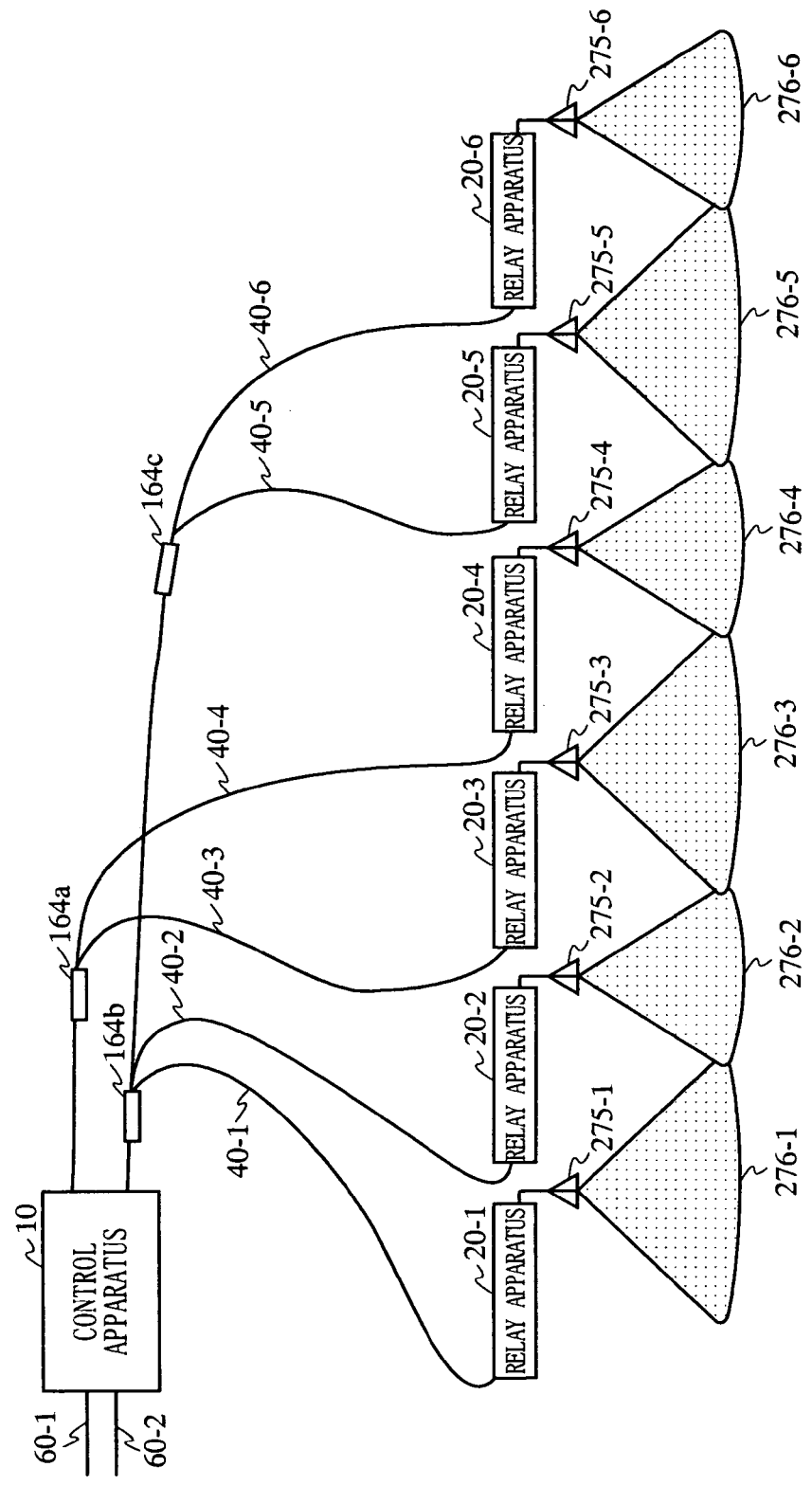
FIG. 27 is a diagram showing a structure of a wireless communication system in the case where five or more relay apparatuses are provided.

FIG. 27 is a diagram showing a structure of a wireless communication system in the case where five or more relay apparatuses are installed. In the wireless communication system shown in FIG. 26, two optical transmission paths 40-1 and 40-2 are split from the optical splitting/coupling section 164b. In contrast, in the wireless communication system shown in FIG. 27, another optical transmission paths is split from the optical splitting/coupling section 164b. Connected to the another optical transmission path split from the optical splitting/coupling section 164b is an optical splitting/coupling section 164c. The optical splitting/coupling section 164c splits the another optical transmission path split from the optical splitting/coupling section 164b to optical transmission paths 40-5 and 40-6. The optical transmission path 40-5 split by the optical splitting/coupling section 164c is connected to the relay apparatus 20-5, and the optical transmission path 40-6 split by the optical splitting/coupling section 164c is connected to the relay apparatus 20-6.

A wireless communication area 276-5 formed by a transmitting/receiving antenna section 275-5 of the relay apparatus 20-5 also overlaps a part of the wireless communication area 276-4 formed by the transmitting/receiving antenna section 275-4 of the relay apparatus 20-4. The wireless communication area 276-5 formed by the transmitting/receiving antenna section 275-5 of the relay apparatus 20-5 also overlaps a part of a wireless communication area 276-6 formed by a transmitting/receiving antenna section 275-6 of the relay apparatus 20-6.

Also in the case where the relay apparatuses 20-5 and 20-6 for transmitting wireless signals modulated with the same frequency are connected, the relay apparatuses 20-5 and 20-6 adjust the levels of the wireless signals transmitted therefrom in relation with each other. Preferably, the adjustment may be performed such that in a wireless communication terminal located at an arbitrary position, the difference between the level of the signal from the relay apparatus 20-1 or 20-2 and the level of the signal from the relay apparatus 20-5 or 20-6 is a predetermined level of higher.

For example, when transmitting a wireless LAN signal using the OFDM modulation in conformity to the IEEE802.11a Standard or the IEEE802.11g Standard, if the signal level difference is 20 dB or higher, the transmission rate is not deteriorated even if the delay skew due to the multi-path interference is 5 μsec. or longer. Therefore, a plurality of relay apparatuses can be installed so as to expand the wireless communication area while preventing multi-path interference with a simple device structure.

In the wireless communication systems shown in FIG. 26 and FIG. 27, different optical transmission paths 40-1 through 40-6 are used for transmitting desired modulated wireless signals from desired relay apparatuses. The communication may be performed using the wavelength multiplexing system which uses different wavelengths for different modulated wireless signals and transmits the signals in one optical transmission path in a multiplexing manner. Alternatively, in the case where the frequency multiplexing system is used as the wireless signal modulation system, a band-pass filter for passing only a desired frequency band may be provided in each relay apparatus.

Embodiment 9

Hereinafter, Embodiment 9 of the present invention will be described. A wireless communication system according to Embodiment 9 includes three or more relay apparatuses as in Embodiment 8, but unlike Embodiment 8, all the relay apparatuses included in the wireless communication system in Embodiment 9 communicate using the same frequency.

Figure 28:
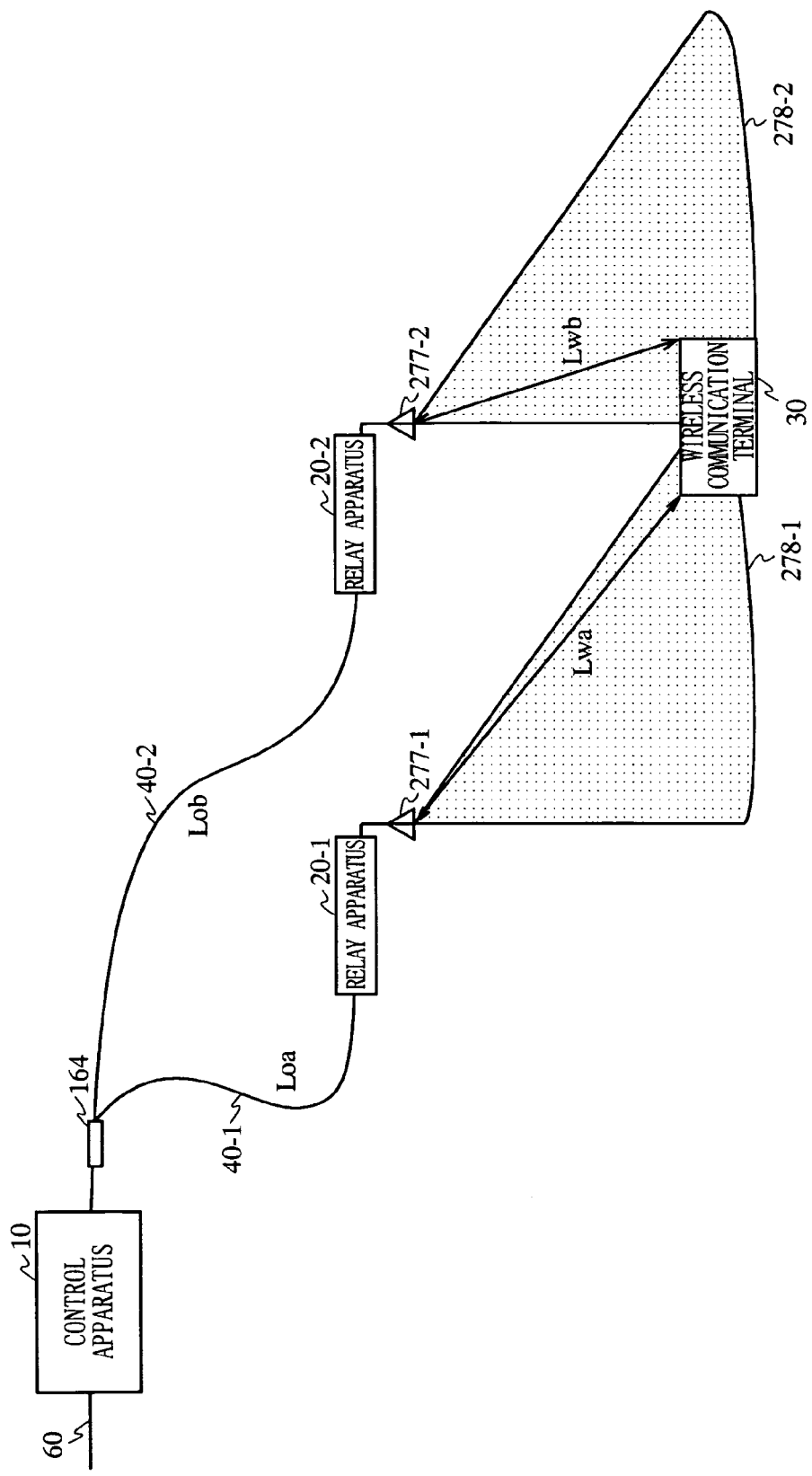
FIG. 28 is a diagram showing a structure of a wireless communication system according to Embodiment 9 of the present invention.

FIG. 28 is a diagram showing a structure of a wireless communication system in this embodiment. In FIG. 28, transmitting/receiving antenna sections 277-1 and 277-2 included in the relay apparatuses 20-1 and 20-2 respectively are each composed of a directive antenna having directivity in an oblique direction. The other elements are substantially the same as those of FIG. 25, and elements which are substantially the same as those of FIG. 25 bear identical reference numerals thereto and descriptions thereof will be omitted.

In the case where the optical transmission path 40-2 has a longer optical length than that of the optical transmission path 40-1, the transmitting/receiving antenna 277-1 of the relay apparatus 20-1 has directivity toward the relay apparatus 20-2, which is connected to the optical transmission path 40-2 having the longer optical path. Although not shown, in the case where a plurality of relay apparatuses are further connected, the transmitting/receiving antenna section of each relay apparatus has directivity toward the relay apparatus located farther.

In that case, the directive antennas 275-1 and 275-2 are adjusted such that the sum of T (Loa) and T (Lwa) equals the sum of T (Lob) and T (Lwb), wherein the sum of T (Loa) and T (Lwa) is the time required for one of the signals optically divided from the control apparatus to reach the wireless communication terminal 30 via the relay apparatus 20-1, and the sum of T (Lob) and T (Lwb) is the time required for the other of the signals optically divided from the control apparatus to reach the wireless communication terminal 30 via the relay apparatus 20-2, the signals having the same level when received by the wireless communication terminal. In other words, the directivity of each transmitting/receiving antenna 271 is adjusted so as to fulfill the relationship of equation (2) shown above. The directivity of each transmitting/receiving antenna 271 can be adjusted by changing the angle at which the antenna 271 is installed or by changing the expansion angle of the antenna 271.

For example, in the case where the fiber length difference is 30 m, Lwa−Lwb=45 (m) is obtained from equation (2) shown above. When a relay apparatus is installed in a typical house, the height of the ceiling is about 2 m. Accordingly, provided Lwb=(0) m by approximation, Lwa=45 (m). When the height of the ceiling is regarded as zero, the length of Lwa is considered to be equal to the maximum length of the wireless communication area. Therefore, the maximum length of wireless communication areas 278-1 and 278-2 can be 45 m.

As described above, according to this embodiment, the delay skew between wireless signals in wireless transmission paths and optical transmission paths can be kept within a predetermined time period. This can prevent signal deterioration due to multi-path interference.

In this embodiment, the directivity of an antenna is adjusted by changing the angle at which the antenna is installed or the expansion angle of the antenna. In the case where the gain adjustment by the level adjustment section is unnecessary, the relay apparatus does not need to include a level adjustment section. Alternatively, the gain of each transmitting/receiving antenna section may be adjusted only by adjusting the gain by the level adjustment section, without changing the angle at which the antenna is installed or the expansion angle of the antenna.

Embodiment 10

Figure 29:
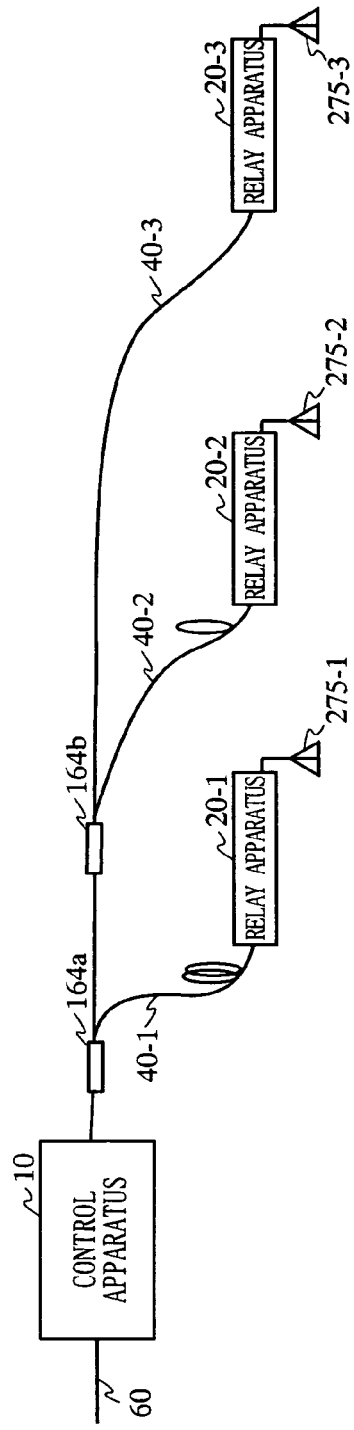
FIG. 29 is a diagram showing a structure of a wireless communication system according to Embodiment 10 of the present invention.

FIG. 29 is a diagram showing a structure of a wireless communication system according to Embodiment 10 of the present invention. In FIG. 29, elements which are substantially the same as those of FIG. 25 bear identical reference numerals thereto, descriptions thereof will be omitted, the structures thereof will be shown in the figure in a simplified manner.

In FIG. 29, relay apparatuses 20-1 through 20-3 are respectively connected to optical transmission paths 40-1 through 40-3 which are divided by the optical splitting/coupling sections 164a and 164b. As shown in FIG. 29, the optical splitting/coupling sections 164a and 164b divides one transmission path into two. The wireless communication system is structured such that one end of an optical transmission path is connected to an optical splitting/coupling section and the other end is connected to another optical splitting/coupling section or a relay apparatus. Thus, the control apparatus 10 and each relay apparatus can be connected to each other via an optical fiber of a small number of cores. At this point, the difference among the optical transmission path lengths from the control apparatus 10 to the relay apparatuses is set to be a certain length or shorter, or the total delay skew generated by the optical transmission paths and the wireless transmission paths is set to be equal to or shorter than a delay skew tolerated by the wireless communication system.

One exemplary conceivable method for keeping the difference among the lengths of the optical transmission paths for connecting the control apparatus 10 and the relay apparatuses 20 to a certain length or shorter is to provide an extra length processing section, inside or outside each relay apparatus 20, for providing a predetermined delay time to an optical signal transmitted through an optical transmission path. For example, for providing a predetermined delay time to an optical signal transmitted or received between the control apparatus 10 and the relay apparatus 20-1, an optical transmission path having a length corresponding to the delay time to be provided to the signal may be added as an extra length to the shortest optical transmission path 40-1. Preferably, the extra length processing section may be provided inside the relay apparatus 20.

Alternatively, a pseudo optical delay line (for example, grading) or the like may be provided in each optical transmission path, such that the difference among the lengths of the optical transmission paths for connecting the control apparatus 10 and the relay apparatuses 20 is a certain length or shorter.

Still alternatively, the total signal delay time generated in the optical transmission paths and the wireless transmission paths may be uniformized in advance to the maximum delay time at which the communication by the wireless communication system, in which the signals are to be transmitted, is possible. For example, a wireless LAN signal in conformity to the IEEE802.11a Standard generally tolerates a communication area of about 500 to 600 m. Therefore, for example, the optical fiber length may be 200 to 300 m, and the radius of the wireless communication area may be about 100 m. Thus, even when more relay apparatuses are additionally installed, the total signal delay skew generated in the optical transmission paths and the wireless transmission paths can be within a predetermined time period, without changing the optical fiber length or settings of the relay apparatuses.

As described above, according to this embodiment, the delay skew among wireless signals in wireless transmission paths and optical transmission paths can be kept within a predetermined time period. This can prevent signal deterioration due to multi-path interference. In the case where an extra length processing section or a pseudo optical delay line is provided, the delay skew among the signals can be within a predetermined time period without performing gain adjustment. In this case, it is not necessary to provide a level adjustment section in each relay apparatus.

In this embodiment, the wireless communication system includes three relay apparatuses, but may include four or more relay apparatuses.

Embodiment 11

Hereinafter, a wireless communication system according to Embodiment 11 of the present invention will be described. Unlike the wireless communication system according to Embodiment 10 in which the relay apparatuses are connected in a bus state, the wireless communication system according to this embodiment includes relay apparatuses connected in a star state.

Figure 30:
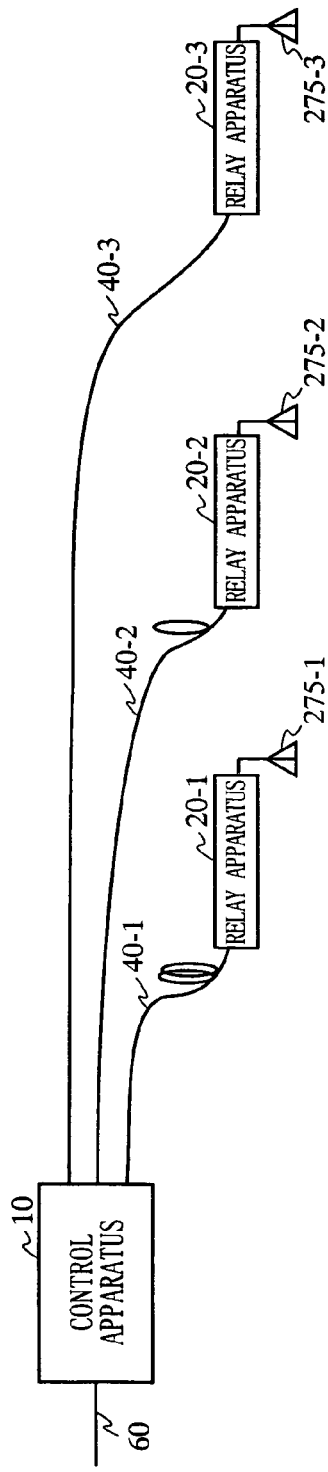
FIG. 30 is a diagram showing a structure of a wireless communication system according to Embodiment 11 of the present invention.

FIG. 30 is a diagram showing a structure of the wireless communication system according to Embodiment 11 of the present invention. In FIG. 30, elements which are substantially the same as those of FIG. 25 bear identical reference numerals thereto, descriptions thereof will be omitted, and the structures thereof will be shown in the figure in a simplified manner.

In FIG. 30, an optical splitting/coupling section (not shown) is provided inside the control apparatus 10. The optical splitting/coupling section may alternatively be provided in an optical transmission path. The optical splitting/coupling section splits one optical path to a plurality of optical transmission paths 40-1 through 40-3. The relay apparatuses 20-1 through 20-3 are connected to the optical transmission paths 40-1 through 40-3, respectively.

Preferably, the number to which an optical signal is divided is a desired number or larger, and empty ports are terminated. When more relay apparatuses are installed, this allows optical fibers to be newly connected easily to the empty ports of the optical divider. This also prevents the received optical power in the relay apparatuses already installed from being changed by the addition of the new relay apparatuses. Therefore, the gain of the amplifier in each relay apparatus can be preset to the optimum point.

It is preferable, as in Embodiment 9, to keep the difference the optical transmission path lengths from the control apparatus 10 to the relay apparatuses 20 to a certain length or shorter, or to keep the total signal delay skew generated in the optical transmission paths and the wireless transmission paths to equal to or shorter than a delay skew tolerated by the wireless communication system. Alternatively, the total signal delay times generated in the optical transmission paths and the wireless transmission paths may be uniformized in advance to the maximum delay time at which the communication by the wireless communication system, in which the signals are to be transmitted, is possible.

As described above, according to this embodiment, the delay skew among wireless signals in the wireless transmission paths and the optical transmission paths can be kept within a predetermined time period. This can prevent signal deterioration due to multi-path interference. In the case where an extra length processing section or a pseudo optical delay line is provided, the delay skew among the signals can be kept within a predetermined time period without performing gain adjustment. In this case, it is not necessary to provide a level adjustment section in each relay apparatus.

In this embodiment, the wireless communication system includes three relay apparatuses, but may include four or more relay apparatuses.

Embodiment 12

Figure 31:
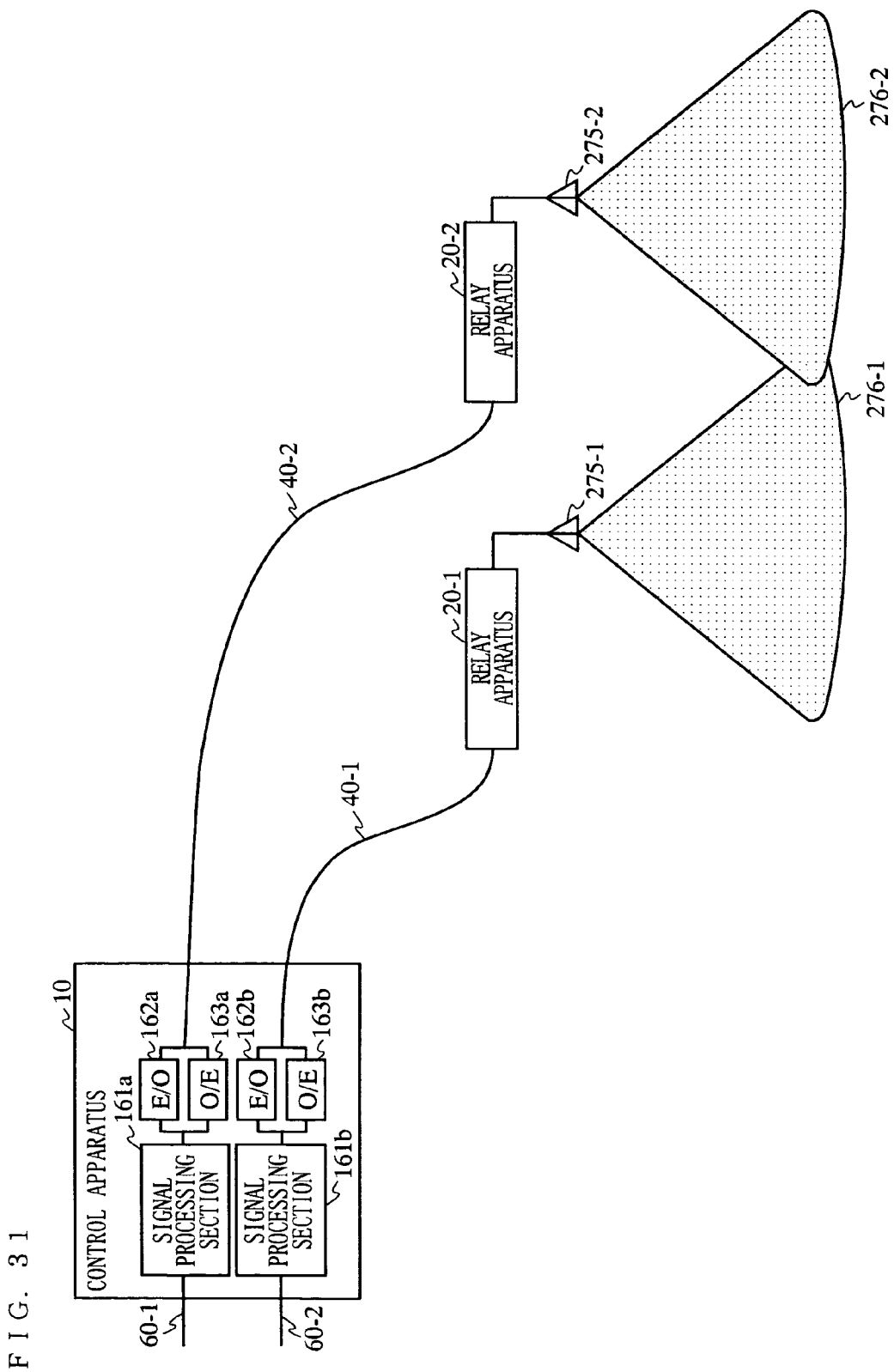
FIG. 31 is a diagram showing a structure of a wireless communication system according to Embodiment 12 of the present invention.

FIG. 31 is a diagram showing a structure of a wireless communication system according to Embodiment 12 of the present invention. In FIG. 31, elements which are substantially the same as those of FIG. 26 bear identical reference numerals thereto and descriptions thereof will be omitted.

In the control apparatus 10, a downstream optical signal which is output from the electric-to-optical conversion section 162a is transmitted to the relay apparatus 20-2 via the optical transmission path 40-2. A downstream optical signal which is output from the electric-to-optical conversion section 162b is transmitted to the relay apparatus 20-1 via the optical transmission path 40-1.

The wireless communication area 276-1 formed by the receiving antenna section 275-1 of the relay apparatus 20-1 overlaps a part of the wireless communication area 276-2 formed by the receiving antenna section 275-2 of the relay apparatus 20-2.

A modulation signal which is output from the signal processing section 161a to the electric-to-optical conversion section 162a and a modulation signal which is output from the signal processing section 161b to the electric-to-optical conversion section 162b have different frequencies from each other.

As the signal modulation system, the frequency multiplexing system or the code division multiplexing system can be used. In the case where, for example, the frequency multiplexing system is used, the relay apparatus 20-1 and the relay apparatus 20-2 may communicate using wireless signals modulated with different frequencies from each other.

Thus, the wireless signals modulated with different frequencies are transmitted from the relay apparatuses 20-1 and 20-2 as shown in FIG. 31, and therefore multi-path interference is not generated.

As described above, according to this embodiment, relay apparatuses adjacent to each other communicate using different frequencies, and therefore multi-path interference is not generated. Accordingly, signal deterioration due to multi-path interference can be prevented.

In this embodiment, the wireless communication system includes two relay apparatuses, but may include three or more relay apparatuses.

Figure 32:
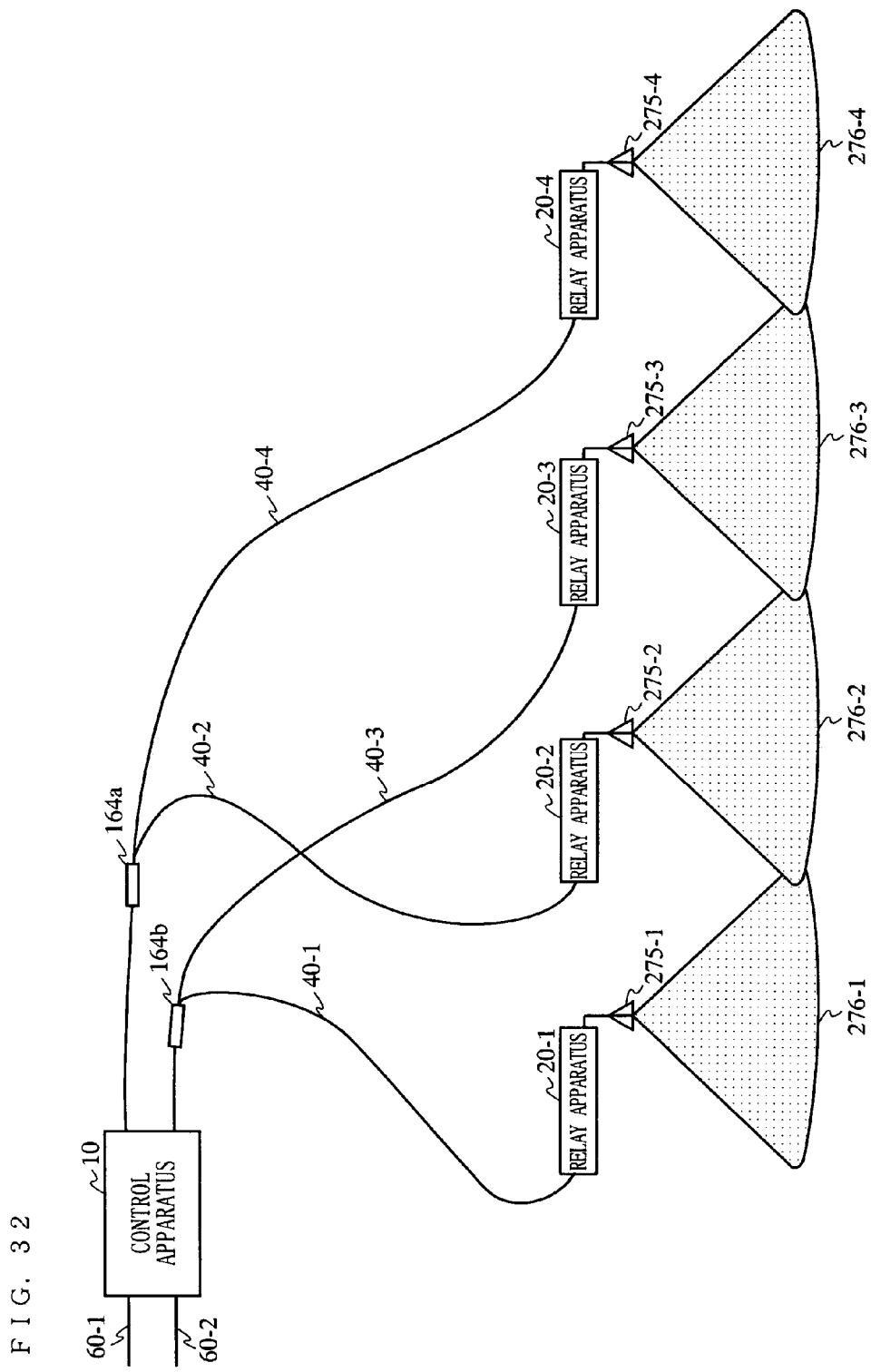
FIG. 32 is a diagram showing a structure of a wireless communication system including four relay apparatuses in Embodiment 12.

FIG. 32 is a diagram showing a structure of a wireless communication system including four relay apparatuses. The wireless communication system shown in FIG. 32 is different from the wireless communication system according to Embodiment 8 shown in FIG. 26 in the positions of relay apparatuses. The other parts of the structure are substantially the same as those in FIG. 26, and elements which are substantially the same as those of FIG. 2 bear identical reference numerals thereto and descriptions thereof will be omitted.

In FIG. 32, the optical splitting/coupling section 164*a* splits an optical signal which is output from the electric-to-optical conversion section 162*a* of the control apparatus 10 to the optical transmission paths 40-2 and 40-4. The optical splitting/coupling section 164*b* splits an optical signal which is output from the electric-to-optical conversion section 162*b* of the control apparatus 10 to the optical transmission paths 40-1 and 40-3.

The relay apparatuses 20-1 through 20-4 each communicate using a wireless signal having a different frequency from that of an adjacent relay apparatus. For example, the wireless communication area 276-2 formed by the transmitting/receiving antenna section 275-2 of the relay apparatus 20-2 overlaps a part of the wireless communication area 276-1 formed by the transmitting/receiving antenna section 275-1 of the relay apparatus 20-1 and a part of the wireless communication area 276-3 formed by the transmitting/receiving antenna section 275-3 of the relay apparatus 20-3. The relay apparatuses 20-1 and 20-3 communicate using wireless signals having the same frequency, but the relay apparatus 20-2 communicates using a wireless signal having a different frequency from the relay apparatuses 20-1 and 20-3. Accordingly, relay apparatuses communicating using the same frequency, among the relay apparatuses 20-1 through 20-3, do not have communication areas thereof overlapping each other. Therefore, multi-path interference is not generated.

The relay apparatus 20-4 also communicates using a wireless signal having a different frequency from the relay apparatus 20-3, which has a partially overlapping wireless communication area with the relay apparatus 20-4. Therefore, multi-path interference is not generated between the relay apparatuses 20-3 and 20-4.

By locating the relay apparatuses such that two adjacent relay apparatuses communicate using wireless signals having different frequencies in this manner, generation of multi-path interference can be prevented.

In FIG. 31 and FIG. 32, different optical transmission paths 40-1 through 40-4 are used for transmitting desired modulated wireless signals from desired relay apparatuses. The communication may be performed using the wavelength multiplexing system which uses different wavelengths for different modulated wireless signals and transmits the signals in one optical transmission path in a multiplexing manner. In the case where the frequency multiplexing system is used as the wireless signal modulation system, a band-pass filter for passing only a desired frequency band may be provided in each relay apparatus.

In Embodiments 1 through 12, wireless communication systems which can fulfill the first through third requirements, which are not fulfilled by the conventional wireless communication systems, have been described. The first requirement is that the levels of wireless signals to be received by the relay apparatus need to be kept within a predetermined range. The second requirement is that the leakage ratio of wireless signals needs to be kept to a certain level or lower. The third requirement is that the D/U ratio of wireless signals received by the relay apparatus needs to be kept to a certain level or higher. In the above-described embodiments, the levels of the wireless signals transmitted from a wireless communication terminal are kept within a predetermined range by narrowing the communicable area of the relay apparatus. Alternatively, the relay apparatus may be structured so as not to receive a wireless signal having too high a level, such that the levels of the wireless signals received by the relay apparatus are kept within a range tolerated by the electric-to-optical converter. Hereinafter, wireless communication systems will be described, in which the relay apparatus receives only wireless signals having levels tolerable by the electric-to-optical converter so as to fulfill the first requirement, and thus realize high quality optical transmission of wireless signals.

Embodiment 13

Figure 33:
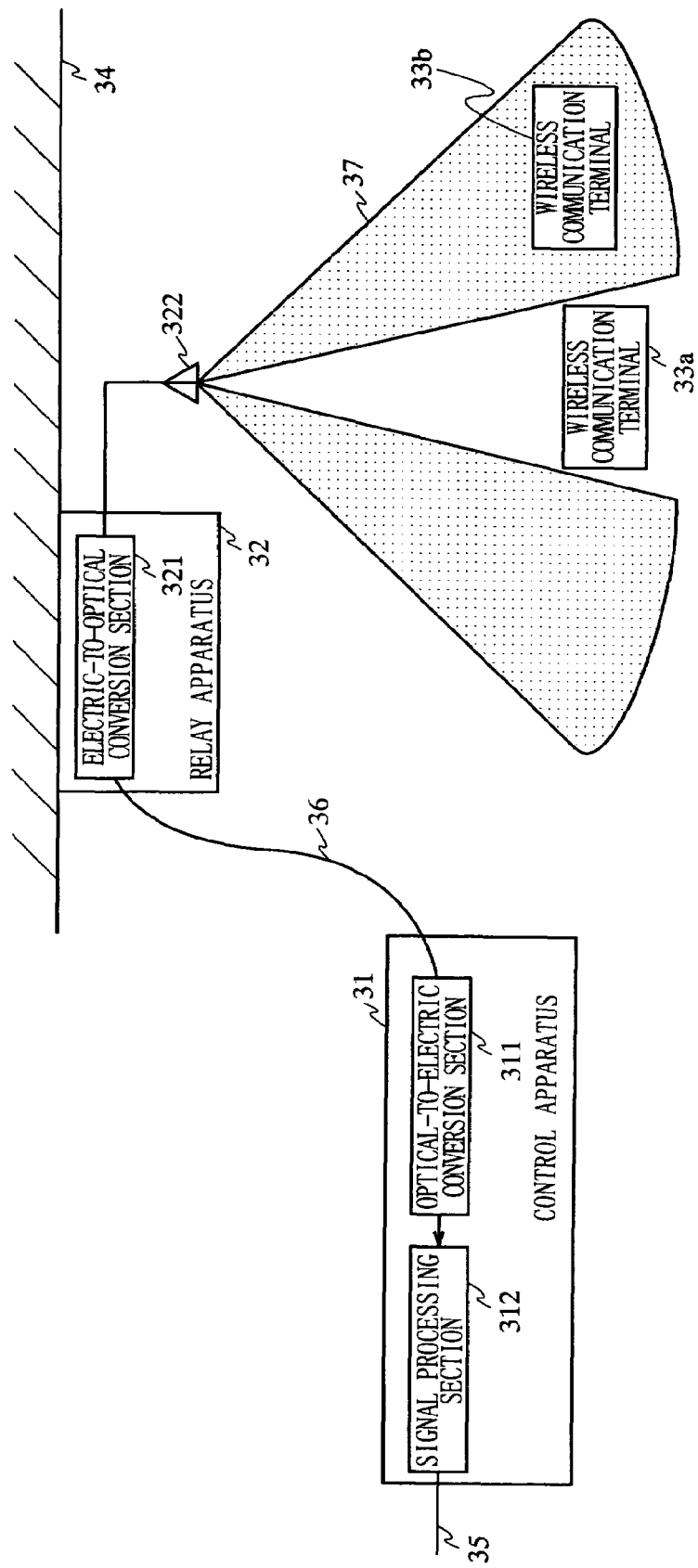
FIG. 33 is a diagram showing a structure of a wireless communication system according to Embodiment 13 of the present invention.

FIG. 33 is a diagram showing a structure of a wireless communication system according to Embodiment 13 of the present invention. In FIG. 33, the wireless communication terminal includes a control apparatus 31, a relay apparatus 32, and wireless communication terminals 33*a* and 33*b*. The control apparatus 31 includes an optical-to-electric conversion section 311 and a signal processing section 312. The relay apparatus 32 includes a receiving antenna section 322 and an electric-to-optical conversion section 321. It should be noted that in the case where it is unnecessary to distinguish the wireless communication terminals 33*a* and 33*b* from each other, the wireless communication terminals 33*a* and 33*b* will be collectively referred to as the "wireless communication terminal 33".

The wireless communication terminals 33*a* and 33*b* and the relay apparatus 32 are connected to each other wirelessly. The relay apparatus 32 and the control apparatus 31 are connected to each other via an optical fiber 36. The control apparatus 31 and an external network (not shown) are connected to each other via an Ethernet (registered trademark) cable 35.

FIG. 33 only shows an upstream transmission system and omits a downstream transmission system. The external network and the control apparatus 31 may alternatively be connected to each other via a transmission path other than the Ethernet (registered trademark) cable; for example, a telephone line, a coaxial cable, or an optical fiber. In FIG. 33, two wireless communication terminals exist in a wireless communication zone, but one, or three or more, wireless communication terminals may exist in the wireless communication zone. Hereinafter, an operation of the wireless communication system for transmitting upstream signals will be described.

The wireless communication terminals 33*a* and 33*b* transmit a wireless signal to the relay apparatus 32. The relay apparatus 32 is installed on a ceiling 34 of a building, and the receiving antenna section 322 receives the wireless signal transmitted from each of the wireless communication terminals 33a and 33b. The electric-to-optical conversion section 321 is an optical transmitting section for converting an electric signal received by the receiving antenna section 322 into an optical signal. The optical signal converted by the electric-to-optical conversion section 321 is transmitted through the optical fiber 36 and input to the optical-to-electric conversion section 311 of the control apparatus 31.

In the control apparatus 31, the optical-to-electric conversion section 311 converts the input optical signal into an electric signal. The signal processing section 312 demodulates the electric signal to a signal in a state to be transmitted to the external network. The demodulated signal is transmitted outside via the Ethernet (registered trademark) cable 35.

Figure 34:
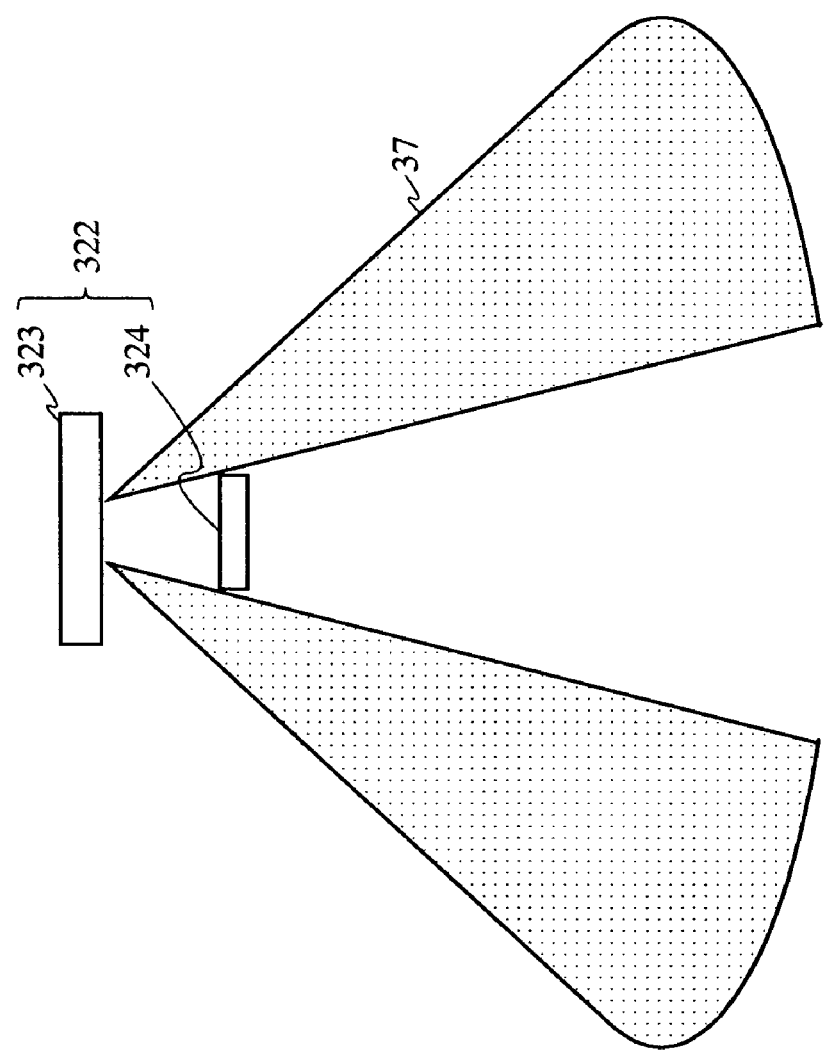
FIG. 34 is a diagram showing a structure of a receiving antenna section shown in FIG. 33.

FIG. 34 is a diagram schematically showing a structure of the receiving antenna section 322 shown in FIG. 33 and a receiving area 37 thereof. As shown in FIG. 34, the receiving antenna section 322 includes a directive antenna 323 and a radiowave absorber 324. The directive antenna 323 is, for example, a planar antenna. In the receiving antenna section 322, the radiowave absorber 324 is installed right below the directive antenna 323. The radiowave absorber 324 is installed a certain distance away from the directive antenna 323. The radiowave absorber 324 is, for example, a sintered body of rubber or ferrite, and absorbs a predetermined frequency of radiowave. The antenna included in the receiving antenna section may alternatively be an omni-directive antenna.

By providing the radiowave absorber 324 right below the directive antenna 323 as described above, the receiving sensitivity of the receiving antenna section 322 with respect to a direction right below the receiving antenna section 322 and the vicinity thereof is attenuated. Accordingly, a wireless signal transmitted by the wireless communication terminal 33a located in an area right below the receiving antenna section 322 or in the vicinity thereof is absorbed by the radiowave absorber 324 and, as a result, reaches the directive antenna 323 in an attenuated state.

On the other hand, a wireless communication terminal located far from the receiving antenna section 322 (here, the wireless communication terminal 33b) reaches the directive antenna 323 without being absorbed by the radiowave absorber 324. The levels of the wireless signals received by the relay apparatus depends on the distance between the relay apparatus 32 and the wireless communication terminals 33a and 33b. Accordingly, a wireless signal transmitted from the wireless communication terminal far from the receiving antenna section 322 is attenuated to some extent while being propagated in the wireless communication zone, but can be received by the receiving antenna section 322 with a high gain.

By installing a radiowave absorber right below the directive antenna as described above, the wireless communication terminal located in an area right below the receiving antenna section 322 or in the vicinity thereof is excluded from the receiving area 37 of the receiving antenna section 322. The receiving antenna section 322 receives a wireless signal transmitted from inside the receiving area 37 with a high gain, and receives a wireless signal transmitted from outside the receiving area 37 with a low gain.

By changing the area or the thickness, and the position of installment, of the radiowave absorber 324, the attenuation amount of the radiowave can be adjusted. Thus, the receiving gain of the receiving antenna section 322 with respect to the signal transmitted from a vertical direction can be adjusted in accordance with the dynamic range tolerated by the electric-to-optical conversion section 321.

Figure 35:
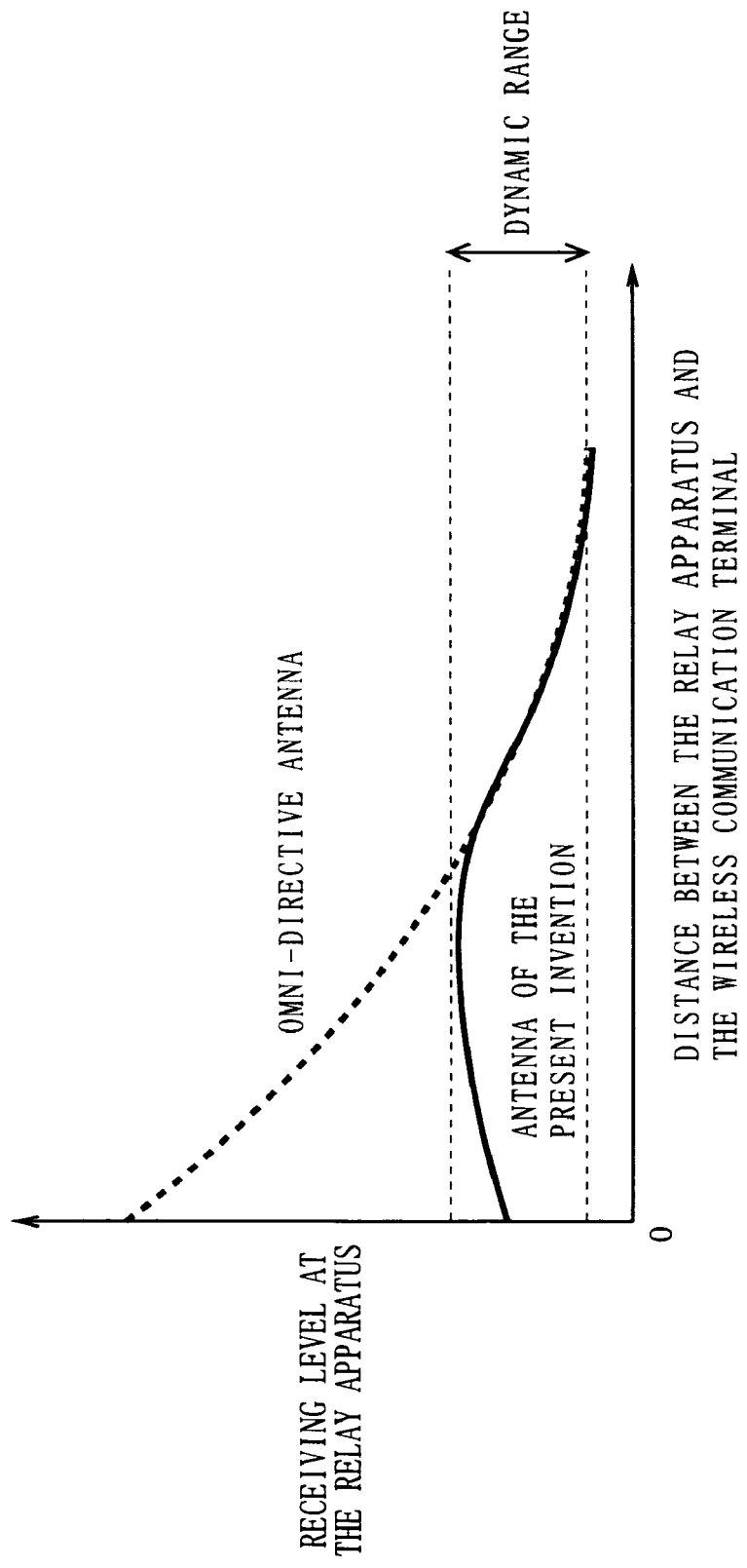
FIG. 35 is a graph showing the relationship between the level of a signal received by a relay apparatus and the distance between the relay apparatus and a wireless communication terminal.

FIG. 35 is a graph showing the relationship between the level of a wireless signal received by the relay apparatus 32 and the distance between the relay apparatus 32 and the wireless communication terminal 33. In FIG. 35, the vertical axis represents the level of a wireless signal received by the relay apparatus 32. The horizontal axis represents the distance between the relay apparatus 32 and the wireless communication terminal 33. The dashed line represents a change in the receiving level in the case where the receiving antenna section is a conventional receiving antenna, i.e., in the case where the receiving antenna section 322 includes only an omni-directive antenna. The solid line represents a change in the receiving level at the receiving antenna section 322 according to the present invention.

As shown in FIG. 35, when the conventional omni-directive antenna section receives a wireless signal transmitted from a position in a close range, the receiving level of the wireless signal is too high and exceeds the upper limit tolerated by the electric-to-optical conversion section 321. When a wireless signal having such a high level is converted into an optical signal, the optical signal is distorted. Therefore, high quality optical transmission cannot be performed.

On the other hand, in the case of the receiving section 322 according to the present invention, the receiving gain of a wireless signal transmitted from a vertical direction is restricted. Since the wireless signal transmitted from the vertical direction, i.e., from a position in a close range, is received with a low gain for this reason, the wireless signal can be kept within the dynamic range tolerated by the electric-to-optical conversion section 321.

As described above, the receiving antenna section 322 receives a wireless signal having a high level which is transmitted from a wireless communication terminal located close thereto with a low gain, and receives a wireless signal having a low level which is transmitted from a wireless communication terminal located far therefrom with a high gain. Accordingly, the signal level difference between the wireless signals which are input to the electric-to-optical conversion section 321 can be reduced. Thus, regardless of the distance between the wireless communication terminal and the relay apparatus, signals transmitted from wireless communication terminals located in a wide area can be received with levels within the dynamic range tolerated by the electric-to-optical conversion section 321. Therefore, high quality optical transmission of the signals can be realized. In addition, since the signal level difference among the wireless signals which are input to the electric-to-optical conversion section 321 is reduced, the restriction on the dynamic range required by the electric-to-optical conversion section 321 can be alleviated.

As described above, according to this embodiment, even in the case where wireless communication terminals exist in a wide area, the wireless signals transmitted from the wireless communication terminals can be input to the electric-to-optical conversion section with the signal level difference among the wireless signals being reduced. Accordingly, the received wireless signals can be kept within a dynamic range tolerated by the electric-to-optical conversion section without adding the AGC function to the relay apparatus. This can simplify the structure of the wireless communication system and realize low cost construction of the system.

Alternatively, an amplifier or an attenuator may be provided between the receiving antenna section and the electric-to-optical conversion section. This allows the signal level of the received signal to be adjusted with higher precision. In this case also, it is only necessary to provide a simple amplifier or attenuator having a constant gain. Therefore, the structure of the wireless communication system can be simplified as compared with the case where an AGC circuit is provided.

FIG. 33 only shows an upstream transmission system and omits a downstream transmission system. When transmitting downstream signals, the levels of the signals which are input from the signal processing section 312 to the electric-to-optical conversion section (not shown) in the control apparatus 31 are approximately constant, and so it is not necessary to perform specific adjustment for each signal. Accordingly, the downstream transmission system for transmitting a signal from the control apparatus 31 to each of the wireless communication terminals 33a and 33b merely requires the conventional structure.

In the case where the D/U ratio of the wireless signal transmitted or received by the relay apparatus cannot fulfill a predetermined D/U ratio, an attenuator for attenuating the level of the received wireless signal may be provided in the relay apparatus. This reduces the level difference among the wireless signals received by the relay apparatus. Therefore, the difference between the level of the wireless signal, and the level of a signal leaking from another channel when a plurality of channels are used for communication, can be increased. Accordingly, normal communication is made possible without being jammed by a signal leaking from another channel.

Embodiment 14

Figure 36:
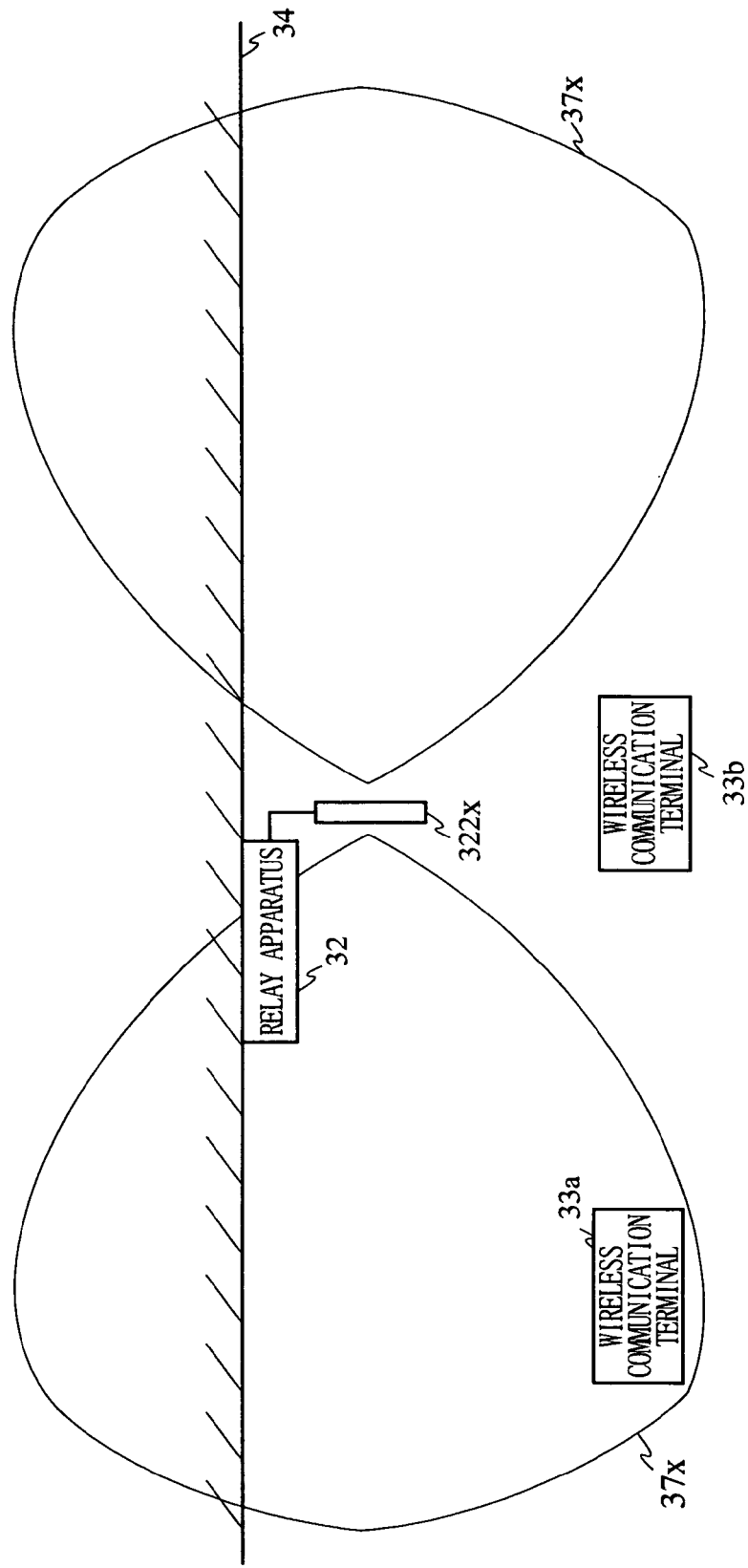
FIG. 36 is a partial view of a wireless communication terminal according to Embodiment 14 of the present invention, which schematically shows a structure of a receiving antenna section and a cross section of a receiving area thereof.

FIG. 36 is a partial view of a wireless communication terminal according to Embodiment 14 of the present invention, which schematically shows a structure of a receiving antenna section 322x and a cross section of a receiving area 37x thereof. In Embodiment 13, the receiving antenna section includes a directive antenna and a radiowave absorber. The receiving antenna section 322x in this embodiment is different from that of Embodiment 13 in including a pole antenna. The other parts of the structure are substantially the same as those of Embodiment 13, and elements which are substantially the same as those of Embodiment 13 bear identical reference numerals thereto and descriptions thereof will be omitted.

As shown in FIG. 36, the relay apparatus 32 including the receiving antenna section 322x is installed on a ceiling 34 of a building. The pole antenna forming the receiving antenna section 322x is a linear antenna, and has a slightly distorted circular two-way directivity (also referred to as a "figure eight directivity"), the peak of which is in a direction perpendicular to the longitudinal direction of the pole. FIG. 36 merely shows a cross section of the receiving area 37x, and in actuality, the receiving area 37x is formed to be in a donut-shape having the receiving antenna section 322x at the center.

In the case where the relay apparatus 32 is installed on the ceiling 34 of the building, the wireless communication terminal close to the relay apparatus 32 is a wireless communication terminal located in an area right below the relay apparatus 32 or in the vicinity thereof (here, the wireless communication terminal 33b). On the other hand, the wireless communication terminal far from the relay apparatus 32 is a wireless communication terminal located far from the area right below the relay apparatus 32 (here, the wireless communication terminal 33a).

The receiving antenna section 322x of the relay apparatus 32 is installed so as not to encompass the wireless communication terminal 33b located close thereto in the receiving area of the receiving antenna section 322x. By, for example, installing the receiving antenna section 322x such that the longitudinal direction of a multi-purpose pole antenna is parallel to the vertical direction, the directivity of the receiving antenna section 322x with respect to the vertical direction is restricted. As a result, the receiving antenna section 322x has the receiving area 37x having a restricted receiving sensitivity with respect to the vertical direction. The receiving antenna section 322x receives a wireless signal transmitted from a wireless communication terminal located in the receiving area 37x with a high gain, and receives a wireless signal transmitted from a wireless communication terminal located outside the receiving area 37x with a low gain.

By installing the relay apparatus 32 on the ceiling 34 as described above, the wireless communication terminal 33b located in an area right below the relay apparatus 32 or in the vicinity thereof is not encompassed in the receiving area 37x of the receiving antenna section 322x. Therefore, the receiving antenna section 322x receives a wireless signal transmitted by the wireless communication terminal 33b with a low gain. On the other hand, the wireless communication terminal 33a located far from the relay apparatus 32 is encompassed in the receiving area 37x of the receiving antenna section 322x. Therefore, the receiving antenna section 322x receives a wireless signal transmitted by the wireless communication terminal 33a with a high gain.

As described above, according to this embodiment, regardless of the distance between the wireless communication terminal and the relay apparatus, signal levels of wireless signals which are input to the electric-to-optical conversion section can be kept within the dynamic range tolerated by the electric-to-optical conversion section. In addition, the directivity of the receiving antenna section with respect to the vertical direction can be restricted without providing a radiowave absorber. Therefore, the structure of the system can be more simplified than in the case where the receiving antenna section includes a radiowave absorber.

Embodiment 15

Figure 37:
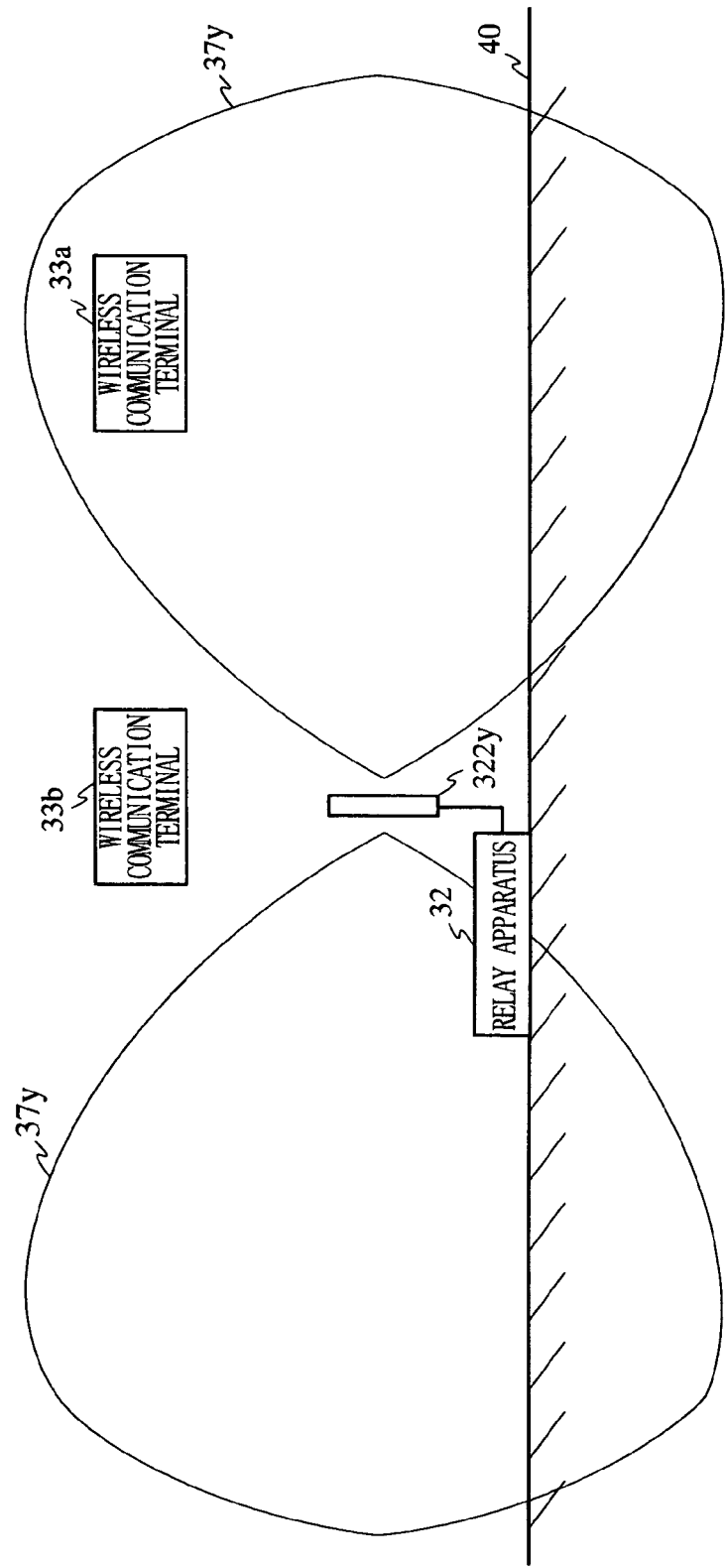
FIG. 37 is a partial view of a wireless communication terminal according to Embodiment 15 of the present invention, which schematically shows a structure of a receiving antenna section and a receiving area thereof.

FIG. 37 is a partial view of a wireless communication terminal according to Embodiment 15 of the present invention, which schematically shows a structure of a receiving antenna section 322y and a cross section of a receiving area 37y thereof. In Embodiment 13, the relay apparatus 32 is installed on the ceiling. By contrast, in this embodiment, the relay apparatus 32 is installed on a floor 40. The receiving antenna section 322y includes a pole antenna. The other parts of the structure are substantially the same as those of Embodiment 13, and elements which are substantially the same as those of Embodiment 13 bear identical reference numerals thereto and descriptions thereof will be omitted.

In the case where the relay apparatus 32 is installed on the floor 40 of a building, the wireless communication terminal close to the relay apparatus 32 is a wireless communication terminal located in an area right above the relay apparatus 32 or in the vicinity thereof (here, the wireless communication terminal 33b). On the other hand, the wireless communication terminal far from the relay apparatus 32 is a wireless communication terminal located far from the area right above the relay apparatus 32 (here, the wireless communication terminal 33a).

The receiving antenna section 322y of the relay apparatus 32 is installed so as not to encompass the wireless communication terminal 33b located close thereto in the receiving area of the receiving antenna section 322y. By, for example, installing the receiving antenna section 322y such that the longitudinal direction of a multi-purpose pole antenna is parallel to the vertical direction as shown in FIG. 37, the directivity of the receiving antenna section 322y with respect to the vertical direction is restricted. As a result, the receiving antenna section 322y has the receiving area 37y having a restricted receiving sensitivity with respect to the vertical direction. The receiving antenna section 322y receives a wireless signal transmitted from a wireless communication terminal located in the receiving area 37y with a high gain, and receives a wireless signal transmitted from a wireless communication terminal located outside the receiving area 37y with a low gain.

By installing the relay apparatus 32 on the floor 40 as described above, the wireless communication terminal 33b located in an area right above the relay apparatus 32 or in the vicinity thereof is not encompassed in the receiving area 37y of the receiving antenna section 322y. Therefore, the receiving antenna section 322y receives a wireless signal transmitted by the wireless communication terminal 33b with a low gain. On the other hand, the wireless communication terminal 33a located far from the relay apparatus 32 is encompassed in the receiving area 37y of the receiving antenna section 322y. Therefore, the receiving antenna section 322y receives a wireless signal transmitted by the wireless communication terminal 33a with a high gain.

As described above, according to this embodiment, regardless of the distance between the wireless communication terminal and the relay apparatus, signal levels of wireless signals which are input to the electric-to-optical conversion section can be kept within the dynamic range tolerated by the electric-to-optical conversion section. In addition, the directivity of the receiving antenna section with respect to the vertical direction can be restricted without providing a radiowave absorber. Therefore, the structure of the system can be more simplified than in the case where the receiving antenna section includes a radiowave absorber.

In this embodiment, the receiving antenna section is composed of a pole antenna, but may be composed of an omnidirective antenna and a radiowave absorber. In that case, the radiowave absorber may be provided above the omni-directive antenna.

Embodiment 16

Figure 38:
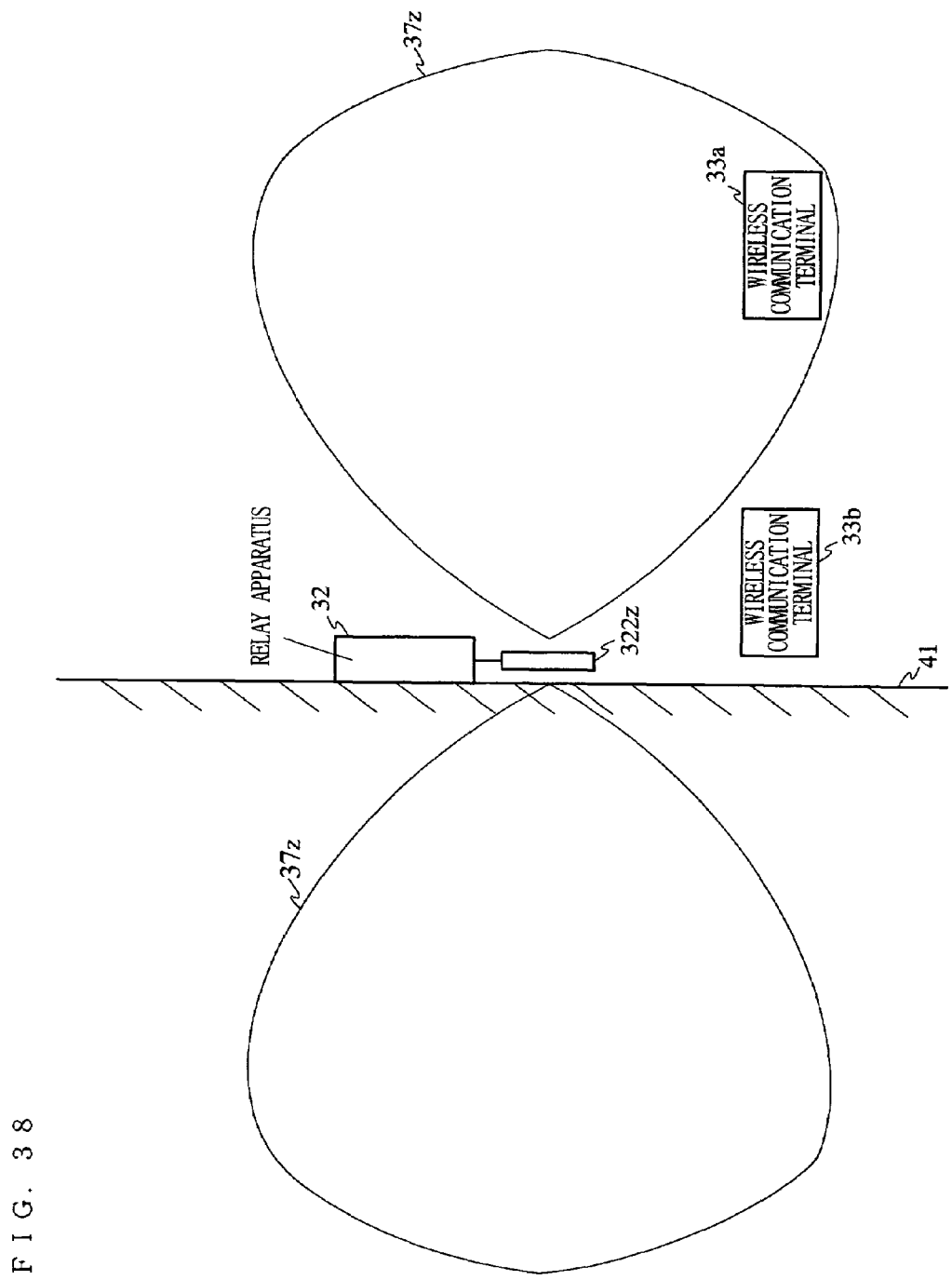
FIG. 38 is a partial view of a wireless communication terminal according to Embodiment 16 of the present invention, which schematically shows a structure of a receiving antenna section and a receiving area thereof.

FIG. 38 is a partial view of a wireless communication terminal according to Embodiment 16 of the present invention, which schematically shows a structure of a receiving antenna section 322z and a cross section of a receiving area 37z thereof. In Embodiment 13, the relay apparatus 32 is installed on the ceiling. By contrast, in this embodiment, the relay apparatus 32 is installed on a wall 41. The receiving antenna section 322z includes a pole antenna. The other parts of the structure are substantially the same as those of Embodiment 13, and elements which are substantially the same as those of Embodiment 13 bear identical reference numerals thereto and descriptions thereof will be omitted.

In the case where the relay apparatus 32 is installed on the wall 41 of a building, the wireless communication terminal close to the relay apparatus 32 is a wireless communication terminal located in an area right below the relay apparatus 32 or in the vicinity thereof (here, the wireless communication terminal 33b). On the other hand, the wireless communication terminal far from the relay apparatus 32 is a wireless communication terminal located far from the area right below the relay apparatus 32 (here, the wireless communication terminal 33a).

The receiving antenna section 322z of the relay apparatus 32 is installed so as not to encompass the wireless communication terminal 33b located close thereto in the receiving area of the receiving antenna section 322z. By, for example, installing the receiving antenna section 322z such that the longitudinal direction of a multi-purpose pole antenna is parallel to the vertical direction, the directivity of the receiving antenna section 322z with respect to the vertical direction is restricted. As a result, the receiving antenna section 322z has the receiving area 37z having a restricted receiving sensitivity with respect to the vertical direction. The receiving antenna section 322z receives a wireless signal transmitted by a wireless communication terminal located in the receiving area 37z with a high gain, and receives a wireless signal transmitted by a wireless communication terminal located outside the receiving area 37z with a low gain.

By installing the relay apparatus 32 on the wall 41 as described above, the wireless communication terminal 33b located in an area right below the relay apparatus 32 or in the vicinity thereof is not encompassed in the receiving area 37z of the receiving antenna section 322z. Therefore, the receiving antenna section 322z receives a wireless signal transmitted by the wireless communication terminal 33b with a low gain. On the other hand, the wireless communication terminal 33a located far from the relay apparatus 32 is encompassed in the receiving area 37z of the receiving antenna section 322z. Therefore, the receiving antenna section 322z receives a wireless signal transmitted by the wireless communication terminal 33a with a high gain.

As described above, according to this embodiment, regardless of the distance between the wireless communication terminal and the relay apparatus, signal levels of wireless signals which are input to the electric-to-optical conversion section can be kept within the dynamic range tolerated by the electric-to-optical conversion section. In addition, the directivity of the receiving antenna section with respect to the vertical direction can be restricted without providing a radiowave absorber. Therefore, the structure of the system can be more simplified than in the case where the receiving antenna section includes a radiowave absorber.

In this embodiment, the receiving antenna section is composed of a pole antenna, but may be composed of an omnidirective antenna and a radiowave absorber. In that case, the radiowave absorber may be provided below the omni-directive antenna.

So far, Embodiments 13 through 16 have been described. In these embodiments, the receiving antenna sections are similar in receiving a wireless signal transmitted by a wireless communication terminal located in the vertical direction with a low gain, and receiving a wireless signal transmitted by a wireless communication terminal located in directions other than the vertical direction, i.e., far from the respective receiving antenna section, with a high gain. In the above embodiments, the receiving antenna section is only required to have a structure capable of receiving wireless signals transmitted from the vertical direction with a signal level equal to or less than the upper limit of the dynamic range tolerated by the electric-to-optical conversion section, and the receiving antennas are not limited to having the above-described structures. For example, the antenna of the receiving antenna section may include an array antenna including a plurality of antennas. In this case, by setting the directivity of the plurality of antennas, which form the antenna array, in directions other than the vertical direction, the receiving gain of a wireless signal transmitted from the vertical direction can be restricted.

Embodiment 17

Figure 39:
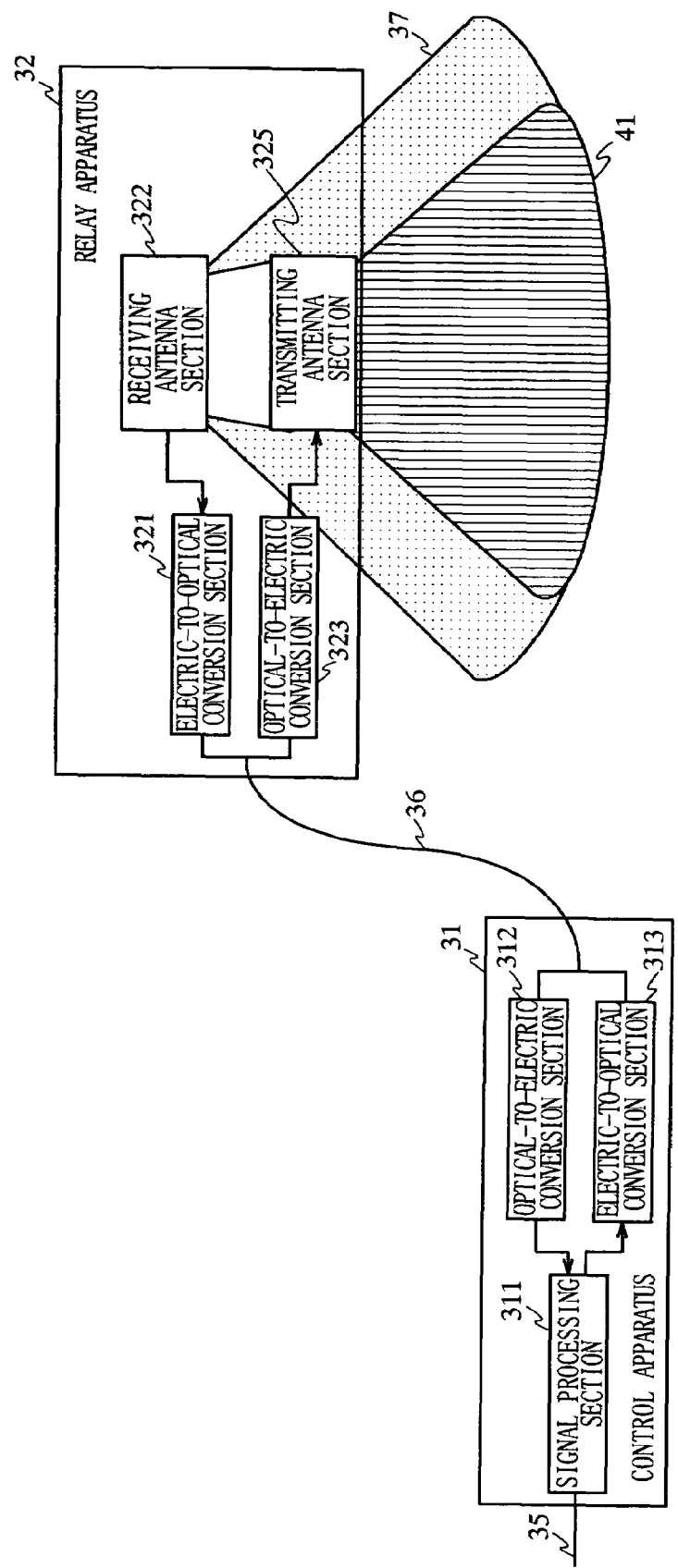
FIG. 39 is a diagram showing a structure of a wireless communication system according to Embodiment 17 of the present invention.

FIG. 39 is a diagram showing a structure of a wireless communication system according to Embodiment 17 of the present invention. The wireless communication system shown in FIG. 39 is different from the wireless communication system according to Embodiment 13 in that the relay apparatus 32 further includes a transmitting antenna section 325 and an optical-to-electric conversion section 323 and that the control apparatus 31 further includes an electric-to-optical conversion section 313. The other parts of the structure are substantially the same as those of Embodiment 13, and elements which are substantially the same as those of FIG. 33 bear identical reference numerals thereto and descriptions thereof will be omitted.

Hereinafter, an operation of the wireless communication system for transmitting a downstream signal will be described. In the control apparatus 31, the signal processing section 311 modulates a signal transmitted from an external network via the Ethernet (registered trademark) cable 35. The signal modulated by the signal processing section 311 is input to the electric-to-optical conversion section 313. The electric-to-optical conversion section 313 converts the electric signal which is input from the signal processing section 311 into an optical signal. The optical signal converted by the electric-to-optical conversion section 313 is transmitted through the optical fiber 36 and input to the optical-to-electric conversion section 323 of the relay apparatus 32.

The optical-to-electric conversion section 323 converts the optical signal which is input from the optical fiber 36 into an electric signal. The transmitting antenna section 325 transmits the electric signal to a wireless communication zone. As shown in FIG. 39, the transmitting antenna section 325 is installed right below the receiving antenna section 322. Preferably, the transmitting antenna section 325 and the receiving antenna section 322 may be located a certain distance away from each other.

A wireless signal transmitted by a wireless communication terminal located right below the receiving antenna section 322 is shielded by the transmitting antenna section 325. As a result, the receiving antenna section 322 receives the wireless signal with a low gain. On the other hand, a wireless signal transmitted by a wireless communication terminal located far from the receiving antenna section 322 is not shielded by the transmitting antenna section 325. As a result, the receiving antenna section 322 can receive the wireless signal with a high gain. Thus, by providing the transmitting antenna section 325 in the wireless communication system according to this embodiment, the receiving sensitivity of the receiving antenna section 322 with respect to the vertical direction is attenuated. Therefore, the receiving antenna section 322 can receive the level of a wireless signal which is transmitted from a position in a close range with a low gain, and receive a wireless signal which is transmitted from far with a high gain. Accordingly, the signal level difference between the wireless signals which are input to the electric-to-optical conversion section is reduced. Therefore, the restriction on the dynamic range required of the relay apparatus can be alleviated.

Preferably, the transmitting antenna section 325 may have such a directivity as to transmit a signal in the opposite direction to the direction in which the receiving antenna section 322 is installed. This can reduce the wireless signals which are by passed from the transmitting antenna section 325 to the receiving antenna section 322. As a result, signal deterioration due to oscillation in an electric circuit in the relay apparatus 32 or interference by upstream and downstream signals can be prevented.

A radiowave absorber may additionally be provided between the transmitting antenna section 325 and the receiving antenna section 322. This can further reduce the wireless signals which are bypassed from the transmitting antenna section 325 to the receiving antenna section 322.

Embodiment 18

Figure 40:
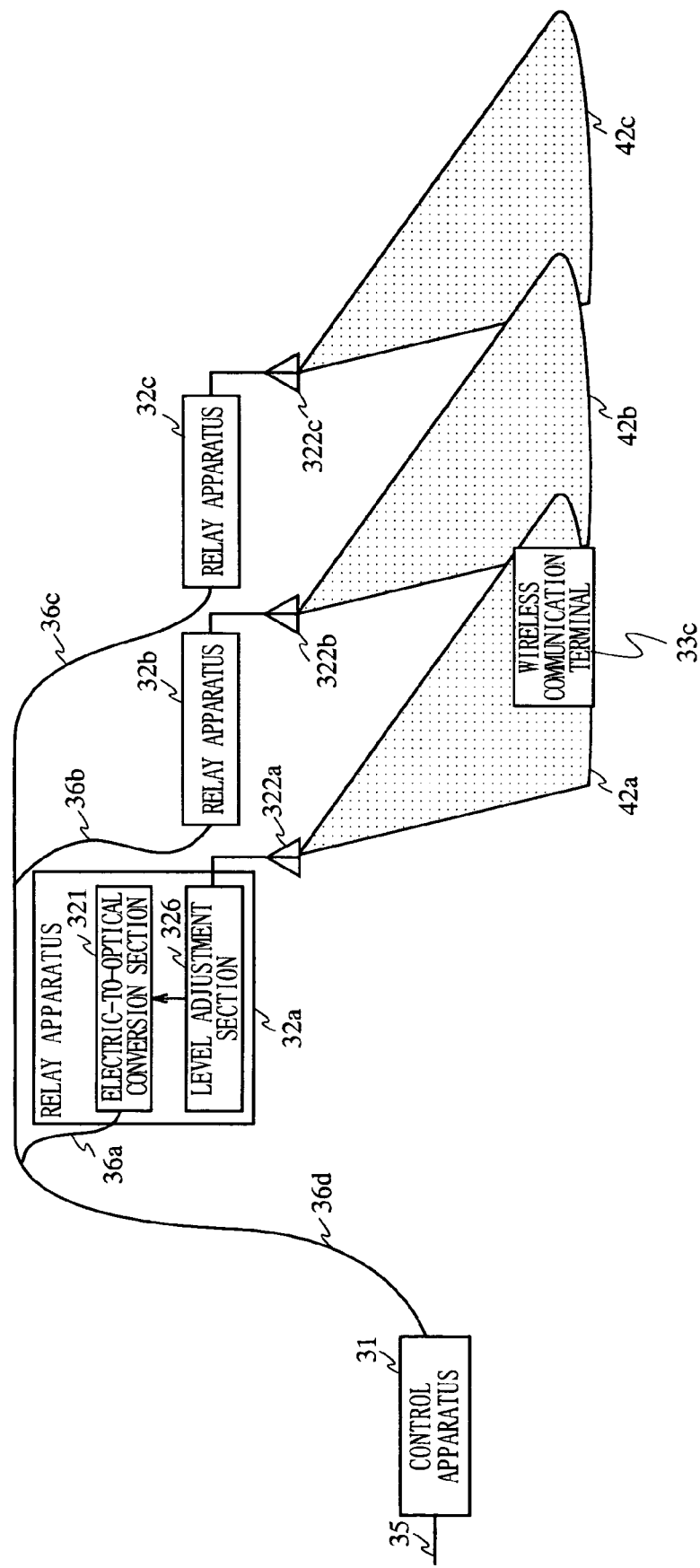
FIG. 40 is a diagram showing a structure of a wireless communication system according to Embodiment 18 of the present invention.

FIG. 40 is a diagram showing a structure of a wireless communication system according to Embodiment 18 of the present invention. In FIG. 40, the wireless communication system includes a control apparatus 31, a plurality of relay apparatuses 32a through 32c, and a wireless communication terminal 33c. The relay apparatus 32a includes an electric-to-optical conversion section 321, a receiving antenna section 322a, and a level adjustment section 326. The other parts of the structure are substantially the same as those of Embodiment 13, and elements which are substantially the same as those of embodiment 13 bear identical reference numerals thereto and descriptions thereof will be omitted. In FIG. 40, one wireless communication terminal exists in a wireless communication zone, but two or more wireless communication terminals may exist in the wireless communication zone.

In the relay apparatus 32a, the receiving antenna section 322a includes a uni-directive antenna. The uni-directive antenna is, for example, a parabolic antenna. The receiving antenna section 322a has a directivity extending in an oblique direction with respect to the vertical direction. A receiving area 42a of the receiving antenna section 322a is formed toward a relay apparatus, among the relay apparatuses adjacent to the relay apparatus 32a, which is connected to the control apparatus 31 via a longer optical transmission path (here, the relay apparatus 32b). The receiving antenna section 322a receives only wireless signals transmitted from the wireless communication terminal located in the receiving area 42a and does not receive wireless signals transmitted from outside the receiving area 42a.

The level adjustment section 326 amplifies a wireless signal received by the receiving antenna section 322a so as to adjust the signal level of the wireless signal which is to be input to the electric-to-optical conversion section 321. This will be described later in detail. The wireless signal amplified by the level adjustment section 326 is converted into an optical signal by the electric-to-optical conversion section 321. The optical signal is transmitted through optical fibers 36a and 36d and input to the control apparatus 31. The relay apparatus 32b and the relay apparatus 32c have substantially the same structure as that of the relay apparatus 32a.

In FIG. 40, the relay apparatuses 32a through 32c are connected in a bus state, but may be connected in a star state in which each relay apparatus is connected to the control apparatus 31 one to one.

Next, an operation of the wireless communication system according to this embodiment for receiving a wireless signal will be described. For example, the receiving antenna section located closest to the wireless communication terminal 33c is a receiving antenna section 322b. However, since each receiving antenna section has a directivity extending in an oblique direction with respect to the vertical direction, the wireless communication terminal 33c is not encompassed in a receiving area 42b of the receiving antenna section 322b. Instead, the wireless communication terminal 33c is encompassed in the receiving area 42a of the relay apparatus 32a adjacent to the relay apparatus 32b. Accordingly, the wireless signal transmitted by the wireless communication terminal 33c is received by the receiving antenna section 322a of the relay apparatus 32a.

As described above, each relay apparatus does not receive a wireless signal having a high level which is transmitted from a position in a close range. Accordingly, the levels of wireless signals which are input to the electric-to-optical conversion section of the relay apparatus can be kept to equal to or lower than the upper limit of the dynamic range tolerated by the electric-to-optical conversion section. Thus, by installing a plurality of relay apparatuses, a wide communication area can be covered and also high quality optical transmission of the signals can be realized.

Figure 41:
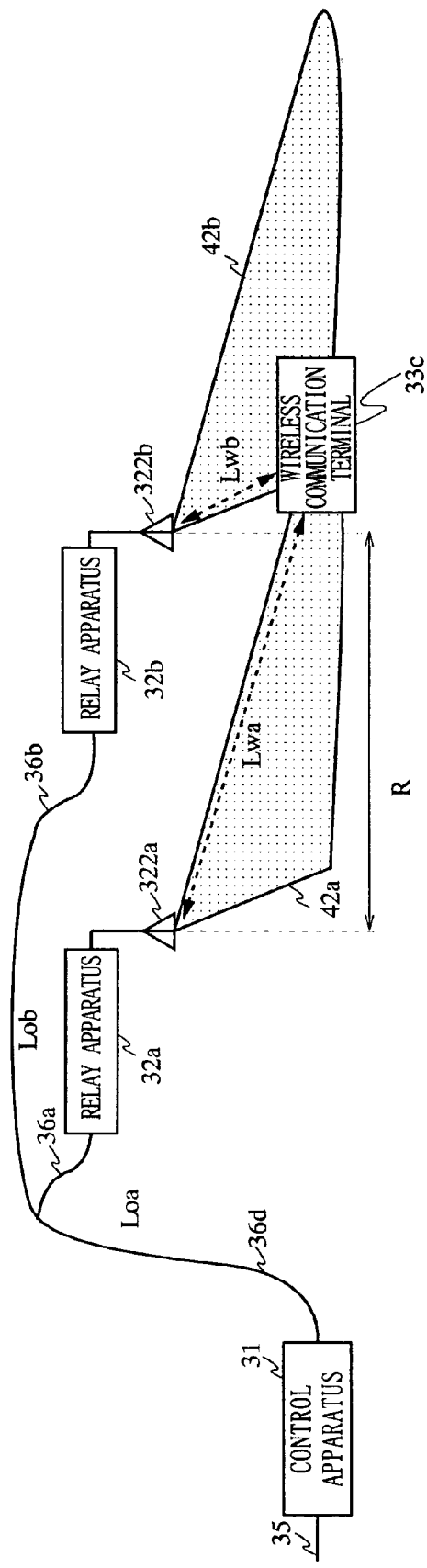
FIG. 41 is a partial view of the wireless communication system shown in FIG. 40.

Each receiving antenna section is installed such that a part of a receiving area thereof overlaps a part of a receiving area of the receiving antenna section adjacent thereto. Accordingly, the receiving area of each receiving antenna section includes a region which overlaps the receiving area of the adjacent receiving antenna section. FIG. 41 is a partial view of a wireless communication system in the case where a wireless communication terminal exists in a region where a plurality of receiving areas overlap each other. As shown in FIG. 41, the wireless communication terminal 33c exists in a region where the receiving areas 42a and 42b overlap each other. In this case, a wireless signal transmitted by the wireless communication terminal 33c is received by both of the receiving antenna sections 322a and 322b. The wireless signal received by the receiving antenna section 322a of the relay apparatus 32a is converted into an optical signal and then is transmitted through the optical fibers 36a and 36d to reach the control apparatus 31. On the other hand, the wireless signal received by the receiving antenna section 322b of the relay apparatus 32b is converted into an optical signal and then is transmitted through the optical fibers 36b and 36d and reaches the control apparatus 31.

However, the length of the optical fiber for connecting the relay apparatus 32a and the control apparatus 31 is different from the length of the optical fiber for connecting the relay apparatus 32b and the control apparatus 31. Accordingly, when a wireless signal transmitted by one wireless communication terminal is received by a plurality of receiving antenna sections, a delay skew is generated among the delay times required for signals to be transmitted through different transmission paths and reach the control apparatus 31. This causes a problem that the signals interfere with each other (multi-path interference), resulting in deterioration in the communication quality.

A total time required for a wireless signal transmitted by the wireless communication terminal 33c to be received by the receiving antenna section 322a and reach the control apparatus 31 is the sum of a propagation time T (Lwa) required for the wireless signal to be transmitted in the receiving area 42a and a transmission time T (Loa) required for the optical signal to be propagated through the optical fibers 36a and 36d. A total time required for a wireless signal transmitted by the wireless communication terminal 33c to be received by the receiving antenna section 322b and reach the control apparatus 31 is the sum of a propagation time T (Lwb) required for the wireless signal to be transmitted in the receiving area 42b and a transmission time T (Lob) required for the optical signal to be propagated through the optical fibers 36b and 36d.

Accordingly, it is understood in order to nullify the delay skew among the delay times required for the wireless signals to be received by a plurality of receiving antenna sections and to reach the control apparatus, the receiving areas 42a and 42b may be formed at such positions that the sum of the propagation time T (Loa) and the propagation time T (Lwa), and the sum of the propagation time T (Lob) and the propagation time T (Lwb), are approximately equal to each other.

For example, when the propagation rate of an optical signal propagating through an optical transmission path is 1.5 times the propagation rate of a wireless signal propagating in the air, the directivity of each receiving antenna section is adjusted so as to fulfill the following relationship, and thus the receiving areas 42a and 42b are formed.

$$Lwa-Lwb=1.5\times(Lob-Loa) \qquad (3)$$

Specifically, the directivity is adjusted by changing the inclining angle of each receiving antenna section or changing the directivity expansion angle of each receiving antenna section.

Hereinafter, a method for installing the relay apparatus and the receiving antenna section in the case where the optical path length difference (Lob−Loa) is 30 m will be described.

When Lob−Loa is 30 m, Lwa−Lwb=45 is obtained from equation (3). When, for example, the receivable area of the receiving antenna section 322a is 60 m, it is considered that Lwa=60 (m).

Figure 42:
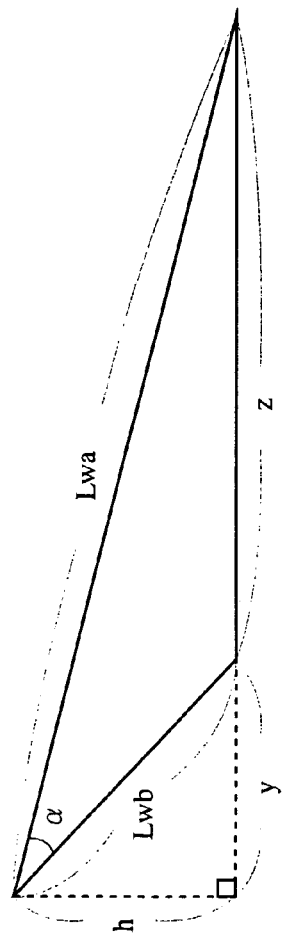
FIG. 42 is a diagram schematically showing a receiving area of a receiving antenna section shown in FIG. 41.
Figure 43:
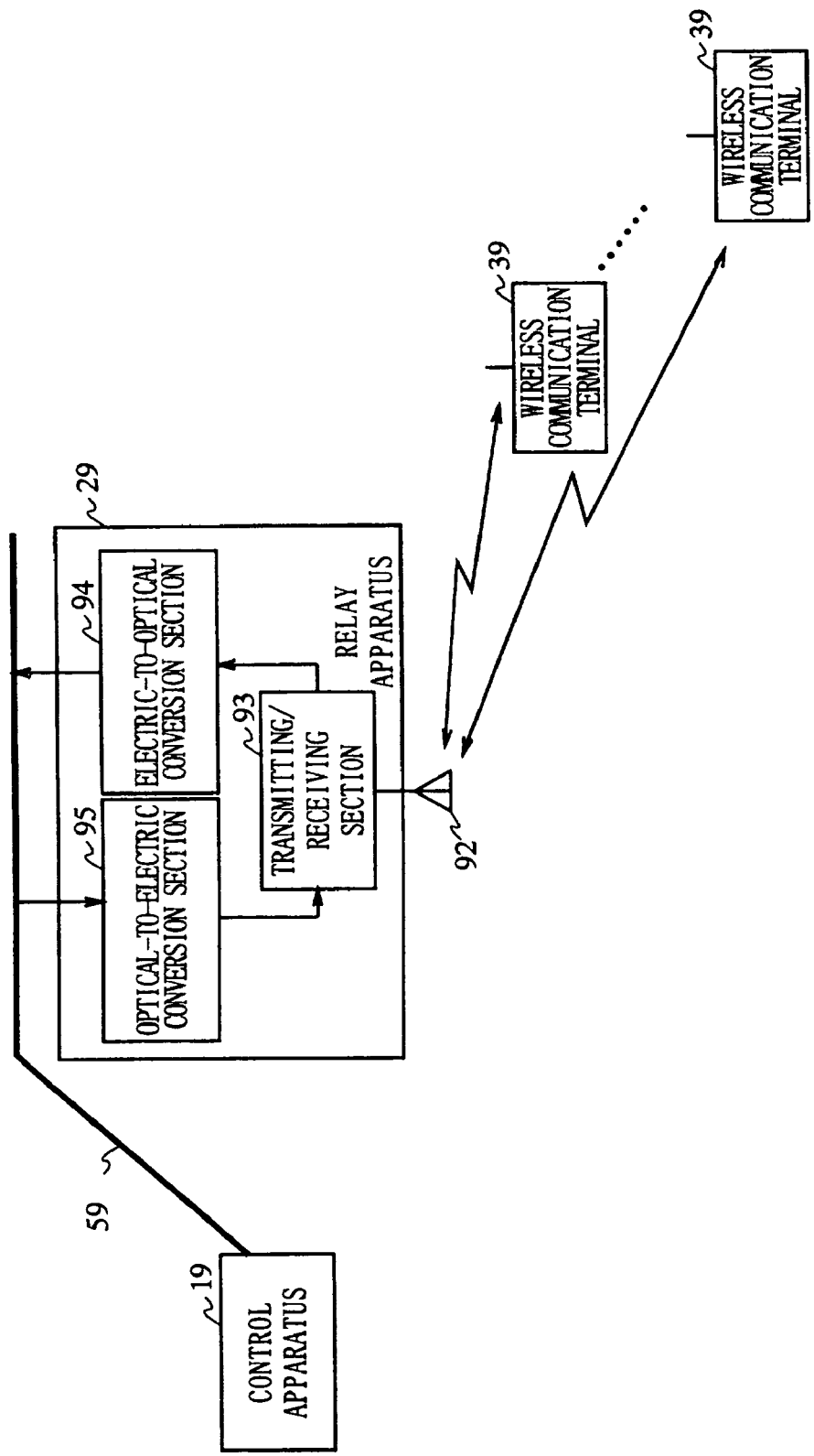
FIG. 43 is a diagram showing a structure of a conventional wireless communication system described in Japanese Laid-Open Patent Publication No. 9-233050.
Figure 44:
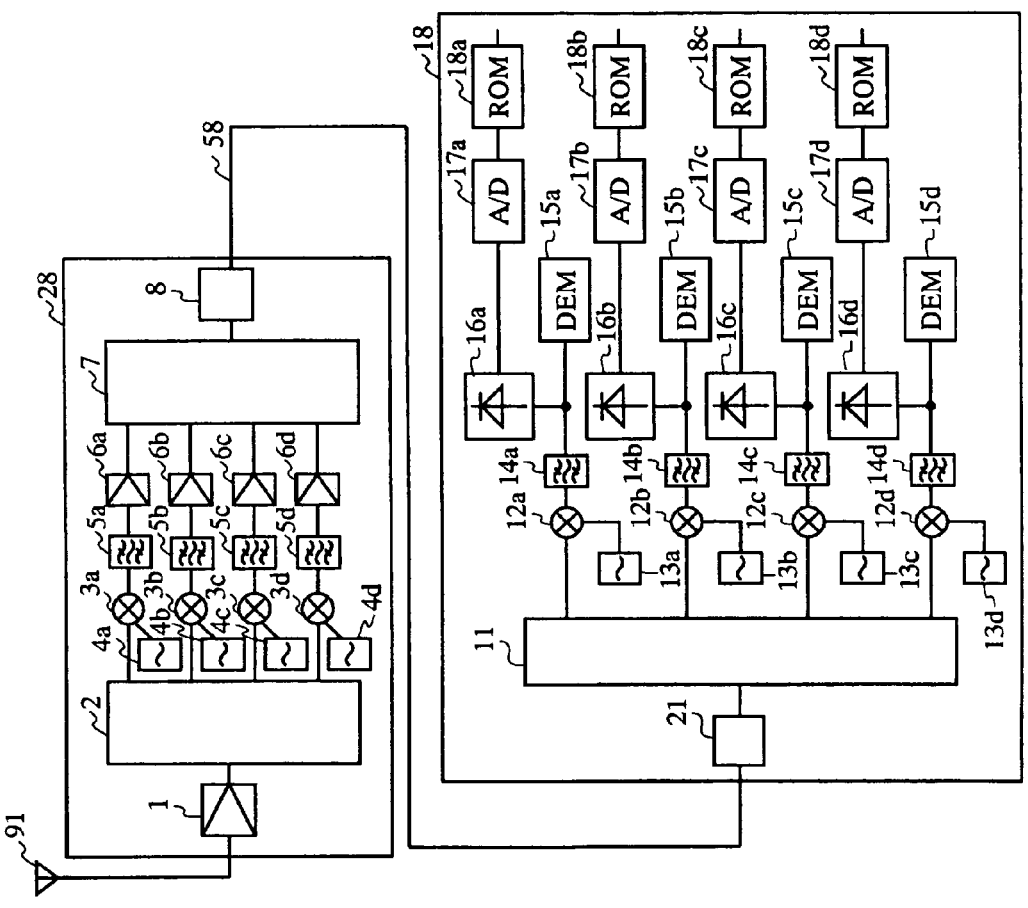
FIG. 44 is a diagram showing a structure of a conventional wireless communication system described in the specification of Japanese Patent No. 2885143.
Figure 45:
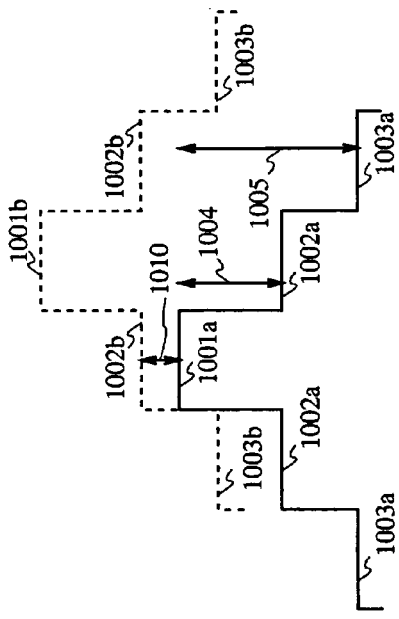
FIG. 45 is a diagram showing spectra of wireless LAN signals in conformity to the IEEE802.11a Standard, which are transmitted from a first wireless communication terminal and a second wireless communication terminal using two adjacent channels.
Figure 46:
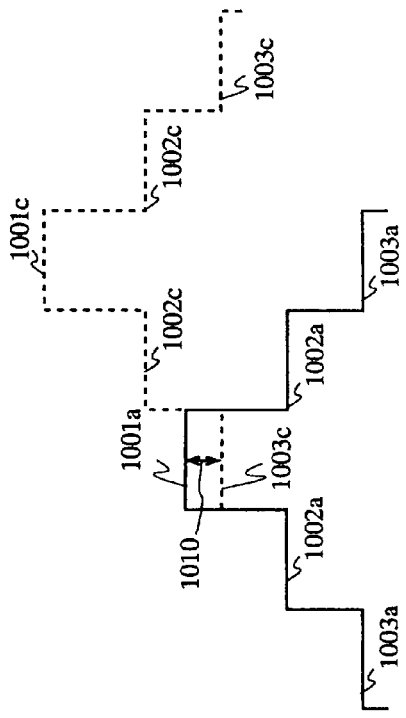
FIG. 46 is a diagram showing spectra of wireless LAN signals which are transmitted from the first wireless communication terminal and a third wireless communication terminal using channels which are away from each other by a two-channel distance.

FIG. 42 is a diagram schematically showing a receiving area of the receiving antenna section 322a. In FIG. 42, h represents a distance between the ceiling and the floor. Since the height of the ceiling of a typical house is about 2 m, the following description will be given with the assumption of h=2 (m). In an area right below the antenna and in the vicinity thereof, an area where wireless signals are not received are predetermined such that the level of the signals do not exceed the upper limit of the dynamic range. Here, the area where wireless signals are not received covers a distance y of 5 (m) from right below the receiving antenna section. Since y=5 and h=2, Lwb=5.39 (m) from the Pythagorean Theorem. Since Lwa=60 (m), in order to fulfill Lwa−Lwb=45, it is ideal that Lwb=15 (m). However, when Lwb is 15 m, the receiving area of the receiving antenna section 322a is too narrow. Since an error of about 10 m is tolerated in the wireless communication zone, it is set that Lwb=5.39 (m) here. Since Lwa=60 and h=2, y+z=59.97 from the Pythagorean Theorem. Since y=5, the length of the bottom surface of the receiving area is z=54.97.

Next, expansion angle α of the directivity of the receiving antenna section 322a will be found. Since Lwa=60, Lwb=5.39, and z=54.97, cos α=0.94 from the Law of Cosines. It is thus understood that expansion angle α of the directivity may be about 20°.

Assuming that the length of the region where the receiving areas of the receiving antenna sections 322a and 322b overlap each other is x, inter-relay apparatus distance R=y+z−y−x. When, for example, x=5 (m), R is about 50 m.

From the above, it is understood that the relay apparatuses 32a and 32b may be installed such that inter-relay apparatus distance R is 50 m, the maximum length Lwa of the receiving area is 60 m, and the directivity expansion angle is about 20°. Thus, even when the length of the optical transmission path is restricted, expansion angle α of the directivity, the maximum length Lwa of the receiving area, and the inter-relay apparatus distance R can be obtained by setting distance y over which no wireless signal is received and the length x of the overlapping region.

Even when inter-relay apparatus distance R is predetermined, expansion angle α of the directivity and the maximum length Lwa of the receiving area can be obtained by setting distance y over which no wireless signal is received and the length x of the overlapping region.

Preferably, in the case where a wireless signal transmitted by one wireless communication terminal 33c is received by a plurality of relay apparatuses, the level of the wireless signal may be adjusted such that the difference between the levels of the optical signals transmitted to the optical fibers 36 and 36b is within a predetermined range. The level of the wireless signal can be adjusted by the level adjustment section 326.

Also preferably, the wireless communication area covered by one relay area may be set to be smaller than the area of one wireless transmission path which is assumed in advance by the wireless communication system to be used. This can reduce the dispersion in the delay time of the wireless signals. Accordingly, even in the case where there is a dispersion among the lengths of the optical fibers for connecting the relay apparatuses and the control apparatus, deterioration in the communication quality due to multi-path interference can be reduced.

As described above, according to this embodiment, each relay apparatus does not receive a wireless signal having a high level which is transmitted from a position in a close range, and receives a wireless signal transmitted by a wireless communication terminal at a certain distance away or farther. Accordingly, each relay apparatus can receive only wireless signals having a level which does not exceed the upper limit of the dynamic range tolerated by the electric-to-optical conversion section. This can realize high quality optical transmission of the wireless signals. In addition, since the relay apparatus does not need to have an AGC function, the wireless communication system can have a simplified structure and can be constructed at low cost.

Further, according to this embodiment, the wireless communication zone can be expanded by providing a plurality of relay apparatuses. By adjusting the directivity of each receiving antenna section, the delay skew among the wireless signals in the wireless transmission paths and the optical transmission paths can be kept within a predetermined time period, even when one wireless signal is received by a plurality of receiving antenna sections. This can prevent signal deterioration due to multi-path interference.

In the above embodiments, each receiving antenna section has a directivity in an oblique downward direction with respect to the vertical direction. Each receiving antenna section is only required to have a directivity with which the receiving antenna section does not receive a wireless signal transmitted from a wireless communication terminal located right below the corresponding relay apparatus and can receive a wireless signal transmitted from a wireless communication terminal located right below the adjacent relay apparatus. Thus, the directivity of each receiving antenna section is not limited to the directivity described in the above embodiments.

In any of Embodiments 13 through 18, the wireless communication system can perform optical transmission using the frequency-division multiplexing system. According to the present invention, even in the case where a plurality of wireless communication terminals communicate with a relay apparatus using different frequencies, the wireless signals can be kept within the dynamic range tolerated by the electric-to-optical conversion section without depending on the frequency. Therefore, high quality optical transmission of wireless signals can be realized. In addition, since it is not necessary to provide a band-pass filter for separating received signals or an AGC circuit for adjusting the signal level, the structure of the relay apparatus can be simplified. Moreover, the present invention is especially effective for an optical transmission system of a wireless LAN used indoors, where the frequency bandwidth assigned to each wireless communication terminal is narrow and it is difficult to produce a band-pass filter.

INDUSTRIAL APPLICABILITY

The present invention is useful as, for example, a wireless communication system capable of keeping the levels of wireless signals received by a relay apparatus within a predetermined dynamic range.

The invention claimed is:
1. A wireless communication system, comprising:
a control apparatus;
at least one relay apparatus connected with said control apparatus via an optical transmission path; and
a plurality of wireless communication terminals communicating wirelessly with said at least one relay apparatus, wherein:
said control apparatus comprises:
a first optical transmitting section for converting a downstream electric signal into a downstream optical signal and transmitting the downstream optical signal to said at least one relay apparatus via the optical transmission path; and
a first optical receiving section for converting an upstream optical signal transmitted from said at least one relay apparatus via the optical transmission path into an upstream electric signal,
said at least one relay apparatus comprises:
a second optical receiving section for converting the downstream optical signal transmitted from said control apparatus via the optical transmission path into the downstream electric signal;
a level control section for attenuating a level of the downstream electric signal so as to narrow a communicable area of said at least one relay apparatus and to allow a level of a wireless signal transmitted by one of said wireless communication terminals existing in the communicable area to be within a predetermined range; wherein when said wireless communication terminals use a respective channel, the predetermined range is smaller than a difference between (a) a leakage ratio which is a ratio of a level of a wireless signal using the respective channel with respect to a level of a frequency component leaking to another channel different from the respective channel, and (b) a signal to noise ratio which is a ratio of a level of a leakage signal from a wireless communication terminal using another channel different from the respective channel with respect to the level of the wireless signal using the respective channel;
a transmitting/receiving antenna section for transmitting the downstream electric signal converted by said second optical receiving section to said one wireless communication terminal as a wireless signal, and receiving a wireless signal transmitted from said one wireless communication terminal as the upstream electric signal; and
a second optical transmitting section for converting the upstream electric signal received by said transmitting/receiving antenna section into the upstream optical signal and transmitting the upstream optical signal to said control apparatus via the optical transmission path.

2. A wireless communication system according to claim 1, wherein
said control apparatus further comprises:
a plurality of said first optical transmitting sections; and
a signal dividing section for dividing the downstream electric signal, said signal dividing section divides the downstream electric signal and thus attenuates a level of the downstream electric signal so as to narrow a communicable area of said at least one relay apparatus, and thus allows the level of the wireless signal transmitted by said one wireless communication terminal existing in the communicable area to be within the predetermined range, where
said first optical transmitting sections convert downstream electric signals divided by said signal dividing section into downstream optical signals.

3. A wireless communication system according to claim 1, wherein:

a pilot signal generation section, provided in the control apparatus, is for generating a pilot signal to be transmitted while being superposed on the downstream electric signal;

said first optical transmitting section converts the downstream electric signal having the pilot signal superposed thereon into a downstream optical signal;

said at least one relay apparatus further comprises:

a pilot signal detection section for detecting a level of the pilot signal superposed on the downstream electric signal converted by said second optical receiving section, wherein said level control section controls a level of the wireless signal such that the level of the pilot signal detected by said pilot signal detection section is constant; and said pilot signal generation section increases the level of the generated pilot signal so as to narrow a communicable area of said at least one relay apparatus, and thus allows the level of the wireless signal transmitted by said one wireless communication terminal existing in the communicable area to be within the predetermined range.

4. A wireless communication system according to claim 1, wherein a wireless signal level restriction means is provided in said control apparatus, and comprises:

a monitoring section for monitoring whether or not a quality of the upstream electric signal converted by said first optical receiving section fulfills a predetermined condition, wherein when said monitoring section determines that the quality of the upstream electric signal does not fulfill the predetermined condition, said level control section lowers the level of the downstream electric signal which is to be input to said first optical transmitting section so as to reduce an optical modulation index, and by reducing the optical modulation index said level control section attenuates the power of the downstream optical signal so as to narrow a communicable area of said at least one relay apparatus, and thus allows the level of the wireless signal transmitted by said one wireless communication terminal existing in the communicable area to be within the predetermined range.

5. A wireless communication system according to claim 1, wherein a wireless signal level restriction means is provided in said control apparatus and comprises:

a monitoring section for monitoring whether or not a quality of the upstream electric signal converted by said first optical receiving section fulfills a predetermined condition, wherein when said monitoring section determines that a quality of the upstream electric signal does not fulfill the predetermined condition, said level control section lowers a level of a bias current which is set by said first optical transmitting section so as to reduce an optical modulation index, and by reducing the optical modulation index said level control section attenuates the power of the downstream optical signal so as to narrow a communicable area of said at least one relay apparatus, and thus allows the level of the wireless signal transmitted by said one wireless communication terminal existing in the communicable area to be within the predetermined range.

6. A wireless communication system according to claim 1, wherein said control apparatus includes a wireless signal level restriction means that includes a level attenuation section for attenuating wireless signals to such a level that the upstream optical signal converted by said second optical transmitting section is not distorted.

7. A wireless communication system according to claim 1, wherein:

communicable areas of adjacent relay apparatuses partially overlap each other;

said relay apparatuses each comprise level adjustment means for controlling a gain by adjusting the level of the wireless signal transmitted to, and received from, said one wireless communication terminal; and said level adjustment means adjusts the level of the wireless signal, such that a difference between (a) a delay time required for a signal transmitted from said control apparatus to be transmitted via each of said adjacent relay apparatuses onto a wireless communication terminal existing in a region where the communicable areas overlap each other, and (b) a delay time required for a signal transmitted from said control apparatus to be transmitted via a relay apparatus adjacent to said adjacent relay apparatuses onto said wireless communication terminal existing in the region where the communicable areas overlap each other, is within a predetermined time period.

8. A wireless communication system according to claim 7, wherein two relay apparatuses adjacent to each other constitute one set, and one set of adjacent relay apparatuses communicate using a frequency which is different from a frequency used by another set of adjacent relay apparatuses.

9. A wireless communication system according to claim 7, wherein said transmitting/receiving antenna section has a directivity toward one of two adjacent relay apparatuses, said one relay apparatus being connected with said control apparatus via a longer optical transmission path than the optical transmission path which connects said control apparatus and said at least one relay apparatus including said transmitting/receiving antenna section.

10. A wireless communication system according to claim 7, further comprising an optical splitting/coupling section for splitting the optical transmission path which connects said control apparatus and each of said relay apparatuses, wherein one end of the split optical transmission path is connected to said at least one relay apparatus and the other end is connected to another optical splitting/coupling section.

11. A wireless communication system according to claim 7, further comprising an optical splitting/coupling section for splitting the optical transmission path which connects said control apparatus and each of said relay apparatuses, wherein said optical splitting/coupling section splits one optical fiber connected to the control apparatus into at least a predetermined number of optical fibers, and each of the split optical fibers is connected to one of said relay apparatuses.

12. A wireless communication system according to claim 7, wherein said level adjustment means adjusts the level of the wireless signal such that the delay times are each a maximum delay time tolerated by said wireless communication system.

13. A wireless communication system according to claim 1, wherein:

communicable areas of adjacent relay apparatuses partially overlap each other;

said relay apparatuses each comprise optical signal control means for controlling a delay time of the optical signal transmitted to, and received from, said control apparatus; and said optical signal control means controls the delay time of the optical signal, such that a difference between (a) a delay time required for a signal transmitted from said control apparatus to be transmitted via each of said adjacent relay apparatuses onto a wireless communication terminal existing in a region where the communicable areas overlap each other, and (b) a delay time required for a signal transmitted from said control apparatus to be transmitted via a relay apparatus adjacent to said adjacent relay apparatuses onto the wireless communication terminal existing in the region where the communicable areas overlap each other, is within a predetermined time period.

14. A wireless communication system according to claim 1, wherein wireless signals used by each of said plurality of wireless communication terminals have at least two different frequencies.

15. A wireless communication system, comprising:
a control apparatus;
at least one relay apparatus connected with said control apparatus via an optical transmission path; and
a plurality of wireless communication terminals communicating wirelessly with said at least one relay apparatus, wherein:
said control apparatus comprises:
a first optical transmitter operable to convert a downstream electric signal into a downstream optical signal and transmit the downstream optical signal to said at least one relay apparatus via the optical transmission path; and
a first optical receiver operable to convert an upstream optical signal transmitted from said at least one relay apparatus via the optical transmission path into an upstream electric signal,
said at least one relay apparatus comprises:
a second optical receiver operable to convert the downstream optical signal transmitted from said control apparatus via the optical transmission path into the downstream electric signal;
a level controller operable to attenuate a level of the downstream electric signal so as to narrow a communicable area of said at least one relay apparatus and to allow a level of a wireless signal transmitted by one of said wireless communication terminals existing in the communicable area to be within a predetermined range; wherein when said wireless communication terminals use a respective channel, the predetermined range is smaller than a difference between (a) a leakage ratio which is a ratio of a level of a wireless signal using the respective channel with respect to a level of a frequency component leaking to another channel different from the respective channel, and (b) a signal to noise ratio which is a ratio of a level of a leakage signal from a wireless communication terminal using another channel different from the respective channel with respect to the level of the wireless signal using the respective channel;
a transmitting/receiving antenna section operable to transmit the downstream electric signal converted by said second optical receiver to said one wireless communication terminal as a wireless signal, and receive a wireless signal transmitted from said one wireless communication terminal as the upstream electric signal; and
a second optical transmitter operable to convert the upstream electric signal received by said transmitting/receiving antenna section into the upstream optical signal and transmit the upstream optical signal to said control apparatus via the optical transmission path.

16. A wireless communication system according to claim 15, wherein said control apparatus further comprises:
a plurality of said first optical transmitters; and
a signal divider operable to divide the downstream electric signal, said signal divider divides the downstream electric signal and thus attenuates a level of the downstream electric signal so as to narrow a communicable area of said at least one relay apparatus, and thus allows the level of the wireless signal transmitted by said one wireless communication terminal existing in the communicable area to be within the predetermined range, wherein said first optical transmitters convert downstream electric signals divided by said signal divider into downstream optical signals.

17. A wireless communication system according to claim 15, wherein:
a pilot signal generator, provided in said control apparatus, is operable to generate a pilot signal to be transmitted while being superposed on the downstream electric signal;
said first optical transmitter converts the downstream electric signal having the pilot signal superposed thereon into a downstream optical signal;
said at least one relay apparatus further comprises:
a pilot signal detector operable to detect a level of the pilot signal superposed on the downstream electric signal converted by said second optical receiver, wherein said level controller is further operable to control a level of the wireless signal such that the level of the pilot signal detected by said pilot signal detector is constant; and
said pilot signal generator increases the level of the generated pilot signal so as to narrow a communicable area of said at least one relay apparatus, and thus allows the level of the wireless signal transmitted by said one a wireless communication terminal existing in the communicable area to be within the predetermined range.

18. A wireless communication system according to claim 15, wherein:
a wireless signal level restrictor is provided in said control apparatus and comprises:
a monitor operable to monitor whether or not a quality of the upstream electric signal converted by said first optical receiver fulfills a predetermined condition, wherein when said monitor determines that the quality of the upstream electric signal does not fulfill the predetermined condition, said level controller is operable to lower the level of the downstream electric signal which is to be input to said first optical transmitter so as to reduce an optical modulation index, and by reducing the optical modulation index said level controller attenuates the power of the downstream optical signal so as to narrow a communicable area of said at least one relay apparatus, and thus allows the level of the wireless signal transmitted by said one wireless communication terminal existing in the communicable area to be within the predetermined range.

19. A wireless communication system according to claim 15, wherein a wireless signal level restrictor is provided in said control apparatus and comprises:
a monitor operable to monitor whether or not a quality of the upstream electric signal converted by said first optical receiver fulfills a predetermined condition, wherein when said monitor determines that a quality of the upstream electric signal does not fulfill the predetermined condition, said level controller is operable to lower a level of a bias current which is set by said first optical transmitter so as to reduce an optical modulation index, and by reducing the optical modulation index said level controller attenuates the power of the downstream optical signal so as to narrow a communicable area of said at least one relay apparatus, and thus allows the level of the wireless signal transmitted by said one wireless communication terminal existing in the communicable area to be within the predetermined range.

20. A wireless communication system according to claim 15, wherein said control apparatus includes a wireless signal level restrictor that includes a level attenuator operable to attenuate wireless signals to such a level that the upstream optical signal converted by said second optical transmitter is not distorted.

21. A wireless communication system according to claim 15, wherein:
communicable areas of adjacent relay apparatuses partially overlap each other;
said relay apparatuses each comprise a level adjuster operable to control a gain by adjusting the level of the wireless signal transmitted to, and received from, said one wireless communication terminal; and
said level adjuster adjusts the level of the wireless signal, such that a difference between (a) a delay time required for a signal transmitted from said control apparatus to be transmitted via each of said adjacent relay apparatuses onto a wireless communication terminal existing in a region where the communicable areas overlap each other, and (b) a delay time required for a signal transmitted from said control apparatus to be transmitted via a relay apparatus adjacent to said adjacent relay apparatuses onto said wireless communication terminal existing in the region where the communicable areas overlap each other, is within a predetermined time period.

22. A wireless communication system according to claim 21, wherein two relay apparatuses adjacent to each other constitute one set, and one set of adjacent relay apparatuses communicate using a frequency which is different from a frequency used by another set of adjacent relay apparatuses.

23. A wireless communication system according to claim 21, wherein said transmitting/receiving antenna section has a directivity toward one of the two adjacent relay apparatuses, said one relay apparatus being connected with said control apparatus via a longer optical transmission path than an optical transmission path which connects said control apparatus and said relay apparatus including said at least one transmitting/receiving antenna section.

24. A wireless communication system according to claim 21, further comprising an optical coupler operable to split the optical transmission path which connects said control apparatus and each of said relay apparatuses, wherein one end of the split optical fiber is connected to said at least one relay apparatus and the other end is connected to another optical coupler.

25. A wireless communication system according to claim 21, further comprising an optical coupler operable to split the optical transmission path which connects said control apparatus and each of said relay apparatuses, wherein said optical coupler splits one optical fiber connected to said control apparatus into at least a predetermined number of optical fibers, and each of the split optical fibers is connected to one of said relay apparatuses.

26. A wireless communication system according to claim 21, wherein said level adjuster adjusts the level of the wireless signal such that the delay times are each a maximum delay time tolerated by said wireless communication system.

27. A wireless communication system according to claim 15, wherein:
communicable areas of adjacent relay apparatuses partially overlap each other;
said relay apparatuses each comprise an optical signal controller operable to control a delay time of the optical signal transmitted to, and received from, said control apparatus; and
said optical signal controller controls the delay time of the optical signal, such that a difference between (a) a delay time required for a signal transmitted from said control apparatus to be transmitted via each of said adjacent relay apparatuses onto a wireless communication terminal existing in a region where the communicable areas overlap each other, and (b) a delay time required for a signal transmitted from said control apparatus to be transmitted via a relay apparatus adjacent to said adjacent relay apparatuses onto the wireless communication terminal existing in the region where the communicable areas overlap each other, is within a predetermined time period.

28. A wireless communication system according to claim 15, wherein wireless signals used by each of said plurality of wireless communication terminals have at least two different frequencies.

* * * * *